(12) United States Patent
Saika

(10) Patent No.: US 8,745,744 B2
(45) Date of Patent: Jun. 3, 2014

(54) STORAGE SYSTEM AND STORAGE SYSTEM MANAGEMENT METHOD

(75) Inventor: Nobuyuki Saika, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 62 days.

(21) Appl. No.: 13/516,555

(22) PCT Filed: Jun. 6, 2012

(86) PCT No.: PCT/JP2012/003695
§ 371 (c)(1),
(2), (4) Date: Jun. 15, 2012

(87) PCT Pub. No.: WO2013/183083
PCT Pub. Date: Dec. 12, 2013

(65) Prior Publication Data
US 2013/0333042 A1    Dec. 12, 2013

(51) Int. Cl.
| | |
|---|---|
| *G06F 11/00* | (2006.01) |
| *G06F 12/16* | (2006.01) |
| *G06F 21/56* | (2013.01) |
| *G06F 11/14* | (2006.01) |
| *G08B 23/00* | (2006.01) |
| *H04L 29/06* | (2006.01) |

(52) U.S. Cl.
CPC ............ *G06F 21/568* (2013.01); *G06F 21/562* (2013.01); *G06F 11/1453* (2013.01); *G06F 11/1469* (2013.01); *H04L 63/1441* (2013.01)
USPC ........................................... 726/24; 713/188

(58) Field of Classification Search
CPC . H04L 63/1441; G06F 21/562; G06F 21/568; G06F 11/1453; G06F 11/1469
USPC ............................................ 726/24; 713/188
See application file for complete search history.

(56) References Cited

U.S. PATENT DOCUMENTS

| | | | |
|---|---|---|---|
| 6,477,544 B1 | 11/2002 | Bolosky et al. | |
| 6,513,051 B1 * | 1/2003 | Bolosky et al. ........................ 1/1 |
| 8,171,552 B1 * | 5/2012 | Chang ............................. 726/24 |
| 8,347,388 B1 * | 1/2013 | Dutch et al. ..................... 726/24 |
| 2004/0083381 A1 * | 4/2004 | Sobel et al. ................... 713/200 |
| 2004/0117401 A1 | 6/2004 | Miyata et al. | |
| 2004/0172551 A1 * | 9/2004 | Fielding et al. .............. 713/200 |
| 2007/0100905 A1 * | 5/2007 | Masters et al. ............... 707/201 |
| 2008/0141375 A1 * | 6/2008 | Amundsen ..................... 726/24 |
| 2009/0113151 A1 | 4/2009 | Teranishi et al. | |
| 2012/0131108 A1 * | 5/2012 | Barsness et al. ............. 709/206 |
| 2012/0254982 A1 * | 10/2012 | Sallam ............................ 726/16 |
| 2012/0255017 A1 * | 10/2012 | Sallam ............................ 726/24 |

FOREIGN PATENT DOCUMENTS

| | | |
|---|---|---|
| JP | 2004-199213 A | 7/2004 |
| JP | 2009-110225 A | 5/2009 |

* cited by examiner

*Primary Examiner* — Michael Simitoski
(74) *Attorney, Agent, or Firm* — Volpe and Koenig, P.C.

(57) ABSTRACT

The present invention removes a computer virus-infected benchmark file by re-creating the benchmark file referenced by a reference-source file. One or more clone files, which serve as reference files, reference a clone-source file, which serves as the benchmark file. In a case where it has been determined that the clone-source file is infected with a computer virus, only the clone file referencing the infected area is subjected to a virus check and repaired. A new clone-source file is configured based on the repaired clone file and the clone-source file (b). The old clone-source file, which is infected with the computer virus, is deleted (c).

12 Claims, 45 Drawing Sheets

Fig. 9

Scan cache table T11

| File pathname C110 | Scan status C111 | Scan result C112 | Repair status C113 |
|---|---|---|---|
| /home/user-01/a.txt | Not scanned | — | |
| /home/user-02/b.txt | Scanned | Infected | Access prohibited |
| /home/user-03/c.txt | Scanned | Infected | Irreparable (clone source) |
| /home/user-04/d.txt | Scanned | Infected | Repaired (clone) |
| /home/user-05/e.txt | Scanned | Not infected | |

Fig. 10

| | | T20 | |
|---|---|---|---|
| <Shared part> | | | |
| Pattern definition file version | | :2 | |
| Number of patterns | | :150 | |
| Number of added patterns | | :2 | |
| | | | |
| <Pattern definition part> | | | |
| # Pattern name (name of virus) | Pattern | | Add flag |
| 001 Virus-A | 010A1F2A3BFF57ED... | | OFF |
| 002 Virus-B | 0A0B1F1234FB51BB... | | OFF |
| ..... | | | |
| 149 Virus-Y | 0012458FEA459569... | | ON |
| 150 Virus-Z | FFEAB864F3B97FA... | | ON |

Fig. 41
(a)
```
Current clone source    1234
cloneA                  1238
cloneB                  1238
cloneC                  1238
cloneD                  1678
cloneE                  1678
cloneF                  5678
cloneG                  5678
cloneH                  5679
cloneI                  5679
cloneJ                  5679
```
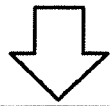
(b)
```
Current clone source    1234
cloneA                  1238
cloneB                  1238
cloneC                  1238
cloneD                  1678
cloneE                  1678
cloneF                  5678
cloneG                  5678
cloneH                  5679
cloneI                  5679
cloneJ                  5679
```
New clone-source files: 1678, 5678
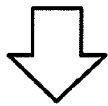
(c)
5678: New clone source (1st)
1---: New clone source (2nd)

STORAGE SYSTEM AND STORAGE SYSTEM MANAGEMENT METHOD

TECHNICAL FIELD

The present invention relates to a storage system and a storage system management method.

BACKGROUND ART

A virus scan process for detecting a computer virus-infected file and repairing or removing this file places a relatively large load on a computer system. However, as disclosed in U.S. Pat. No. 6,477,544, a system for accessing a Link File comprising links to a Common Store File and differences with the Common Store File (dirty portions) is known (Patent Literature 1). In this prior art, a virus scan is not performed for the Common Store File even when a scan is performed for a file accessed by a user in accordance with an access trigger.

Alternatively, to lessen the load generated by a virus scan process, a technology for storing the results of previous virus scan processes and only performing a virus scan process on a file, which was updated subsequent to the last scan, has been proposed (Patent Literature 2). In addition, a technology for identifying an updated file based in an updated block, and performing a virus scan process only for this updated file when creating a multi-generation backup has also been proposed (Patent Literature 3).

CITATION LIST

Patent Literature

[PTL 1]
U.S. Pat. No. 6,477,544
[PTL 2]
Japanese Patent Application Laid-open No. 2004-199213
[PTL 3]
Japanese Patent Application Laid-open No. 2009-110225

SUMMARY OF INVENTION

Technical Problem

With the foregoing problems in view, an object of the present invention is to provide a storage system and a storage system management method, which, in a case where a benchmark file referenced by a reference-source file is infected with a computer virus, makes it possible to create a new benchmark file based on the reference-source file.

Solution to Problem

A storage system related to one aspect of the present invention comprises a file management apparatus, which is coupled to a virus checking apparatus for checking whether a file is infected with a computer virus, and manages multiple files, and a storage control apparatus for storing the above-mentioned multiple files. The file management apparatus manages multiple files among which at least a portion of data is duplicated by treating one file as a benchmark file, treating another file as a reference-source file for referencing data of the benchmark file, and eliminating duplicated data between the benchmark file and the reference-source file, processes an access request received from a host apparatus, requests that the virus checking apparatus check a prescribed file of the multiple files, and in a case where the benchmark file is infected with a computer virus, executes a prescribed reconfiguration process for configuring a new benchmark file based on the reference-source file, which references the relevant benchmark file.

In the prescribed reconfiguration process, the file management apparatus may compare block-by-block the data of a repaired reference-source file with that of a reference-source file judged not to be infected with a computer virus, use the most numerous data item in each block to acquire a data pattern conforming to majority logic, and configure a new benchmark file based on this data pattern.

In addition, in a case where the file management apparatus requests the virus checking apparatus to check the benchmark file, and the result of the check by the virus checking apparatus clearly shows that the benchmark file is infected with a computer virus, the file management apparatus may make a decision as to the necessity of a reference-source file check based on the benchmark file reference status with respect to the reference-source file.

BRIEF DESCRIPTION OF DRAWINGS

FIG. 9 is an illustration showing an example of the configuration of a scan cache table.
FIG. 10 is an illustration showing an example of the configuration of a virus definition file.

FIG. 41 is an illustration related to Example 2 showing how multiple new clone-source files are configured from multiple clone files.

DESCRIPTION OF EMBODIMENTS

Figure 1:
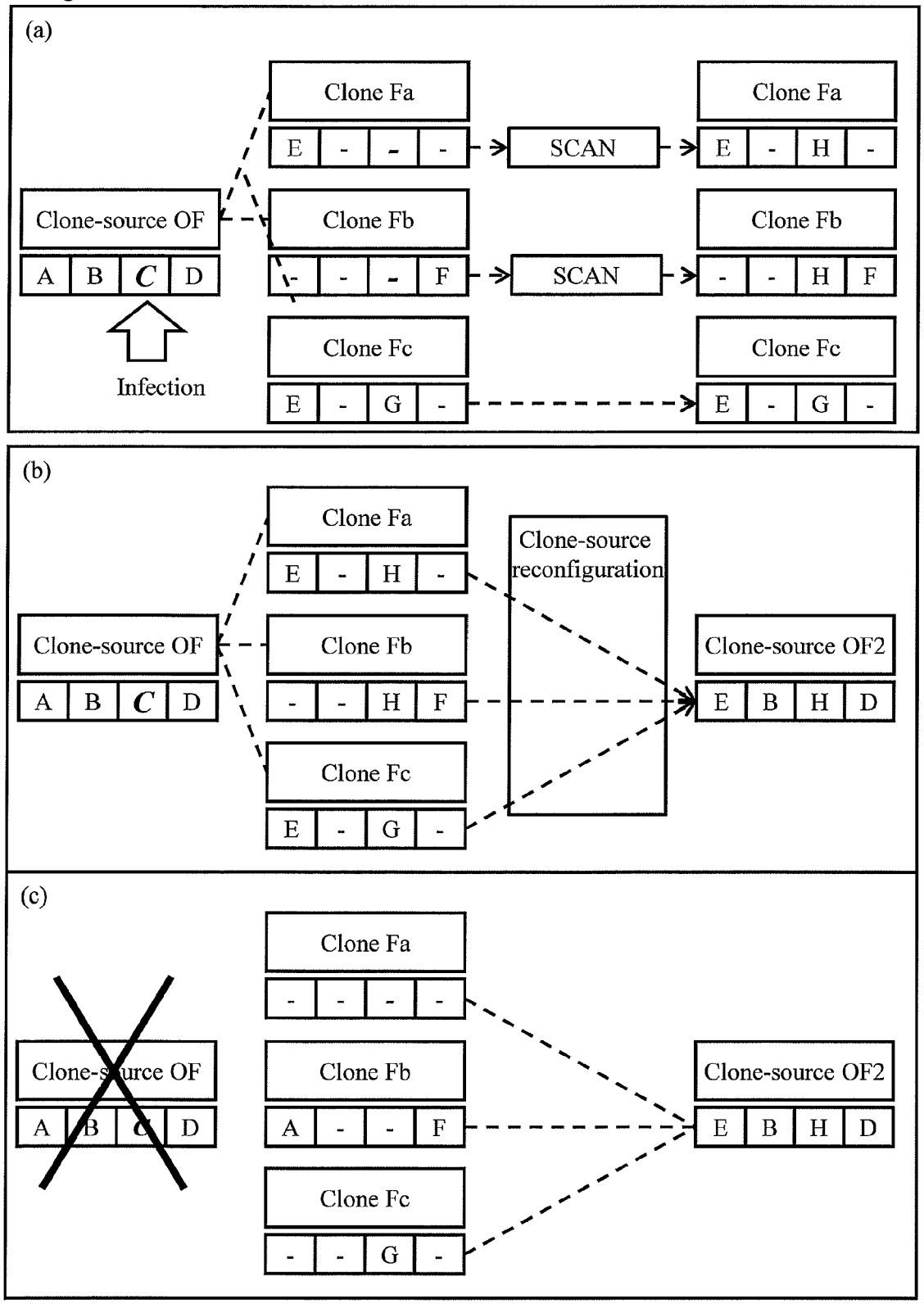
FIG. 1 is an illustration showing the overall concept of the embodiment.

An embodiment of the present invention will be explained hereinbelow by referring to the attached drawings. However, it should be noted that this embodiment is merely one example for realizing the present invention, and does not purport to limit the technical scope of the present invention. Multiple characteristic features disclosed in the embodiment are capable of being combined in various ways.

In the specification, information used in the embodiment is explained using an expression such as "aaa table", but the present invention is not limited thereto, and, for example, other expressions, such as "aaa list", "aaa database", and "aaa queue", may also be used. To show that the information used in the embodiment is not dependent on a data structure, this information may also be called "aaa information".

When explaining the content of the information used in the embodiment, the expressions "identification information", "identifier", "name" and "ID" are used, but these expressions are interchangeable.

In addition, in an explanation of a processing operation of the embodiment, a "computer program" may be explained as the doer of the action (the subject). The computer program is executed by a microprocessor. Therefore, the processor may be substituted as the doer of the action.

In the embodiment, there is explained a case in which a system for eliminating duplicated data in files removes a computer virus. The following problem occurs in a case where a system for eliminating duplicated data in files removes a computer virus. First, a mechanism for deduplication processing will be briefly explained.

In a deduplication process, a file comprising data shared in common with a clone-source file, which constitutes a benchmark, is converted to a clone file, which references data in the clone-source file. That is, from among the data blocks of a clone file, a data block comprising the same data as a data block of a clone-source file is replaced with information for referencing the data block of the clone-source file.

Therefore, a system for implementing a deduplication process need not redundantly store the same data, enabling the efficient use of a storage area. However, since a clone-source file is referenced by a clone file, for example, it is not possible to remove computer virus-infected data from the clone-source file even in a case where the clone-source file is clearly infected with a computer virus. This is because the data of the clone file, which is referencing the clone-source file, will differ from the original data as a result.

The clone-source file is only referenced by the clone file, and a host apparatus is not able to access the clone-source file directly. Therefore, under normal circumstances, the clone-source file is not apt to be infected by a computer virus.

However, the clone-source file was originally a normal file, which has been converted to a clone-source file in accordance with the execution of the deduplication process. Therefore, there is a likelihood of a normal file being infected with an unknown computer virus prior to being converted to a clone-source file.

In a case where a computer virus check (a virus scan process) is performed when a file is accessed, a known computer virus will be detected at this point in time. However, unknown computer viruses are being produced in rapid succession and inserted into computer networks on a daily basis around the globe. Until a virus definition file, which is capable of dealing with an unknown computer virus, has been created and distributed, it is all but impossible to remove an unknown computer virus.

Therefore, for example, in a case where a normal file infected with an unknown computer virus has been converted to a clone-source file prior to the virus definition file being updated, it is impossible to remove the computer virus from the clone-source file. As mentioned above, this is because the clone-source file is referenced by one or more clone files.

Another problem occurring when a clone-source file has been infected with a computer virus is that virus scan processing must be performed for the one or more (normally multiple) clone files, which reference the clone-source file. In a case where there are a large number of clone files, it takes a long time to remove the infections from all of these clone files, thereby increasing the load on the system and lowering the response performance to the host apparatus.

Consequently, the embodiment provides a storage system, which, in a case where a reference-source file-referenced benchmark file has been infected with a computer virus, is capable of creating a new benchmark file, which is not infected with a computer virus. In addition, the embodiment provides a storage system capable of creating a new benchmark file, which is not infected with a computer virus, and of reducing reference file virus checks to the extent possible.

FIG. 1 is an illustration showing the overall concept of the embodiment. As shown in the left half of FIG. 1(a), multiple clone files Fa, Fb, and Fc are referencing a common clone-source file OF, and duplicated data has been eliminated. The clone-source file is an example of a "benchmark file", and the clone files are examples of "reference-source files". The process for eliminating the duplicated data among multiple files is called a single instance process.

In the drawing, the respective files comprise four data blocks each. A "-" is displayed in a data block in which data is replaced with a reference to the clone-source file. A case where a clone file comprises its own data is indicated using the letters of the alphabet "E", "F", and "G".

To expedite the explanation, it is supposed that the data "ABCD" is stored in the respective data blocks of the clone-source file OF.

In the clone file Fa, difference data "E", which differs from the data of the clone-source file, is stored in the first data block, and all the other data blocks reference the data of the clone-source file OF. Therefore, the clone file Fa data can be reproduced as "EBCD". In clone file Fb, the first data block through the third data block reference the data of the clone-source file OF, and difference data "F" is stored in the fourth data block. Therefore, the clone file Fb data can be reproduced as "ABCF". In clone file Fc, the second data block and the fourth data block reference the data of the clone-source file OF, difference data "E" is stored in the first data block and another difference data "G" is stored in the third data block. Therefore, the clone file Fc data can be reproduced as "EBGD".

The clone-source file OF is concealed from the host apparatus (a client or the like), and the host apparatus is not able to access and read/write data from/to the clone-source file OF. This is because the clone-source file OF is a benchmark file, which stores data referenced by the clone files Fa through Fc. Since the host apparatus cannot access a clone-source file, under normal circumstance, a clone-source file is not infected with a computer virus. However, in a case where a normal file is infected prior to becoming a clone-source file with an unknown computer virus not registered in the virus definition file, the normal file is likely to be converted to the clone-source file in an unknown computer virus-infected state.

It is assumed here that the data "C" of the third data block of the clone-source file OF is infected with a computer virus. The clone-source file OF, for example, undergoes virus scan processing in a case where a fixed period of time has elapsed, where the virus definition file has been updated, and where a fixed period of time has elapsed and, in addition, the virus definition file has been updated. It is supposed that the result of this virus scan processing clearly shows that the data of the third data block of the clone-source file OF is infected with a computer virus.

In a case where the clone-source file OF is infected with a computer virus, it is necessary to determine whether or not the computer virus also exists in the respective clone files Fa through Fc, which reference the clone-source file OF. Therefore, in a case where a large number of clone files exist, the clone files must be sent to the virus checking apparatus (a scan server 20, which will be explained further below), and virus scan processing must be implemented and the results thereof received. This increases the load on the storage system and lowers response performance.

Consequently, in the embodiment, a decision is made as to whether or not to execute virus scan processing for a clone file based on a clone file reference status, and only the required virus scan processing is executed.

For example, clone file Fa and clone file Fb are referencing the data "C" of the third data block of the clone-source file OF. Therefore, since the clone files Fa and Fb could be infected with the computer virus, these files are targeted for virus scan processing. As a result of this, repaired data "H", from which the computer virus has been removed, is stored in the third data block.

Alternatively, clone file Fc is not referencing the third data block of the clone-source file OF. Data "G", which differs from the data "C" of the clone-source file is stored in the third data block of the clone file Fc. Because the clone file Fc is not referencing the computer virus-infected data "C" at all, virus scan processing does not have to be executed. Clone file Fc can be considered a completely different file from the clone-source file OF as far as the computer virus-infected data "C" is concerned.

As described using FIG. 1(a), in a case where the clone-source file OF is clearly infected with a computer virus, a determination is made as to the need to execute virus scan processing based on the clone-source file reference status with respect to the clone file. This can prevent unnecessary virus scan processing from being performed, reduce the virus scan processing load, and curb the deterioration of response performance.

As shown in FIG. 1(b), in this embodiment, a clone-source file, which is not infected with a computer virus, is obtained by re-creating the clone-source file OF. In the embodiment, a new clone-source file OF2 is configured based on the clone files Fa and Fb, which were repaired in accordance with the virus scan processing, and the clone file Fc, which was never infected with the computer virus in the first place.

An example of a method for configuring the new clone-source file OF2 will be explained. In the embodiment, data is decided in accordance with majority logic for each data block of the respective clone files Fa through Fc, and a data pattern, which is configured from the data decided in conformance to majority logic, is created. In a case where a clone file Fa matching this data pattern exists, this clone file Fa may be used as the new clone-source file OF2. In a case where a clone file matching the data pattern does not exist, the clone file most closely approximating the data pattern can be used as the new clone-source file OF2.

In the example shown in FIG. 1(b), a comparison of the data of the first data blocks of the respective clone files Fa through Fc reveals that clone file Fa is "E", clone file Fb is "A", and clone file Fc is "E". Therefore, the most numerous data item "E" is selected as the data of the first data block. In the second data block, since "B" is stored in the second data block of all the clone files Fa through Fc, "B" is selected as the data of the second data block. Looking at the third data block, clone files Fa and Fb are "H", and clone file Fc is "G". Therefore, the most numerous data item "H" is selected as the data of the third data block. A look at the fourth data block reveals that clone files Fa and Fc are "D", and clone file Fb is "F". Therefore, the most numerous data item "D" selected as the data of the fourth data block.

A data pattern can be obtained by selecting the most numerous data item in the respective data blocks like this. In the above example, the data pattern becomes "EBHD". Since the data pattern is decided in accordance with majority logic with respect to the data in each data block, the data shared in common by the clone files Fa through Fc is the most numerous. In the embodiment, in a case where a clone file matching the data pattern decided in accordance with majority logic exists, this clone file is decided as the new clone-source file OF2. In the above example, the clone file Fa is selected as the new clone-source file OF2.

As shown in FIG. 1(c), in the embodiment, the reference relationships between the new clone-source file OF2 and the respective clone files Fa through Fc are reconfigured. The respective clone files Fa through Fc are defined having the new clone-source file OF2 as a reference destination. Therefore, clone file Fa references all of the data of the clone-source file OF2. This is because the clone file Fa and the new clone-source file OF2 comprise the same data pattern. The clone file Fb references the new clone-source file OF2 with respect to the second data block and the third data block, and stores data "A" and "F", which differ from the data of the clone-source file OF2, in the first data block and the fourth data block. The clone file Fc stores data "G", which differs from the data of the clone-source file OF2, only in the third data block; the other first, second, and fourth data blocks reference the data of the clone-source file OF2.

A comparison of FIG. 1(a) and FIG. 1(c) reveals that the configuration shown in FIG. 1(c) has a higher duplicated data elimination rate than the configuration shown in FIG. 1(a). In FIG. 1(c), a total of nine data blocks are referencing the data of the clone-source file OF2 (four in the clone file Fa, two in the clone file Fb, and three in the clone file Fc). By contrast, in FIG. 1(a), a total of eight data blocks area referencing the data of the clone-source file OF.

A latest clone-source file OF2, which is not infected with a computer virus, can be obtained by configuring the new clone-source file OF2 on the basis of the clone file reference status. Because this clone-source file OF2 is configured on the basis of the latest status of the respective clone files Fa through Fc, the duplicated data elimination ratio increases.

In the embodiment, the computer virus-infected clone-source file OF is deleted. To leave the old clone-source file OF as-is would be a wasteful use of storage area. In addition, it is not preferable for the old clone-source file OF, which is infected with the computer virus, to be transferred and stored in another storage apparatus in accordance with a backup process. Therefore, in the embodiment, the computer virus-infected old clone-source file OF is deleted.

Thus, in the embodiment, a clone-source file OF2, which is not infected with a computer virus, can be obtained, and the clone file configuration can be reconfigured in accordance with configuring a new clone-source file OF2 based on the clone files. This makes it possible to restore security and to more efficiently eliminate duplicated data.

In the embodiment, since the need for virus scan processing is determined on the basis of the clone file reference status, wasteful virus scan processing can be curbed while ensuring security. Therefore, it is possible to prevent an increase in system load and to curb a drop in response performance. The embodiment will be explained in more detail below.

EXAMPLE 1

Figure 2:
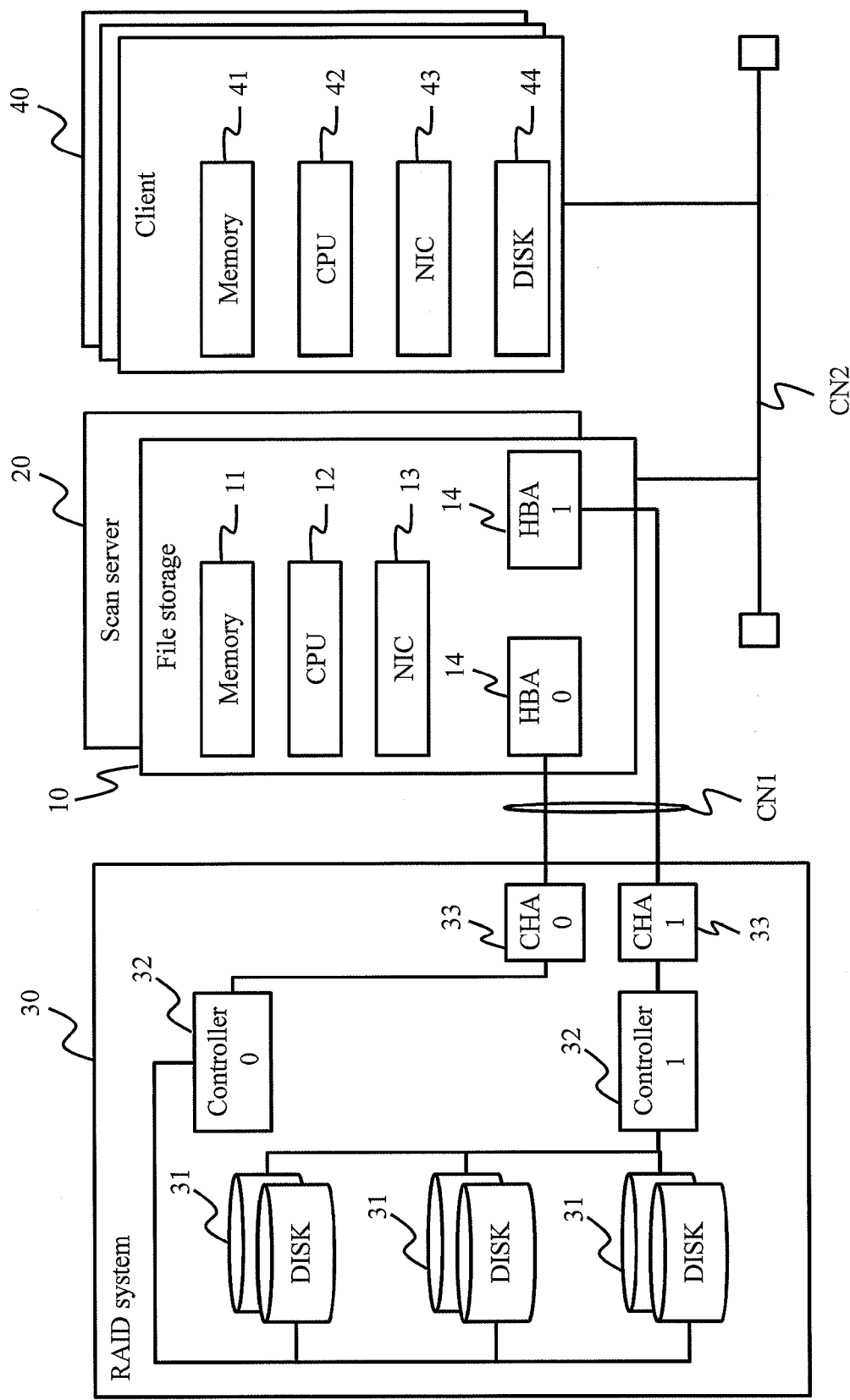
FIG. 2 is a hardware block diagram of a storage system.
Figure 3:
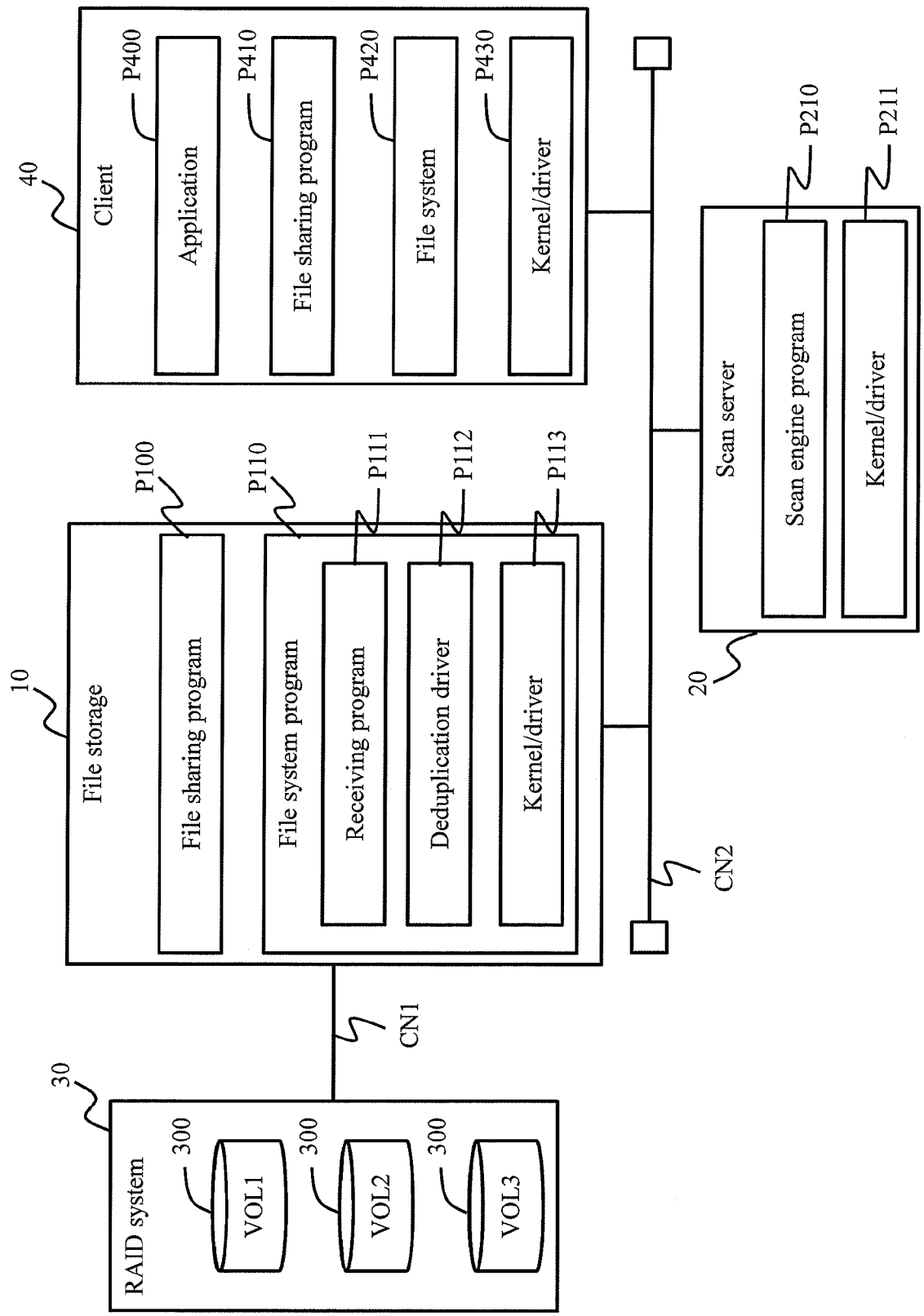
FIG. 3 is a software block diagram of the storage system.

FIG. 2 is a hardware block diagram showing the overall configuration of the storage system. FIG. 3 is a software block diagram of the storage system.

The storage system, for example, comprises at least one file storage apparatus 10, at least one scan server apparatus 20, at least one RAID (Redundant Array of Inexpensive Disks) system 30, and at least one client apparatus 40. Hereinbelow, the file storage apparatus 10 will be abbreviated as file storage 10, the scan server apparatus 20 will be abbreviated as scan server 20, and the client apparatus 40 will be abbreviated as client 40.

The file storage apparatus 10 and the RAID system 11, for example, are coupled via a communication network CN1, such as a FC-SAN (Fibre Channel-Storage Area Network) or a IP-SAN (Internet Protocol-SAN). The file storage 10, the scan server 20, and the client 40 are coupled via a communication network CN2, such as a LAN (Local Area Network). These communication networks CN1 and CN2 may be configured as a shared communication network.

The file storage apparatus 10, for example, comprises a memory 11, a microprocessor (CPU: Central Processing Unit in the drawing) 12, a NIC (Network Interface Card) 13, and a HBA (Host Bus Adapter) 14.

The CPU 12 realizes prescribed functions, which will be explained further below, by executing prescribed computer programs P100, P110, P111, P112, and P113 stored in the memory 11. The memory 11 can comprise a primary storage memory, a flash memory device, and a hard disk device.

The NIC 13 is a communication interface circuit for the file storage apparatus 10 to communicate with the scan server 20 and the client 40 via the communication network CN2. The HBA 14 is a communication interface circuit for the file storage apparatus 10 to communicate with the RAID system 30.

The scan server 20 can be configured as a stand-alone computer apparatus the same as the file storage 10. In accordance with this, the scan server 20 comprises a memory, a microprocessor and a NIC the same as was described with respect to the file storage 10. The scan server 20 does not need to communicate with the RAID system 30 since a scan-target file is received by way of the file storage 10. Therefore, the scan server 20 need not comprise a HBA.

The RAID system 30 manages the data of a file group, which is managed by the file storage apparatus 10, as block data. The RAID system 30, for example, comprises multiple storage apparatuses 31, multiple controllers 32, and multiple channel adapters (CHA) 33.

The storage device 31, for example, is configured as a hard disk device, a flash memory device, a FeRAM (Ferroelectric Random Access Memory), a MRAM (Magnetoresistive Random Access Memory), a phase-change memory (Ovonic Unified Memory), or a RRAM (Resistance RAM: registered trademark).

The controller 32 reads/writes data from/to the storage device 31 in accordance with a request from the file storage 10. The CHA 33 is a communication control circuit for controlling communications between the file storage apparatus 10 and the RAID system 30. The controller 32 and the CHA 33 comprise redundant configurations.

The configuration of the client 40 will be explained. The client 40, for example, comprises a memory 41, a microprocessor 42, a NIC 43, and a storage device 44. The client 40 can be configured as a server computer, or can be configured as either a personal computer or a hand-held information terminal (to include a cell phone).

An application program P400, which will be explained further below, is stored in the memory 41 and/or the storage device 44. The CPU 42 executes an application program or the like, and uses a file, which is managed by the file storage apparatus 10. The client 40 communicates with the file storage apparatus 10 via the NIC 43.

The software configuration of the storage system will be explained by referring to FIG. 3. The file storage apparatus 10, for example, comprises a file sharing program P100 and a file system program P110. The file system program P110, for example, can comprise a receiving program P111, a deduplication driver P112, and a kernel & driver P113.

The operation of each program will be explained further below, but simply stated, the file sharing program P100, for example, is software for providing a file sharing service to the client 40 by using a communication protocol such as CIFS (Common Internet File System) or NFS (Network File System).

The file system program P110 is software for managing a file system. A file system is a logical structure built on a logical volume for realizing a management unit called a file.

The receiving program P111 is software for receiving a file access request from the client 40, performing a prescribed process, and returning the result thereof. The deduplication driver P112 is software for selecting a single instance candidate to which a single instance process is to be applied, and performing single instance processing for the selected single instance candidate. The elimination of duplication by managing data, which is shared in common among multiple files, in a single file is called single instance processing.

The kernel & driver P113 are software for controlling the entire file storage apparatus 10. The kernel & driver P113, for example, control the schedules of multiple programs (processes) running on the file storage apparatus 10, and control an interrupt from a piece of hardware.

The RAID system 30 comprises multiple logical volumes 300. The logical volumes 300, which are logical storage devices, can be created by consolidating the physical areas of the multiple storage devices 31 into a single physical storage area, and forming storage areas of a prescribed size from the consolidated physical storage area.

The scan server 20 comprises a scan engine program P210 and a kernel & driver P211. The scan engine program P210 comprises a virus definition file T20 (refer to FIG. 10). The scan engine program P210 checks for the presence or absence of a computer virus by comparing data in a file received from the file storage 10 with virus patterns stored in the virus definition file T20. Hereinbelow, computer virus may be abbreviated as virus. The process for checking for the presence or absence of a computer virus is called a virus scan process.

The client 40, for example, comprises an application program (hereinafter abbreviated as application) P400, a file sharing program P410, a file system P420, and a kernel & driver P430. The application 400, for example, is configured as a document preparation program, a customer management program, a database management program, or an image distribution program.

Figure 4:
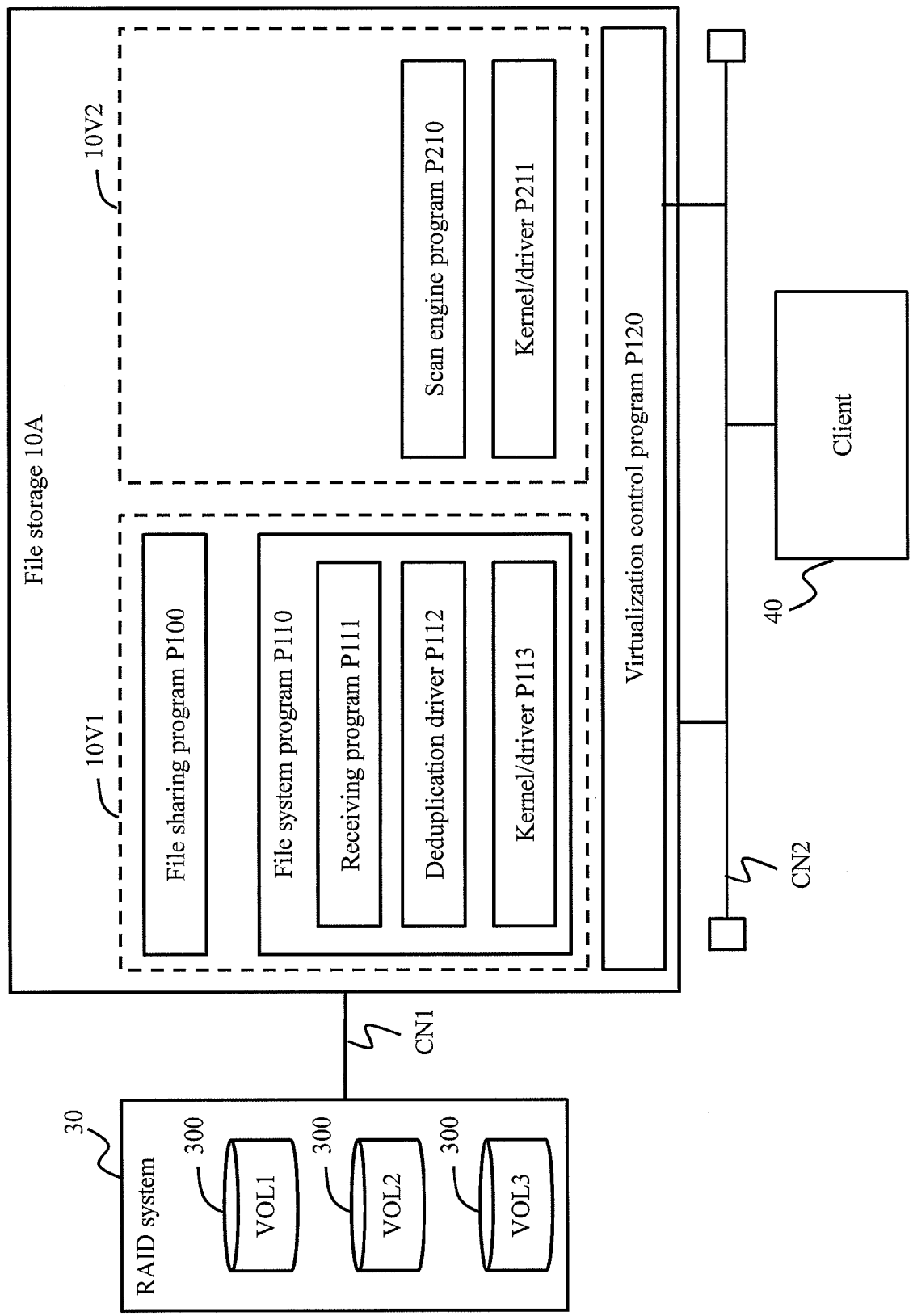
FIG. 4 is an illustration showing another configuration of the storage system.

As shown in FIG. 4, the configuration may be such that the scan server 20 is disposed inside the file storage 10A. For example, a virtualization control program P120 for controlling virtualization is disposed in the file storage 10A, and this virtualization control program P120 creates multiple virtual machines 10V1 and 10V2. The one virtual machine 10V1 is used as a file storage, and the other virtual machine 10V2 is used as a scan server. As mentioned hereinabove, the virus scan function may be built into the file storage 10A.

Figure 5:
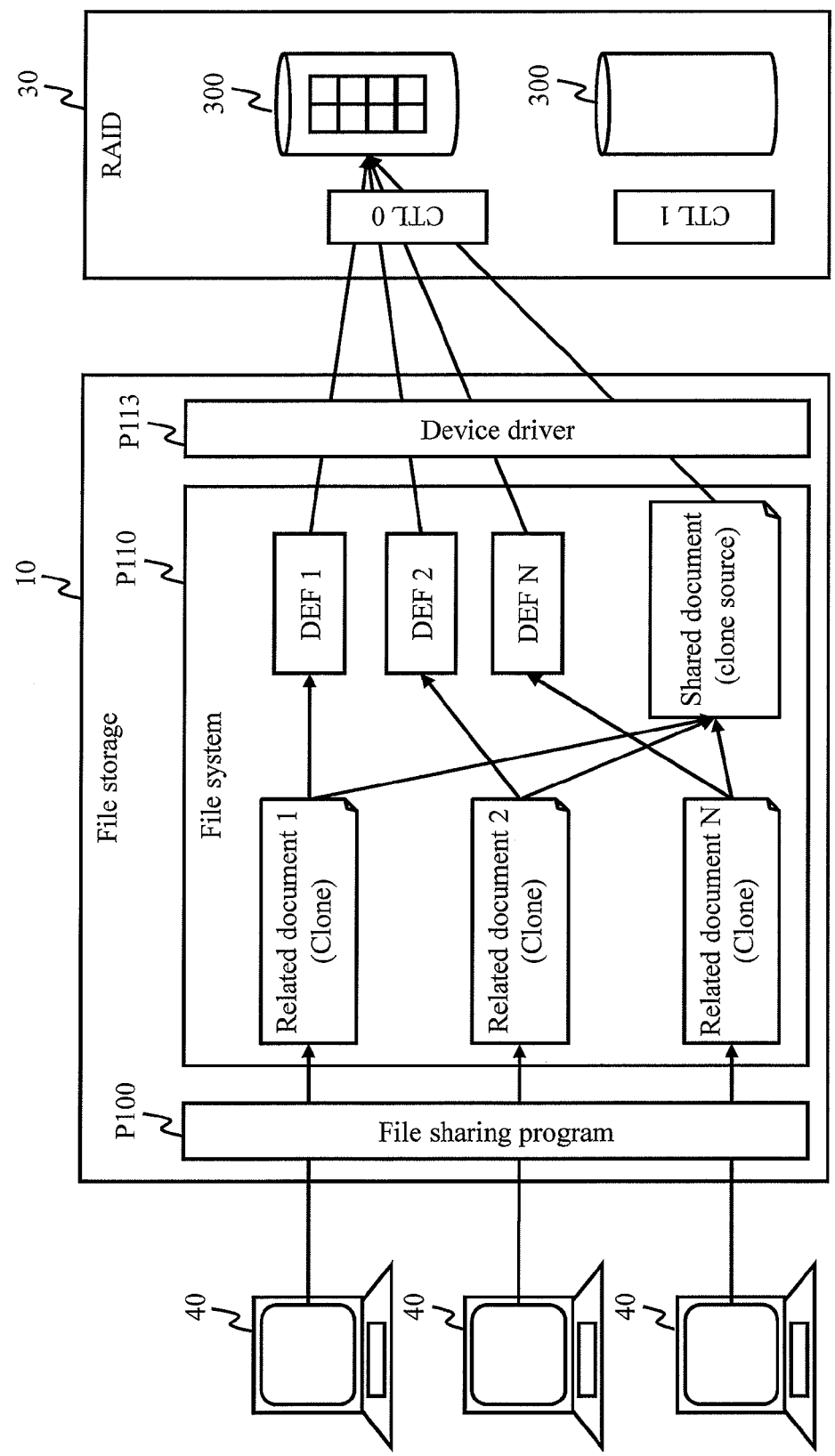
FIG. 5 is a schematic diagram of a case in which the embodiment is applied to a document management system.

FIG. 5 shows an example of a case in which a storage system comprising the single instance function has been applied to a document management system. The file system P110 of the file storage apparatus 10 manages a shared document, which is shared in common by multiple clients 40, and multiple related documents derived from the shared document.

A related document derived from the shared document is a clone file, which references the shared document as a clone-source file. The data of the respective related documents is replaced by references to the shared document in the same locations as the data of the shared document. Thus, in a case where multiple users create related documents based on the shared document, creating each related document as a clone file makes it possible to use the storage area efficiently. Furthermore, the storage system of the embodiment can also be applied to another system besides a document management system.

Figure 6:
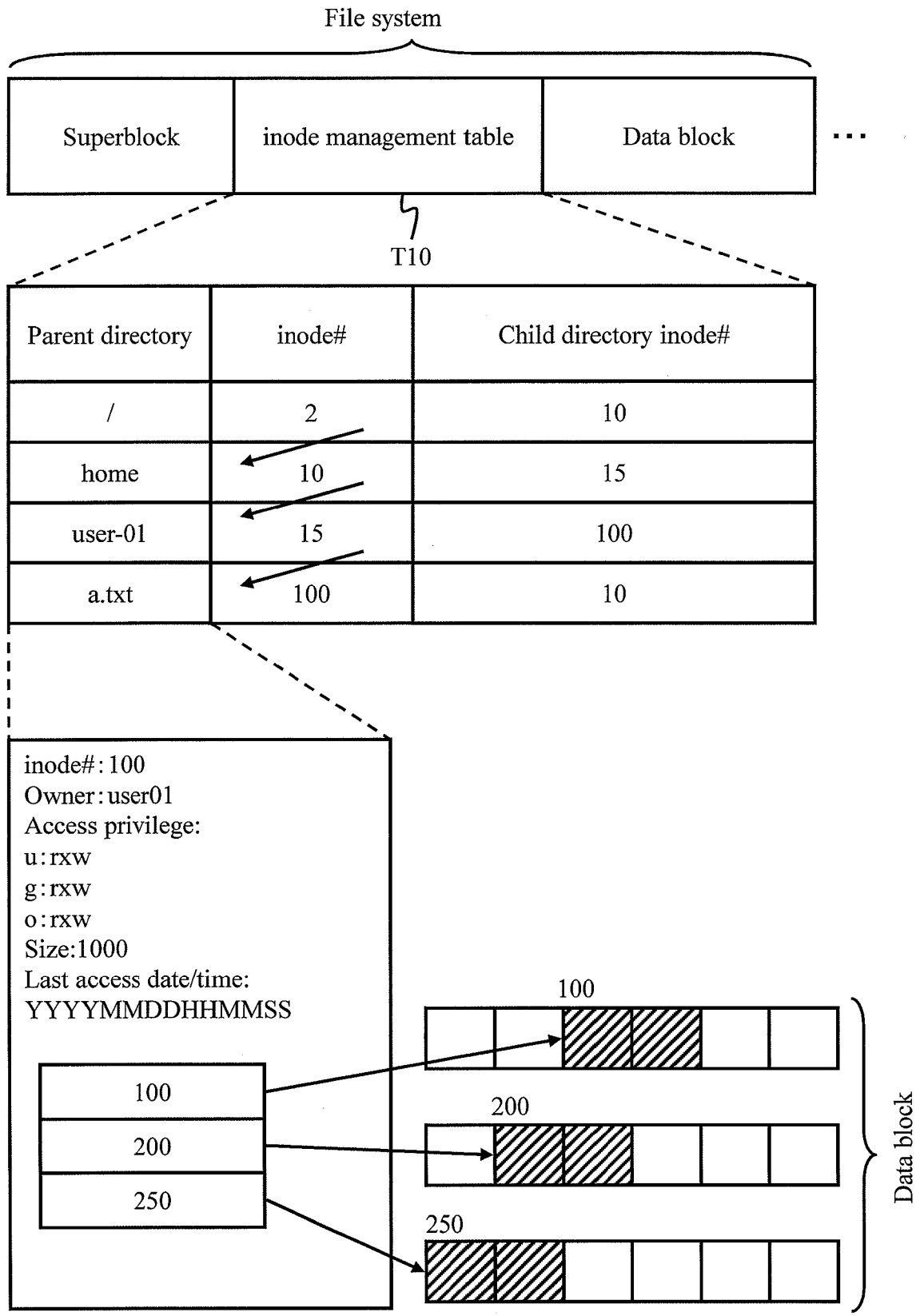
FIG. 6 is an illustration showing the relationship between a file system and an inode management table.

FIG. 6 is a simplified illustration showing the relationship between a file system and an inode management table T10. As shown in the top part of FIG. 6, the file system, for example, is configured from a superblock, an inode management table T10, and a data block.

The superblock, for example, is an area for collectively storing file system management information, such as the file system size and the free capacity of the file system. The inode management table T10 is management information for managing an inode configured for each file.

The file system correspondingly manages one inode for each directory or file. Of the respective entries in the inode management table T10, the entry, which comprises only directory information, is called the directory entry. Using the directory entry to trace a file path makes it possible to access an inode in which a targeted file is stored. For example, as shown in FIG. 6, in the case of "/home/user-01/a.txt", it is possible to access the data block of a target file by tracing inode #2->inode #10->inode #15->inode #100 in that order.

The inode ("a.txt" in the example of FIG. 6), in which a file entity is stored, for example, comprises information, such as file ownership, an access privilege, a file size, and a data storage location. In the bottom part of FIG. 6, the reference relationship between an inode and a data block is shown. The numerals 100, 200, and 250 accompanying the data blocks in FIG. 6 show block addresses. The "u" displayed in the item access privilege is an abbreviation for user, the "g" is an abbreviation for group, and the "o" is an abbreviation for a person other than the user. In addition, the "r", "x", and "w" shown in the item access privilege are the abbreviations for read, execute, and write, respectively. The last access date/time is recorded as a combination of the year (four digits), month, day, hour, minute, and second.

Figure 7:
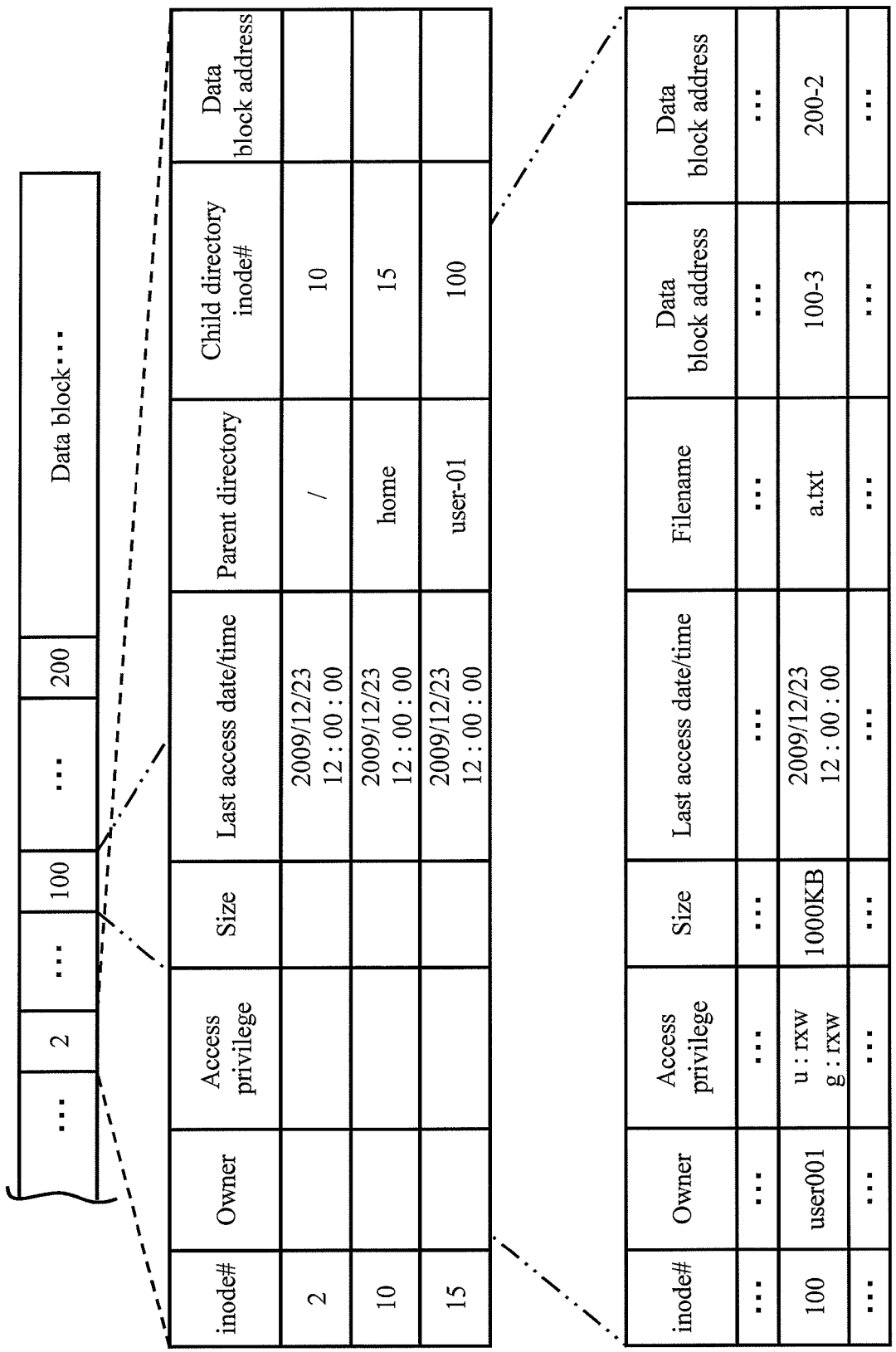
FIG. 7 is an illustration showing the inode management table in detail.

FIG. 7 shows a state in which an inode is stored in the inode management table. In FIG. 7, inode numbers "2" and "100" are used as examples.

Figure 8:
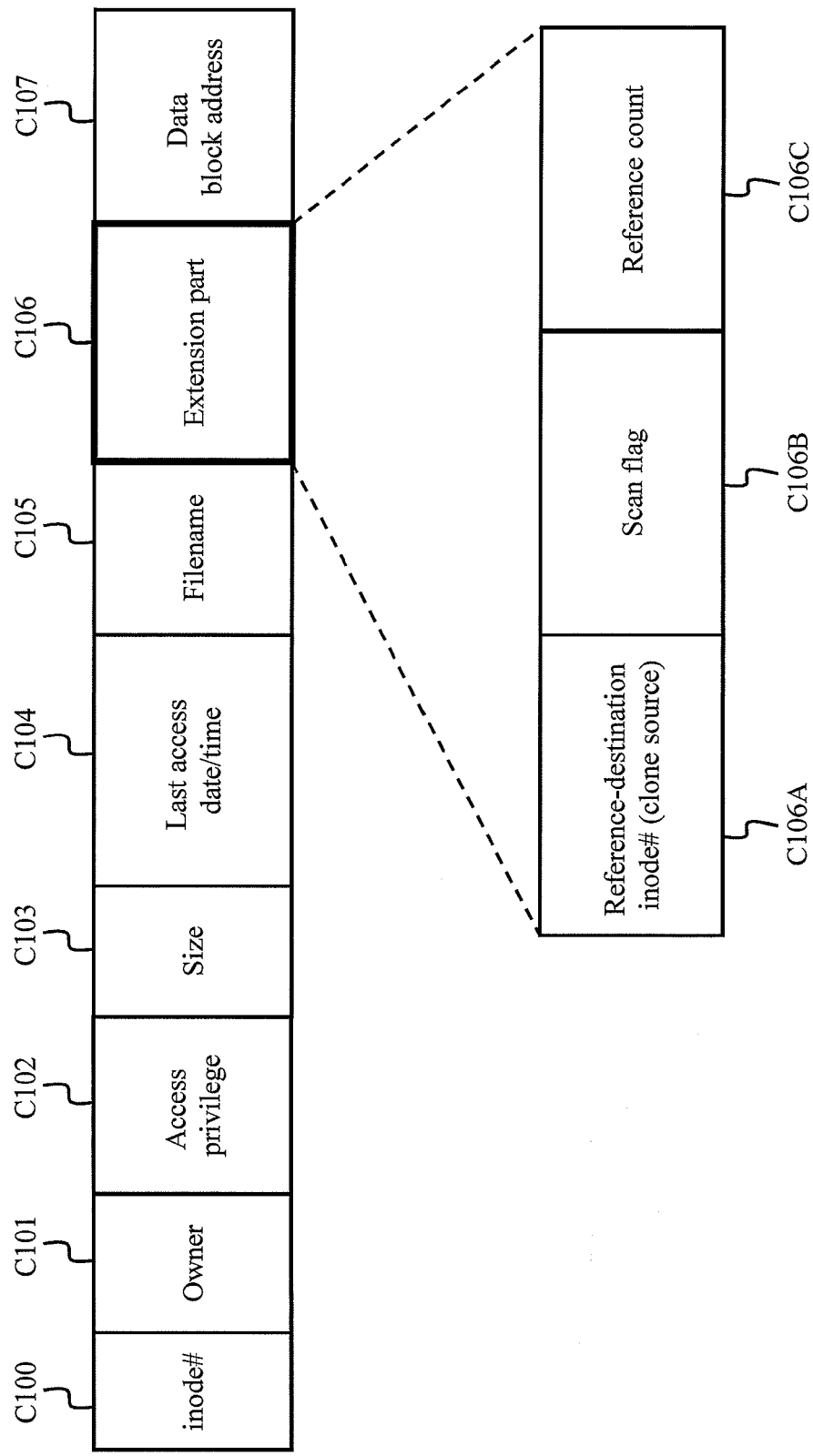
FIG. 8 is an illustration showing an extension part of the inode management table.

FIG. 8 is an illustration showing a configuration in which a part C106 has been added to the inode management table T10 in this example. The inode management table T10, for example, comprises an inode number C100, an owner C101, an access privilege C102, a size C103, a last access date/time C104, a filename C105, an extension part C106, and a data block address C107.

The extension part C106 is a characteristic part, which is added for this example, and, for example, comprises a reference-destination inode number C106A, a scan flag C106B, and a reference count C106C.

The reference-destination inode number C106A is information for identifying the reference-destination inode of a piece of data. In the case of a clone file, the inode number of the clone-source file is configured in the reference-destination inode number C106A. In the case of a clone-source file, a value is not configured in the reference-destination inode number C106A. This is because a reference destination does not exist.

The scan flag C106B is information showing whether or not a virus scan process has ended. In a case where the virus scan process has ended, ON is configured in the scan flag, and in a case where the virus scan process has not ended, OFF is configured in the scan flag.

The reference count C106C is information for managing the life of a clone-source file. The value of the reference count C106C is incremented by 1 each time a clone file, which references the clone-source file, is created. Therefore, for example, "5" is configured in the reference count C106C for a clone-source file, which is referenced by five clone files.

The value of the reference count C106C is decremented by one when a clone file, which references the clone-source file, is deleted. Therefore, in the case of the example given above, the value of the reference count C106C becomes "4" when one clone file is deleted. In a case where the reference count C106C value is 0, the clone-source file is deleted. In this example, in a case where the clone files, which reference the clone-source file, cease to exist, the clone-source file is deleted, and free space is increased.

FIG. 9 shows an example of the configuration of a scan cache table T11 of the file storage 10. Hereinbelow, scan cache table T11 may be abbreviated as scan cache T11. The scan cache table T11 correspondingly manages a virus scan status C111, a scan result C112, and a repair status C113 for each file targeted for file storage 10 management.

The virus scan status C111 is information showing whether or not a virus scan process has been executed for a file identified in a file pathname C110. The scan result C112 shows the result of a virus scan process. The results of scan processes, for example, include "not infected" and "infected".

The repair status C113 is information showing the status of a repair. For example, "repaired", "irreparable", "access prohibited", and "access partially prohibited" can be given as the repair status. "Repaired" signifies that a virus has been removed and a file has been restored to the normal state (a non-infected state). "Irreparable" signifies a state in which a virus cannot be removed. For example, in the case of a clone-source file, a computer virus cannot be directly removed because the clone-source file is referenced by a clone file. "Access prohibited" signifies that access is prohibited to a file from which a virus is unable to be removed. "Access partially prohibited" signifies that, of the file data, access is prohibited to data, which has been determined to be infected with a virus, and access is allowed to data other than that (data not infected with a virus).

FIG. 10 is an illustration showing an example of the configuration of the virus definition file T20 stored by the scan server 20. The virus definition file T20 correspondingly manages multiple virus names, virus patterns, and an add flag showing whether or not a new virus has been added to the virus definition file.

Figure 11:
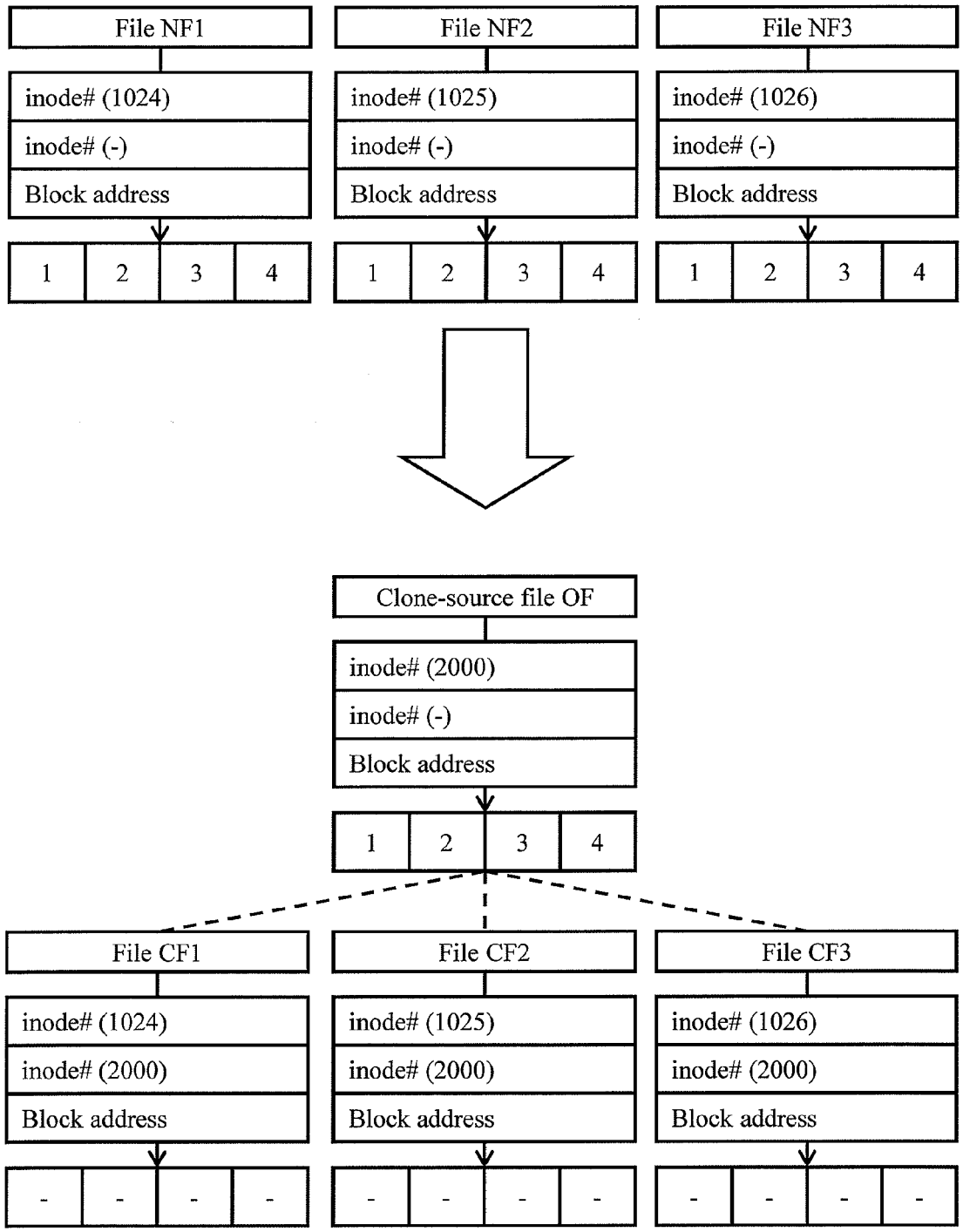
FIG. 11 is an illustration showing an overview of a single instance process.

FIG. 11 shows how a file (a normal file), which has been selected as a candidate for single instance processing, is converted to a clone file. Clone-candidate files NF are shown in the top portion of FIG. 11, a clone-source file OF is shown in the center portion of FIG. 11, and clone files CF are shown in the bottom portion of FIG. 11. A portion of the metadata is shown in FIG. 11 for convenience sake.

The data of the clone-candidate file NF and the clone-source file OF are both "1234", and both data match completely. Consequently, as shown in the bottom portion of FIG. 11, the file storage 10 deletes the data of the clone-candidate file NF and replaces this data with information for referencing the data of the clone-source file OF. A "-" is displayed in a replaced data block.

In addition, the file storage 10 configures "2000", which is the inode number of the clone-source file, in the reference-destination inode number of the clone-candidate file. In accordance with this, the clone-candidate file NF is converted to a clone file CF, which references the clone-source file OF. Since all the data of the clone file data matches the data of the clone-source file and references the clone-source file data, duplicated data can be eliminated in units of data blocks.

Figure 12:
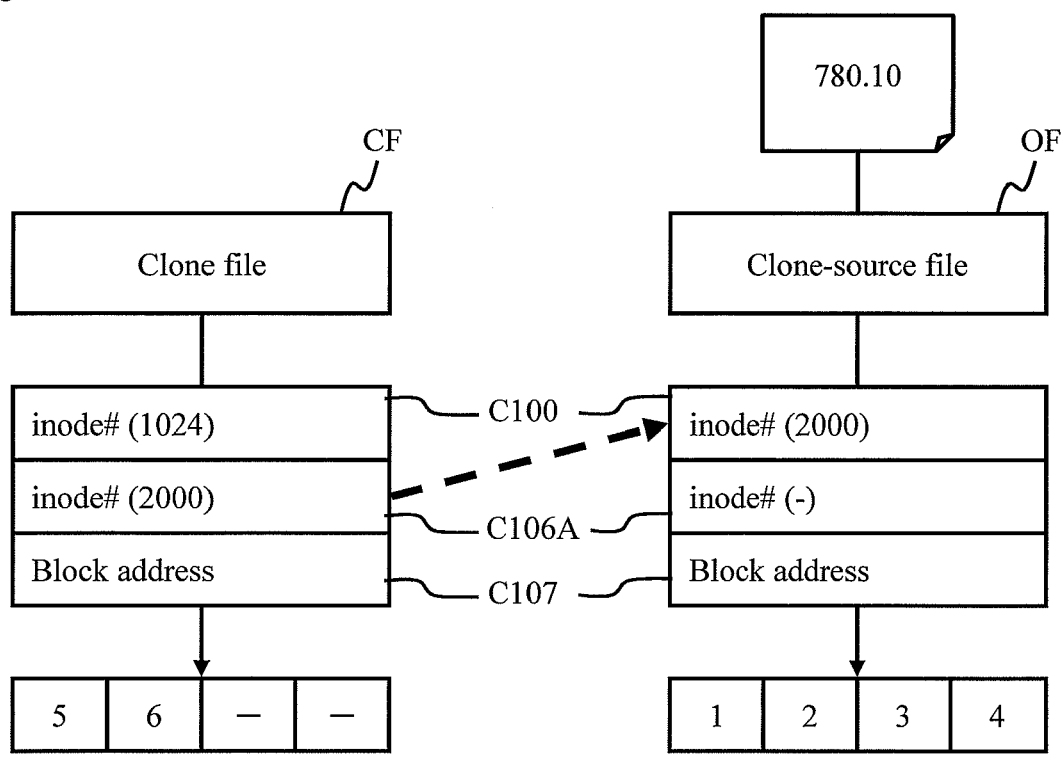
FIG. 12 is an illustration showing how a clone file stores only difference data with respect to a clone-source file.

FIG. 12 shows a case in which a clone file CF has been updated. There may be cases in which a clone file CF is updated by the client 40, and in part ceases to match the data of the clone-source file OF. In accordance with this, the clone file CF stores only the difference data with respect to the clone-source file OF. In the example of FIG. 12, the data of the two data blocks at the head of the clone file CF are updated from "1" and "2" to "5" and "6". Consequently, the clone file CF stores only the "5" and "6", which are the difference data, and continues to reference the clone-source file for the other data "3" and "4".

Furthermore, although not particularly shown in the drawing, either one or both of the clone-source file and the clone file may be compressed using a run-length or other such data compression method. Data compression makes it possible to use the storage area of the file storage 10 even more efficiently.

Figure 13:
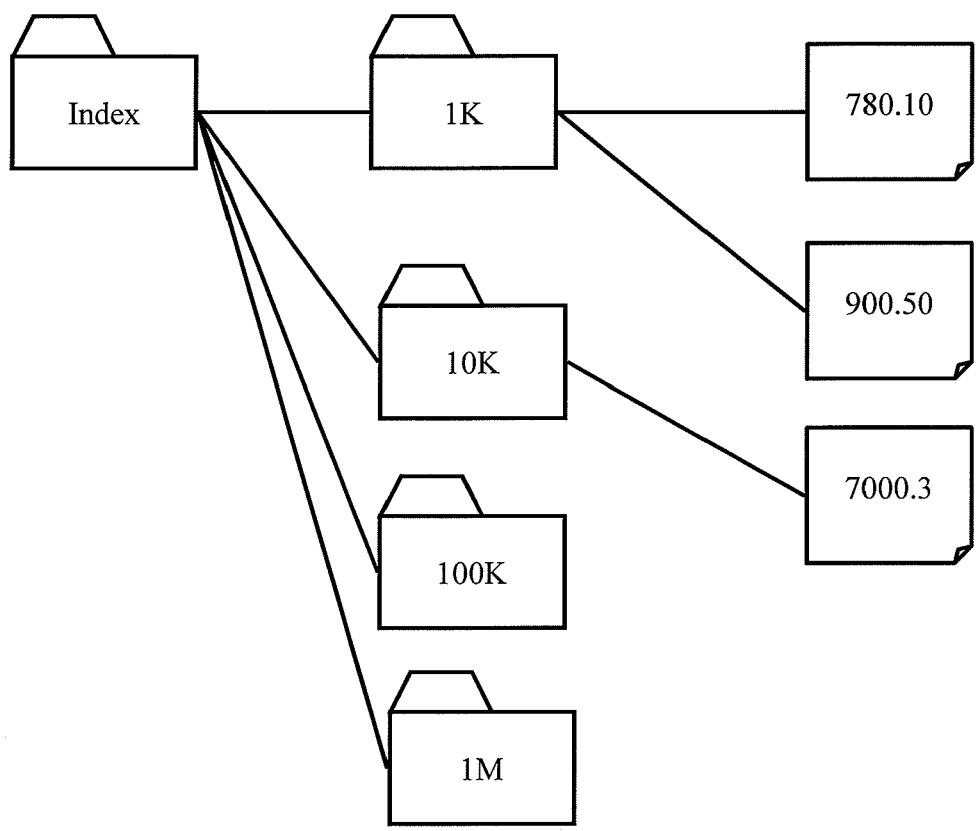
FIG. 13 is an illustration showing storage locations of a clone-source file.

FIG. 13 is an illustration showing a clone-source file management method. The clone-source file, as described hereinabove, is an important benchmark file for storing data, which is referenced by one or multiple clone files. Therefore, in this example, the clone-source file is managed under a special directory, which is not accessible by the user, in order to protect the clone-source file from user operational errors. This special directory is called an index directory in this example.

For example, a subdirectory is disposed in the index directory for each file size ranking, such as "1K", "10K", "100K", and "1M". The clone-source file is managed under the subdirectory corresponding to its own file size. The filename of the clone-source file, for example, is created as a combination of the file size and the inode number.

For example, the filename of a clone-source file with a file size of 780 bytes and an inode number of 10 is "780.10". Similarly, the filename of a clone-source file with a file size of 900 bytes and an inode number of 50 is "900.50". These two clone-source files "780.10" and "900.50" are managed under subdirectory "1 KB" for managing a clone-source file of less than 1 KB.

The filename of a clone-source file with a file size of 7000 bytes and an inode number of 3 is "7000.3", and is managed under subdirectory "10 KB" for managing a clone-source file having a file size of equal to or larger than 1 KB but less than 10 KB.

Thus, in this example, the clone-source file is categorized and stored in a subdirectory by file size, and, in addition, has a combination of file size and inode number as a filename. Therefore, a clone-source file, which is to be compared with a clone-candidate file (a file as a candidate for single instance processing), can be selected quickly, and collation processing can be completed in a relatively short period of time.

The filename of the clone-source file, for example, may be created from a combination of the file size and a hash value, or a combination of the file size, the inode number, and a hash value instead of the combination of the file size and the inode number. The hash value is obtained by inputting the clone-source file data to a hash function.

Figure 14:
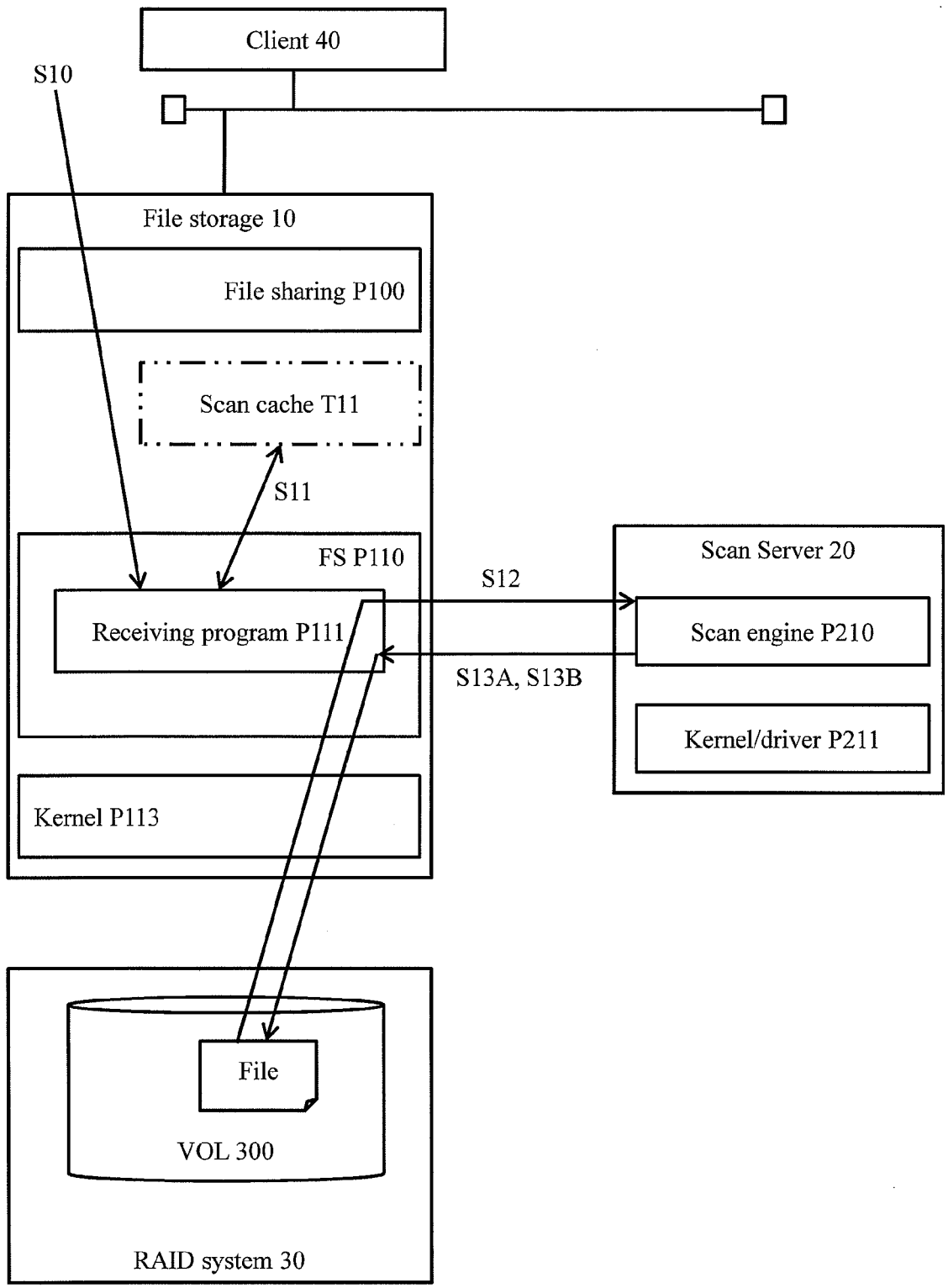
FIG. 14 is an illustration showing an overview of processing in a case where a client has started accessing a file.

FIG. 14 is an illustration showing an overview of a virus scan at the start of a file access. The file storage 10, upon receiving a request from the client 40 to open a file (S10), collates the data registered in the scan cache T11 with the access-target file, and determines whether or not the relevant file has been scanned (S11).

In a case where, as a result of collation, a determination is made that the access-target file has been scanned, the file storage 10 executes a process for opening the file. In a case where, as a result of collation, a determination is made that the access-target file has not been scanned, the file storage 10 acquires the access-target file from the RAID system 30 via the file system P110, and sends this file to the scan server 20 (S12).

In a case where, as a result of a virus scan by the scan server 20, it has been determined that the access-target file is not infected with a virus, the file storage 10 registers the scan result in the scan cache T11, and executes the process for opening the file (S13A).

In a case where, as a result of the virus scan, it is determined that the access-target file is infected with a virus, the scan server 20 repairs the virus-infected file. In a case where the repair succeeds, the scan server 20 sends the repaired file to the file storage 10. In a case where repair is not possible, the scan server 20 sends the file storage 10 a message to the effect that repair is not possible (S13B). Hereinbelow, a file, which is infected with a computer virus, may be called an infected file. A file, which is not infected with a computer virus, may be called a non-infected file.

The file storage 10, in a case where a repaired file has been received from the scan server 20, executes the process for opening the file after overwriting the infected file with the repaired file, and updates the scan cache T11. Alternatively, in a case where a message that repair is not possible has been received from the scan server 20, the file storage 10 prohibits access to the infected file, and returns an error to the client 40 indicating that the file opening process cannot be performed.

Figure 15:
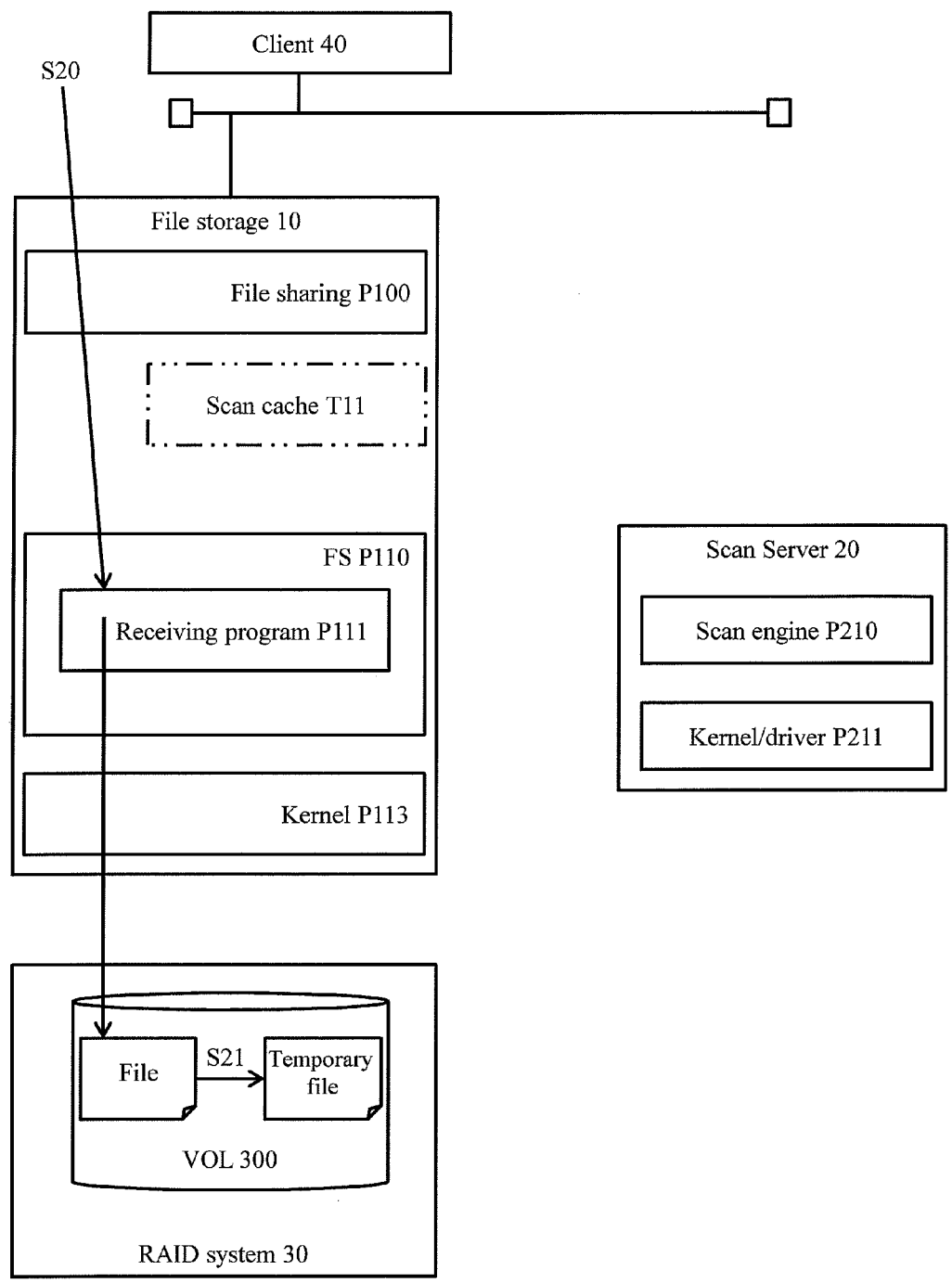
FIG. 15 is an illustration showing an overview of processing in a case where a client accesses a file to perform a read/write.

FIG. 15 shows an overview of a case in which the access-target file is either referenced or updated after the file-opening process has been completed. The file storage 10, upon receiving a write request from the client 40 (S20), creates and stores a file prior to the access-target file being updated as a temporary file (S21). This is because the temporary file will be used to execute a restore process in a case where it is determined that this file was infected with a virus after file updating by the client 40. That is, the temporary file is created to return an infected file to a pre-virus-infected file. The temporary file is deleted it is no longer needed.

Figure 16:
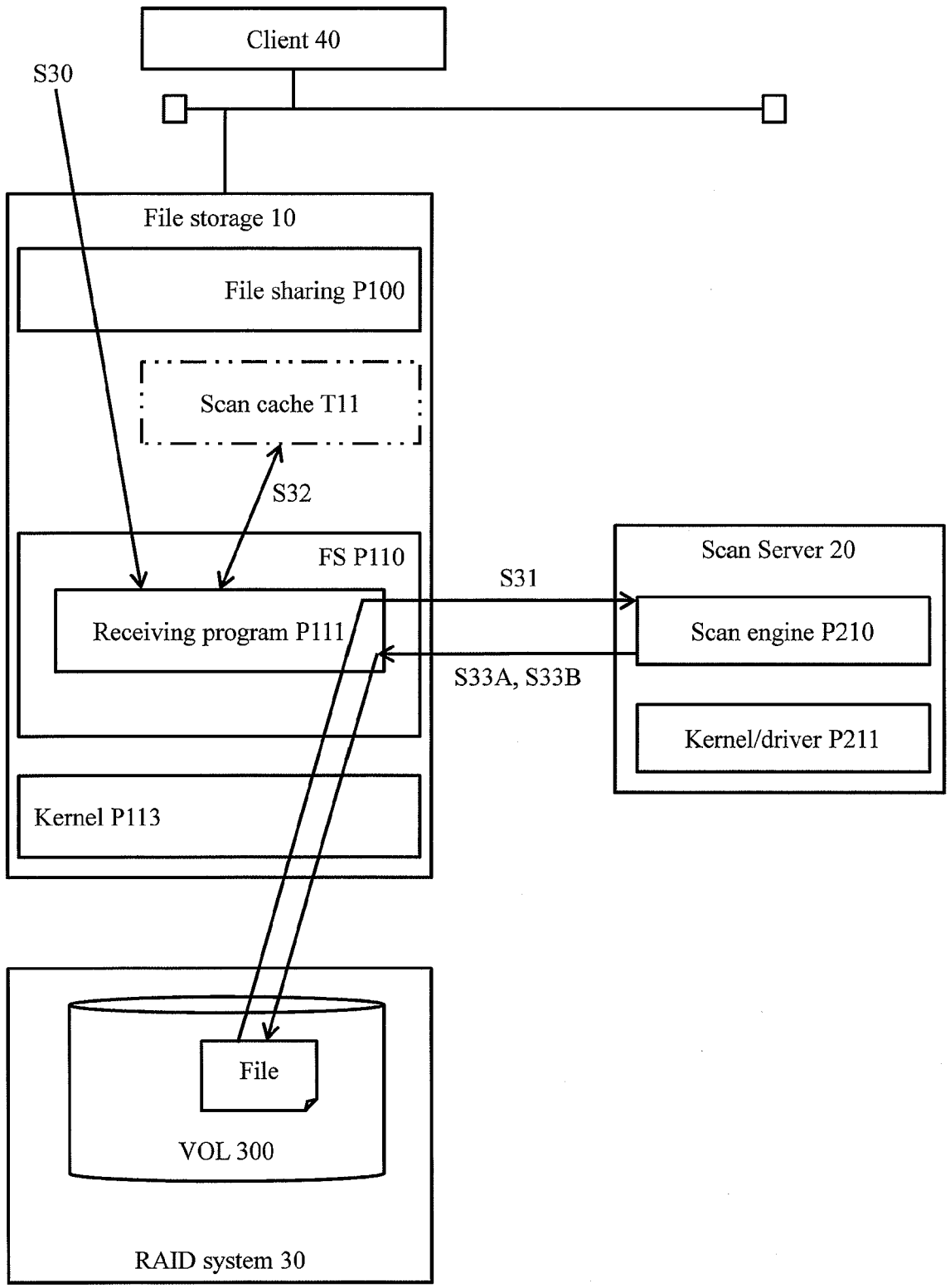
FIG. 16 is an illustration showing an overview of processing in a case where a file access by a client has ended.

FIG. 16 is an illustration showing an overview of a virus scan process executed when a file access has ended.

The file storage 10, upon receiving a request from the client 40 to close a file (S30), sends the requested file to the scan server 20 (S31). In a case where, as a result of a virus scan, it is determined that the requested file is not infected with a virus, the file storage 10 registers the scan result in the scan cache T11 (S32), executes a file-closing process, and thereafter, deletes the temporary file.

In a case where, as a result of the virus scan, it is determined that the requested file is infected with a virus, the scan server 20 repairs the file. In a case where the repair succeeds, the file storage 10 overwrites the infected file with the repaired file received from the scan server 20 (S33A). In a case where it is determined that repair is not possible, the file storage 10 performs a restoration using the temporary file created prior to updating, registers the scan result in the scan cache T11, and thereafter, executes the file-closing process (S33B).

Figure 17:
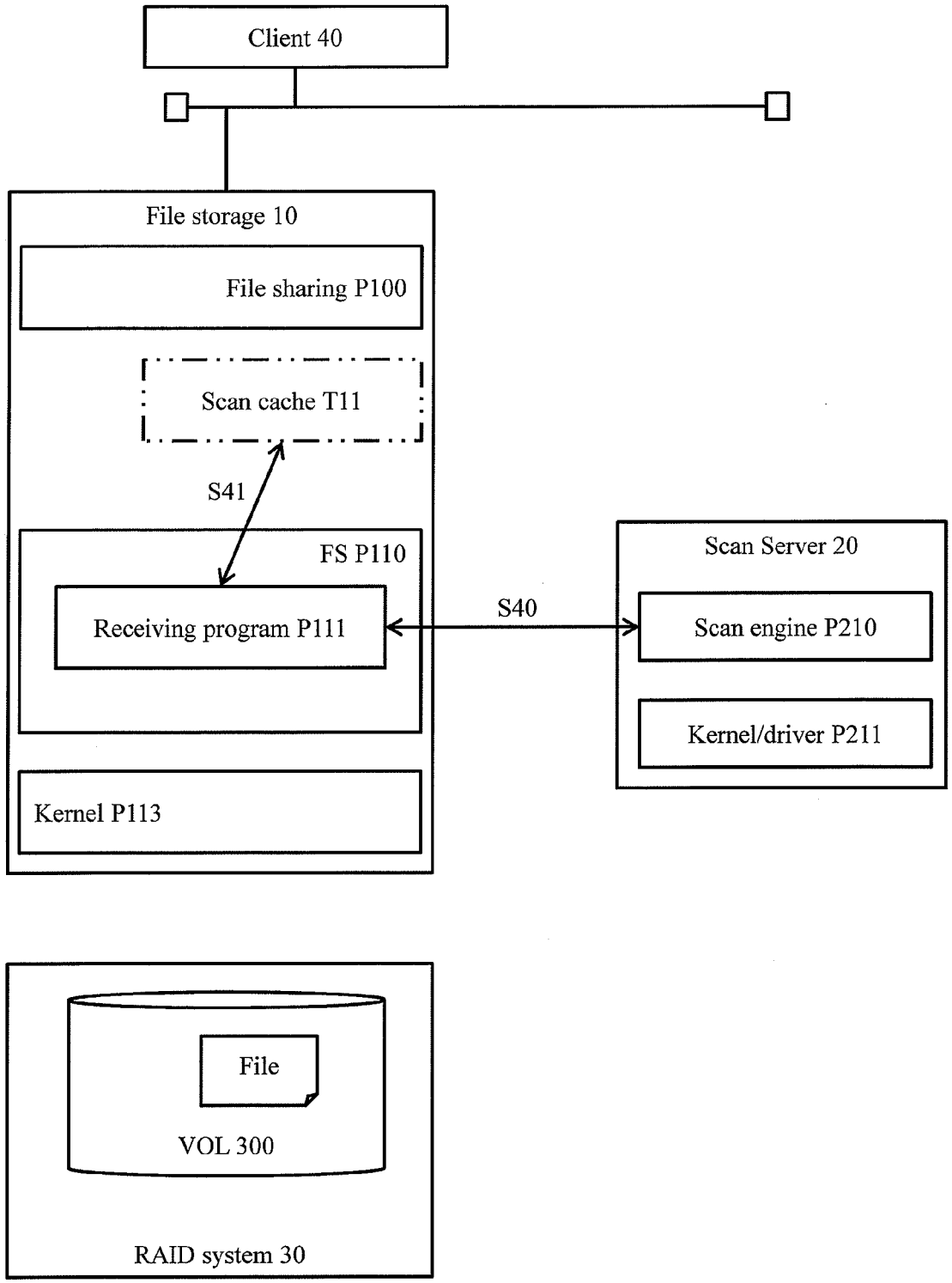
FIG. 17 is an illustration showing an overview of processing in a case where a virus definition file has been updated.

FIG. 17 is an illustration showing an overview of a case in which the storage content of the scan cache T11 is cleared. The file storage 10 regularly queries the scan server 20 as to whether the virus definition file T20 has been updated (S40). The scan server 20 either regularly or irregularly receives a new virus definition file T20 from a management server (not shown in the drawing) for managing the virus definition file.

In a case where the virus definition file T20 has been updated, the file storage 10 clears the storage content of the scan cache T11 (S41). Since the virus definition file 120 has been updated, the file storage 10 deletes all information related to the results of virus scans performed in the past. In accordance with the virus definition file T20 being updated, an infected file, which was irreparable before, may become repairable. When an infected file, which had transitioned to the access prohibited state, is repaired in accordance with the new virus definition file T20, access prohibited is canceled.

An overview of a process for removing a virus from the clone-source file by executing single instance processing in accordance with a prescribed trigger will be explained by referring to FIGS. 18 through 21. First, the disadvantages of a case in which the clone-source file has been infected with a virus will be explained by referring to FIG. 18.

In a case where the clone-source file is infected with a virus, but none of the clone files, which reference this clone-source file, is infected with the virus, the client 40 does not access the virus-infected file. This is because the clone-source file is referenced exclusively by clone files, and cannot be accessed from the client 40.

However, even in a case where there is practically no danger of the client 40 accessing the infected file, a virus-infected clone-source file is not desirable because the infected file (the clone-source file here) could remain in the backup data when a logical volume backup process is executed.

In addition, even when it is clear that the clone-source file is infected with a virus, it is not possible to repair the virus in the clone-source file using normal methods. This is because the clone-source file is a benchmark file, which is referenced by a clone file, and the clone file is configured on the premise that the clone-source file will not change.

Figure 18:
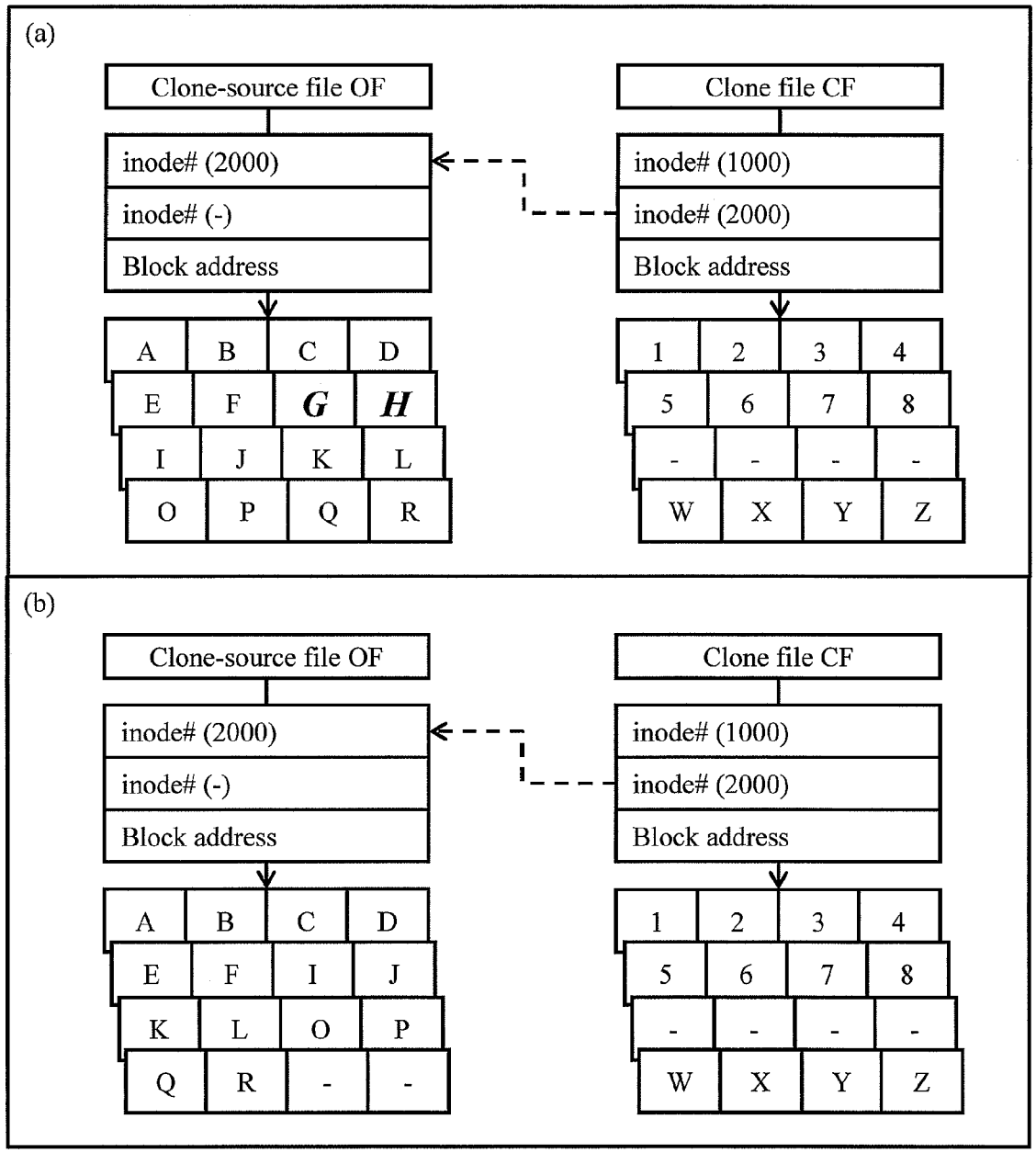
FIG. 18 is a schematic diagram for illustrating the affect on a clone file in a case where infected data has been deleted from a clone-source file.

Consequently, a case in which troubles occur when repairing a clone-source file will be explained by referring to FIG. 18.

As shown in FIG. 18(a), it is assumed that the data of a clone-source file comprises "ABCD", "EFGH", "IJKL", and "OPQR", and the data of a clone file comprises "1234", "5678", "----", and "WXYZ". Of the clone file data "1234", "5678", "----", and "WXYZ", the data "1234", "5678", and "WXYZ" does not exist in the clone-source file, and is data unique to the clone file. Data, which exists only in the clone file, may be called difference data. When the clone-source file data and the difference data is synthesized, the clone file data becomes "1234", "5678", "IJKL", and "WXYZ".

Here, the explanation treats "GH", which is the data in the last two data blocks of the second row of data "EFGH" of the clone-source file, as being infected with a virus.

As shown in FIG. 18(b), in a case where the scan server 20 has deleted the infected data "GH", the clone-source file data changes from "ABCD", "EFGH", "IJKL", and "OPQR" to "ABCD", "EFIJ", "KLOP", and "QR--". The last two "-" signify that data does not exist.

When the infected area of the data is simply deleted, the clone-source file data changes as described above, and a locational deviation occurs with the original data. As a result of this, the clone file data transitions from "1234", "5678", "IJKL", and "WXYZ" to "1234", "5678", "KLOP", and "WXYZ".

Looking at the data in the third row of the clone-source file, what was originally "IJKL" changes to "KLOP" as a result of repairing the clone-source file. Therefore, there is trouble in that (1) the data "OP", which was not being referenced by the clone file, is referenced, (2) the data "IJ", which should be referenced by the clone file, ceases to be referenceable, and (3) the location of the reference data "KL" is shifted. As a result of this trouble, it becomes impossible to accurately reproduce the clone file. Therefore, even in a case where the clone-source file is infected with a virus, the infected area cannot be removed from the clone-source file.

Consequently, in this example, as will be described using FIGS. 19 through 21, the clone-source file is re-created (re-configured) using a clone file, which is not infected with a virus. A clone file, which is not infected with a virus, includes a clone file, which has never been infected with a virus in the first place, and a clone file, which had been infected with a virus, but was repaired in accordance with a virus scan process.

Figure 19:
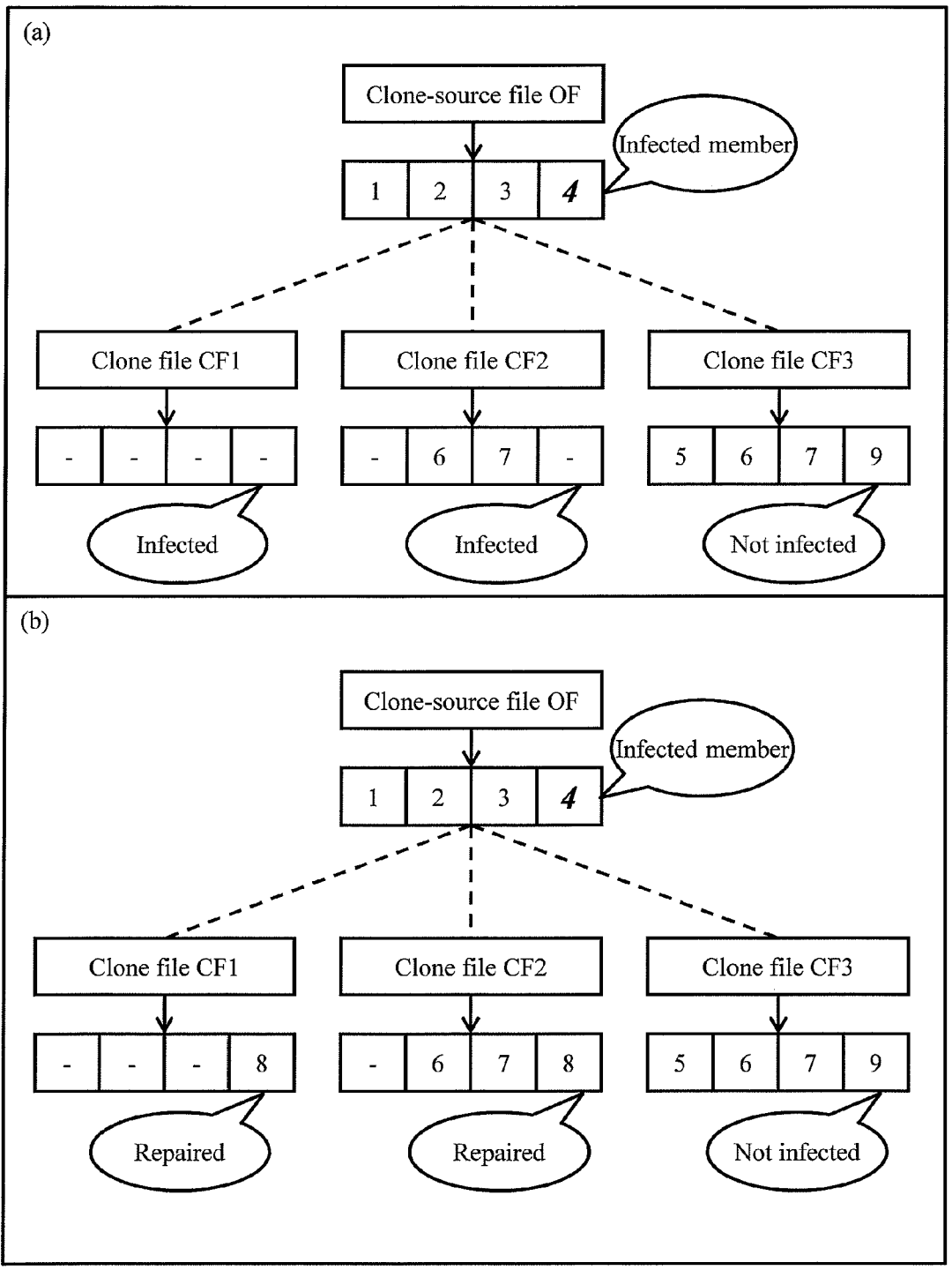
FIG. 19 is an illustration showing how to repair a clone file virus infection.

FIG. 19 shows how a virus is removed from a clone file. FIG. 19(a) shows the state prior to removing the virus. It is assumed that "4", which is the data in the fourth and last data block, of the data "1234" of the clone-source file is infected with a virus.

Three clone files CF1, CF2 and CF3 reference the virus-infected clone-source file. The first clone file CF1 is infected with the virus because it references all the data in the clone-source file. The second clone file CF2 is infected with the virus because it references the clone-source file with respect to the first data block and the fourth data block. The third clone file CF3 is not infected with the virus because it does not reference any of the clone-source file data.

FIG. 19(b) shows the state in a case where the clone files CF1 and CF2 are repaired by removing the virus. The clone files CF1 and CF2 can be repaired by replacing the data "4" of the infected area (the fourth data block) with a normal data "8". The normal data "8" is treated as difference data unique to the clone files. Nothing needs to be done for the clone file CF3 since it is not infected with the virus.

Figure 20:
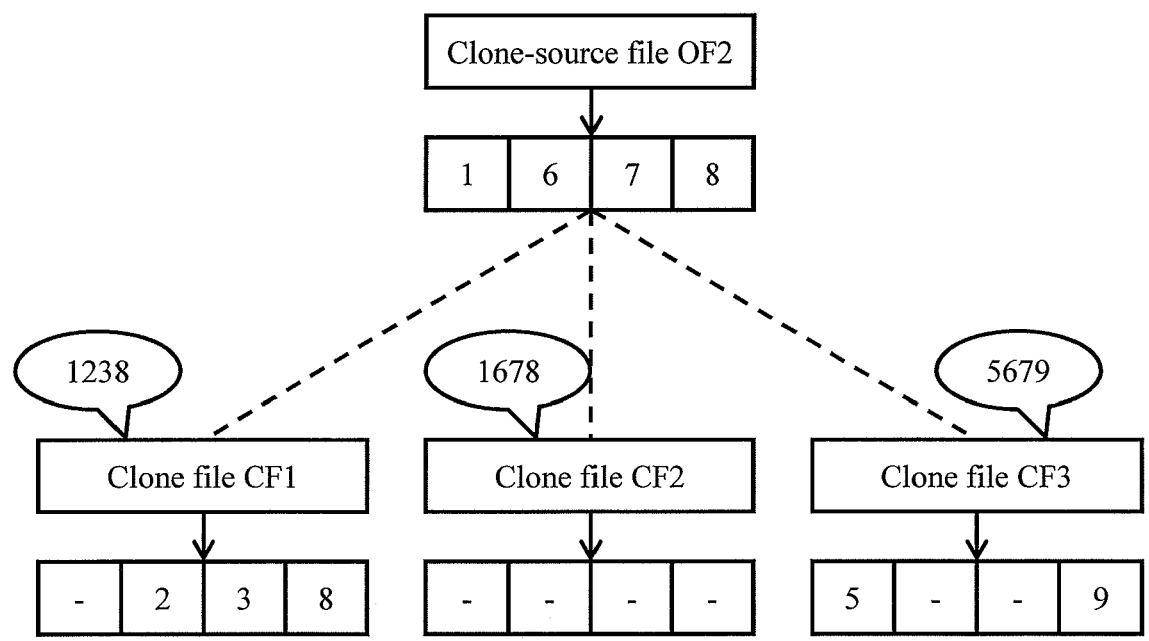
FIG. 20 is an illustration showing how to configure a new clone-source file based on a virus infection-repaired clone file and a clone file, which was not infected with a virus in the first place.

FIG. 20 shows the state after single instance processing has been re-performed. A clone-source file OF2, which is not infected with the virus, can be obtained by creating a new clone-source file OF2 in accordance with a method, which will be explained below using FIG. 21.

Figure 21:
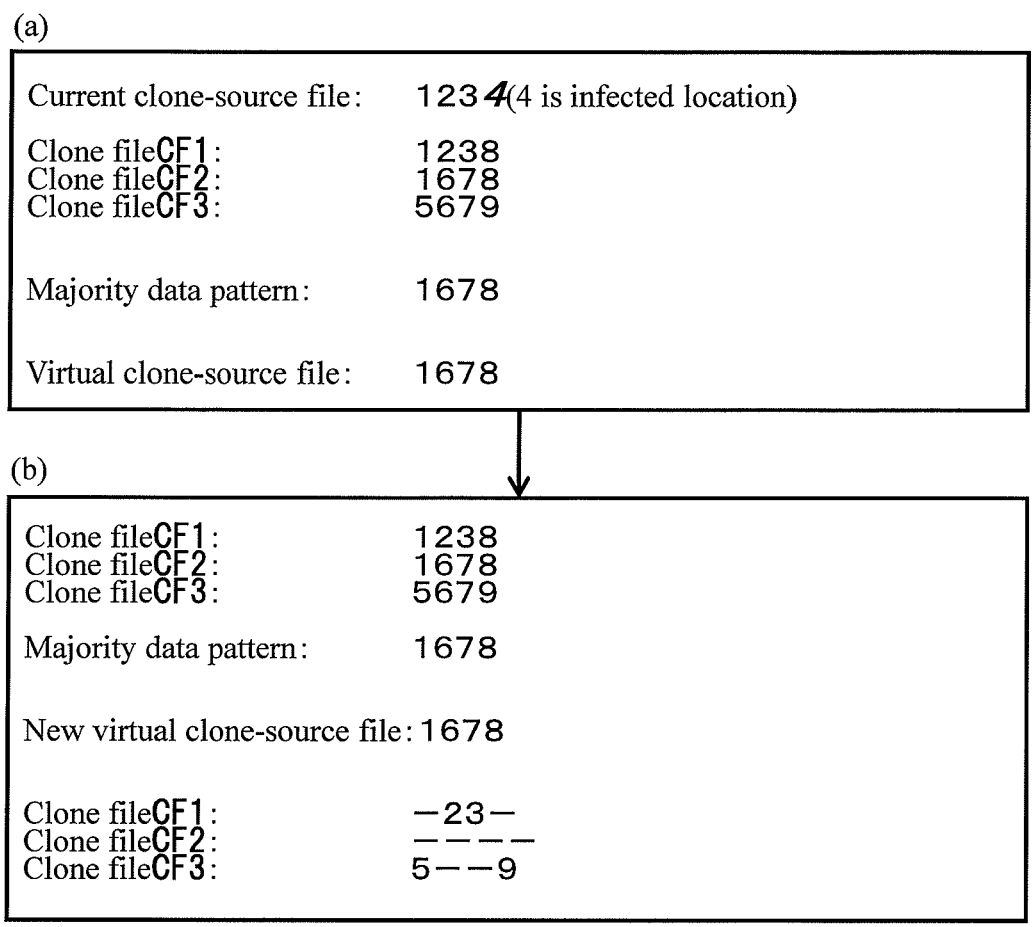
FIG. 21 is an illustration showing how to create a data pattern by selecting data of multiple clone files block-byblock using a majority scheme, and to select the clone file most closely approximating this data pattern as a virtual clone-source file.

FIG. 21 shows an overview of the re-performance of single instance processing. As shown in FIG. 21(a), the first clone file CF1 data is "1238", the second clone file data is "1678", and the third clone file data is "5679".

When the clone files are compared data block by data block, and the most numerous data items are selected one at a time in accordance with majority logic, the data pattern "1678" is obtained. The numerals "1, 2, 3, 4, 5, 6, 7, 8" disclosed in the FIG. 21 are either the data of the data blocks or hash values of the data of the data blocks.

The above-mentioned majority logic data pattern "1678" is obtained by selecting the most numerous data items from among the data of the respective data blocks on a data block by data block basis. Consequently, the file storage 10 selects the clone file CF2, which matches the majority logic data pattern "1678", as a virtual clone-source file.

In a case where a clone file matching the majority logic-determined data pattern does not exist, a clone file, which most closely approximates the majority logic data pattern, may be selected as the virtual clone-source file. This is because the majority logic data pattern does not necessarily constitute data, which has significance for the user. However, the majority logic data pattern may nevertheless be selected as-is as the virtual clone-source file.

FIG. 21(b) shows how to reconfigure a clone file by treating the virtual clone-source file "1678" as a benchmark, selecting the difference(s) with each clone file, and moving the data inside the data blocks of the clone files. The virtual clone-source file becomes the new clone-source file, and the data of all the clone files, which had referenced the original clone-source file, is reconfigured having the new clone-source file as the benchmark.

When the data "1238" of the first clone file CF1 is compared with the data "1678" of the virtual clone-source file, the data of the first data blocks and the fourth data blocks match, but the data of the second data blocks and the third data blocks do not match. Therefore, the first clone file may reference the virtual clone-source file with respect to the data in the first data block and the fourth data block, and may store difference data with respect to the second data block and the third data block. As a result, the data of the first clone file is expressed as "-23-".

The data "1678" of the second clone file CF2 matches the data "1678" of the virtual clone-source file. This is because the data of the second clone file has been selected here as the virtual clone-source file. Therefore, the data of the second clone file CF2 is expressed as "----".

When the data "5679" of the third clone file CF3 is compared with the data "1678" of the virtual clone-source file, the data of the second data blocks and the third data blocks match, but the data of the first data blocks and the fourth data blocks do not match. Therefore, the data of the third clone file CF3 is expressed as "5--9".

A comparison of FIGS. 21(a) and 21(b) reveals that a clean clone-source file, which is not infected with a virus, can be obtained by re-executing single instance processing. In addition, the ratio for eliminating duplicated data improves because data which is duplicated in the latest clone file and the new clone-source file is also eliminated. Duplicated data can be more effectively eliminated because the clone file can be reconfigured in accordance with the situation at the current point in time at which single instance processing is re-executed.

Figure 22:
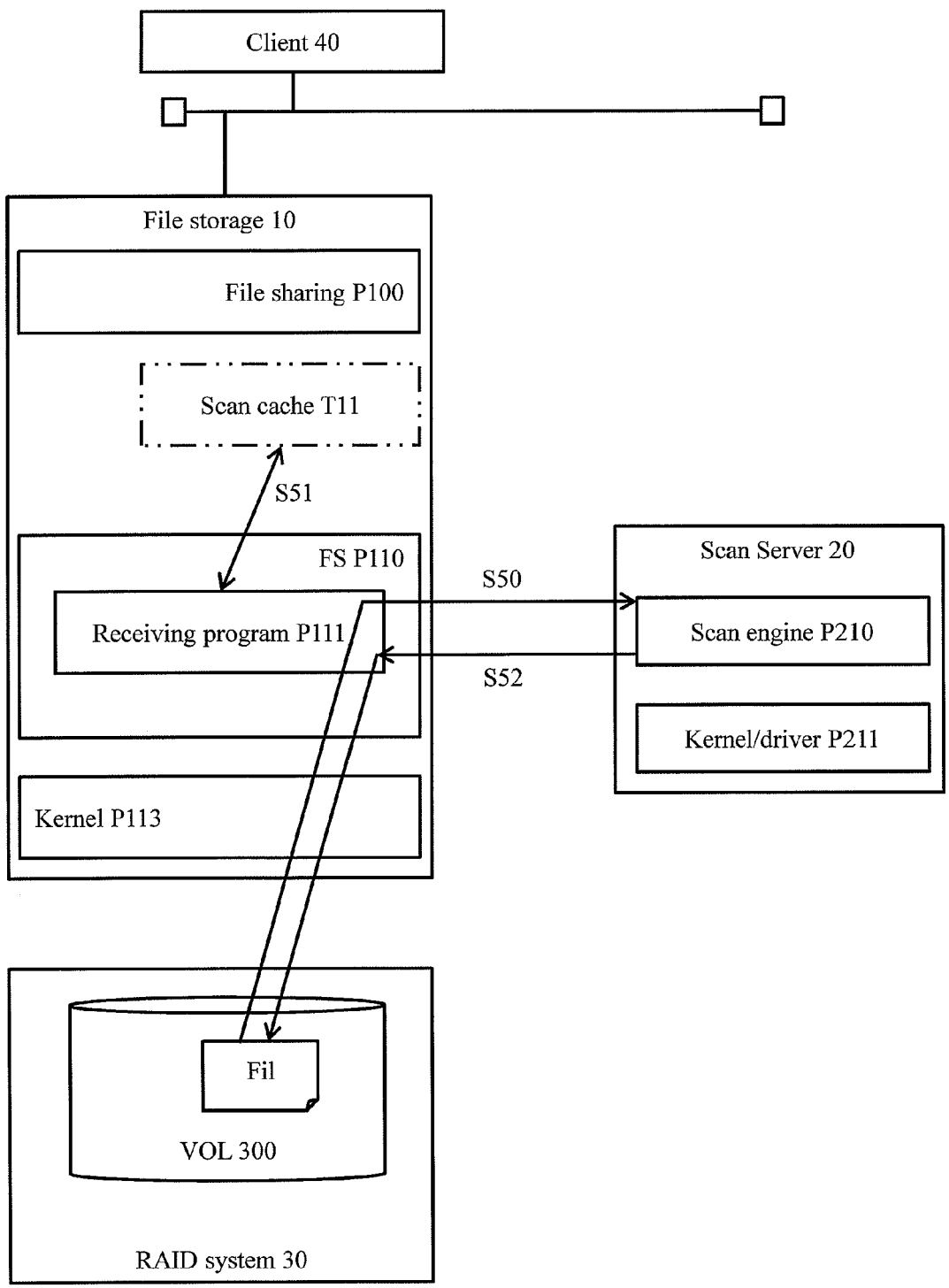
FIG. 22 is an illustration showing an overview of processing for performing a virus scan (virus check) of a clone-source file and a clone file when updating a virus definition file.

FIG. 22 shows how to treat the updating of the virus definition file as a trigger to perform virus scan processing on the clone-source file and the clone file.

The file storage 10 regularly queries the scan server 20 as to the update status of the virus definition file (S50). Ina case where the virus definition file has been updated, the file storage 10 clears the scan cache T11 (S51). In addition, the file storage 10 requests that the scan server 20 perform virus scan processing for the clone-source file and the clone file, and receives the results thereof (S52).

Since the clone-source file cannot be accessed from the client 40, neither the above-mentioned virus scan processing at the start of a file access nor the virus scan processing at the end of a file access is executed for the clone-source file. Consequently, in this example, as one example, virus scan processing is executed for the clone-source file and the clone file when the virus definition file has been updated.

Figure 23:
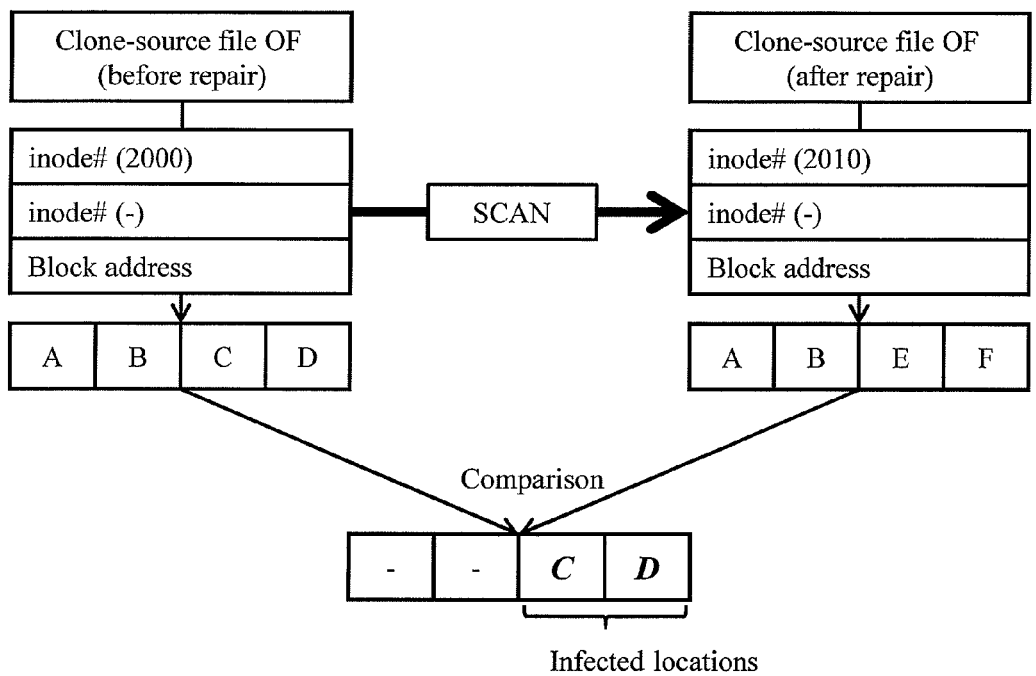
FIG. 23 is an illustration showing how to identify an infected area of a clone-source file by comparing data before and after the repair of the clone-source file.

FIG. 23 shows an example of a method for identifying a virus-infected area of the clone-source file data. The clone-source file of prior to the execution of the virus scan processing, that is, the pre-repair clone-source file is shown in the left side of FIG. 23. A repaired-state clone-source file after the virus scan processing has ended is shown in the right side of FIG. 22.

However, the repaired clone-source file shown in the right side of FIG. 23 is simply the file, which the file storage 10 has received from the scan server 20, and is not formally used as the clone-source file. Since the clone-source file is referenced by the clone file, the clone-source file cannot be repaired. That is, the virus-infected clone-source file cannot be overwritten with the repaired clone-source file received from the scan server 20. The repaired clone-source file, which the file storage 10 obtains from the scan server 20 is used for identifying the virus-infected area.

The file storage 10 can identify an area, which is infected with a virus, by comparing the data of the pre-repair clone-source file with the data of the post-repair clone-source file in data block units. For example, in a case where the pre-repair data is "ABCD" and the post-repair data is "ABEF", the data of the third data block and the fourth data block have changed. Therefore, the file storage 10 knows that the data "C" of the third data block and the data "D" of the fourth data block are infected with a virus.

Figure 24:
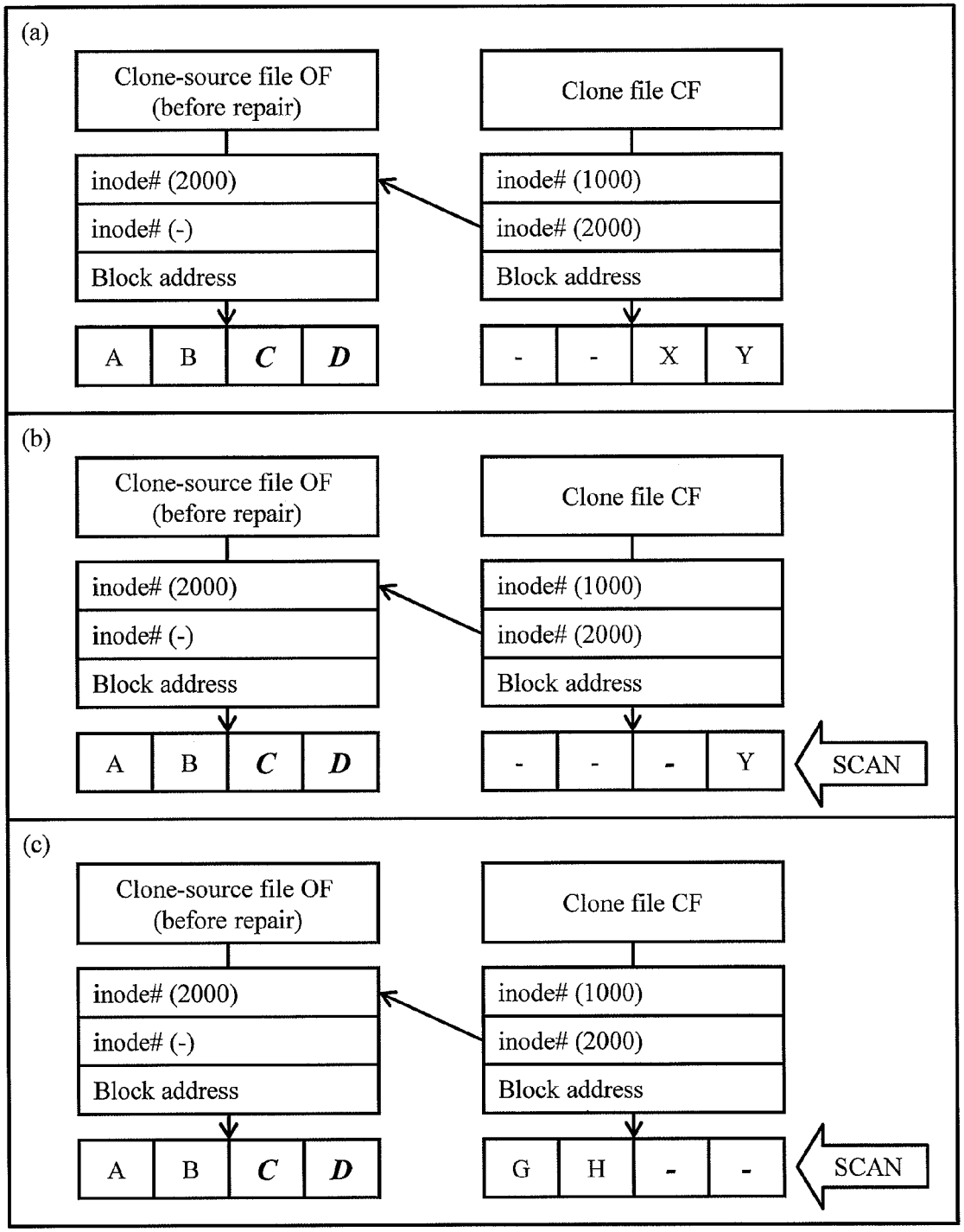
FIG. 24 is an illustration showing a case in which a clone file virus scan can be omitted and a case in which the clone file scan cannot be omitted.

FIG. 24 shows how the need for virus scan processing changes in accordance with the clone file reference status.

The data of the clone file can be reproduced by synthesizing the data of the clone-source file and the difference data of the clone file. In a case where there is absolutely no infected area of the data included in the reproduced clone file, virus scan processing need not be performed for this clone file. Alternatively, in a case where even a portion of the infected area of the data is included in the reproduced clone file, this clone file must be scanned.

As shown in FIG. 24(a), in a case where the data in the third data block and the fourth data block of the clone file is replaced with difference data "X" and "Y", the clone file does not reference the data of the infected third data block and fourth data block of the clone-source file at all. The infected area of the data is absolutely not included in this clone file even when the data of the clone file is reproduced. Therefore, the virus scan processing need not be executed for the clone file shown in FIG. 24(a).

FIG. 24(b) shows a case in which the clone file is referencing a portion of the infected area of the data of the clone-source file. In the example of FIG. 24(b), the fourth data block of the clone file data is replaced with the difference data "Y", but the first through the third data blocks are referencing the clone-source file. Since the third data block, which is infected with a virus, is being referenced, the virus scan processing has to be executed for the clone file shown in FIG. 24(b).

FIG. 24(c) shows a case in which the clone file is referencing all of the infected areas of the data of the clone-source file. The first data block and the second data block of the clone file are replaced with the difference data "G" and "H", but the third data block and the fourth data block are referencing the clone-source file. Since the data blocks of all of virus-infected areas are being referenced, the virus scan processing has to be executed for the clone file shown in FIG. 24(c).

As was explained using FIG. 24, a determination can be made as to the need for the virus scan processing for a clone file in accordance with where the clone file is referencing the clone-source file, that is, in accordance with whether the clone file is referencing the data of an infected area of the clone-source file.

Figure 25:
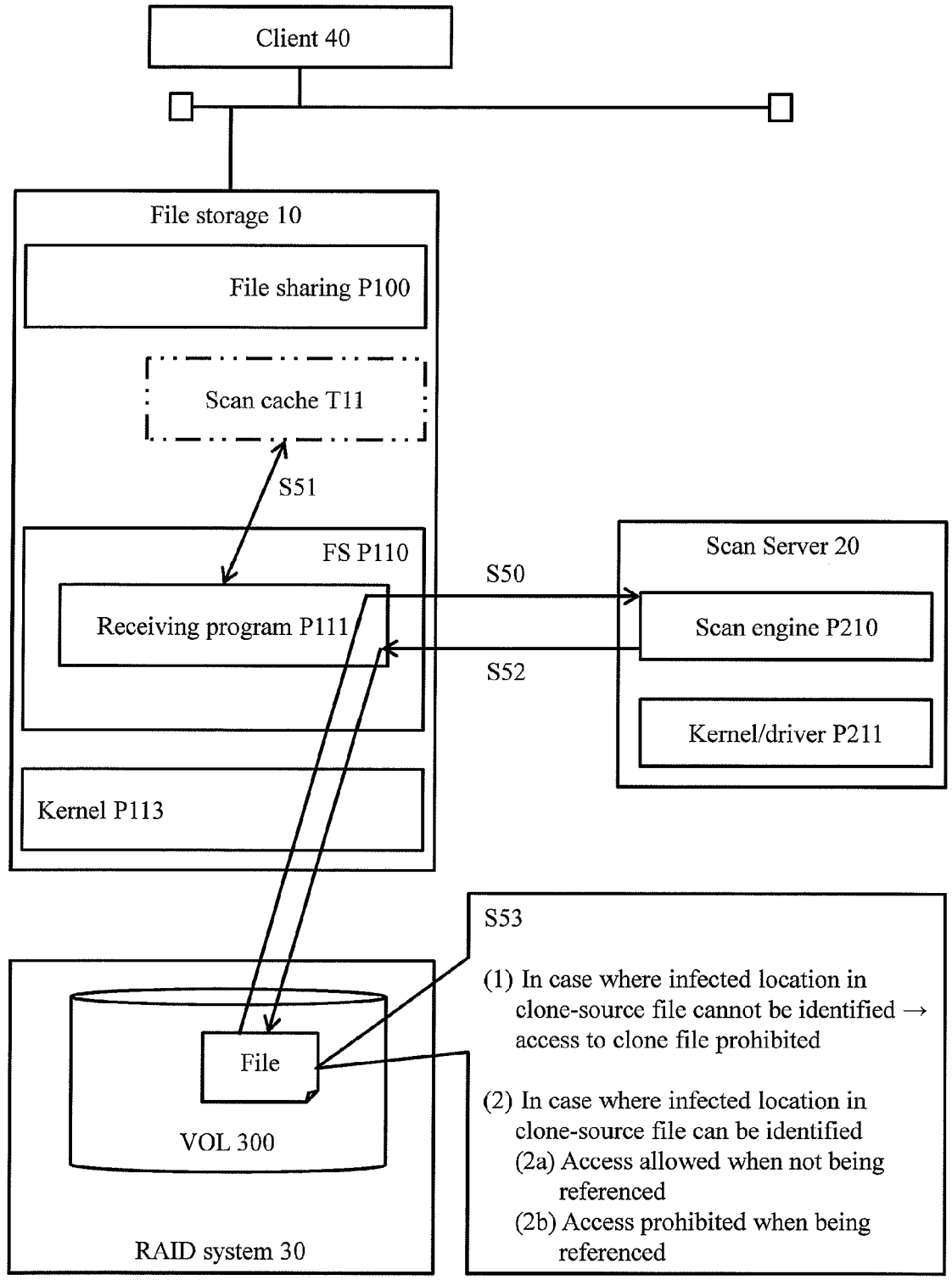
FIG. 25 is an illustration showing an overview of processing in a case where a virus infecting a clone-source file cannot be repaired.

FIG. 25 is an overview of a case in which a virus definition file update triggers the performance of virus scan processing for the clone-source file and the clone file, and shows a case where a notification to the effect that the infected file is irreparable has been received from the scan server 20. The overview of FIG. 25 is equivalent to a variation of the overview of FIG. 22.

The file storage 10 receives the result of the virus scan processing for the clone-source file from the scan server 20 (S52). In a case where, as the result of the virus scan, a determination has been made that a clone-source file is infected with a virus, access to the clone file is controlled in accordance with whether or not the infected area was identified.

(1) In a case where the infected area of the clone-source file cannot be identified, access to the clone file is prohibited. Since it is not known what data the virus is infecting, access is prohibited to all the clone files referencing the clone-source file.

(2) In a case where the infected area of the clone-source file is able to be identified, access to the clone file is controlled in accordance with the clone file reference status. (2a) Access to clone file data, which is not referencing the infected area, is allowed. (2b) Access to clone file data, which is referencing the infected area, is prohibited.

In the example of FIG. 24(b), the fourth data block is storing difference data "Y" without referencing the clone-source file. Therefore, the file storage 10 allows the client 40 to access the fourth data block. The third data block is referencing the infected block of the clone-source file. Therefore, the file storage 10 prohibits the client 40 from accessing the data "C" of the third data block.

As described using FIG. 24(a), the execution of the virus scan processing can be omitted for a clone file, which is not referencing any of the infected areas (infected data blocks) of the clone-source file.

As a method for identifying a virus-infected area of the clone-source file data, as described in FIG. 23, there is a method in which pre-repair clone-source file data is compared with post-repair clone-source file data. Besides this method, there is also a method, which depends on the detection performance of the scan server 20, and learns the infected area of the clone-source file in accordance with a notification from the scan server 20. For example, the scan server 20 can detect data, which is infected with a virus, and in a case where this virus is impossible to remove, may notify the file storage 10 of the address of the virus-infected data.

Figure 26:
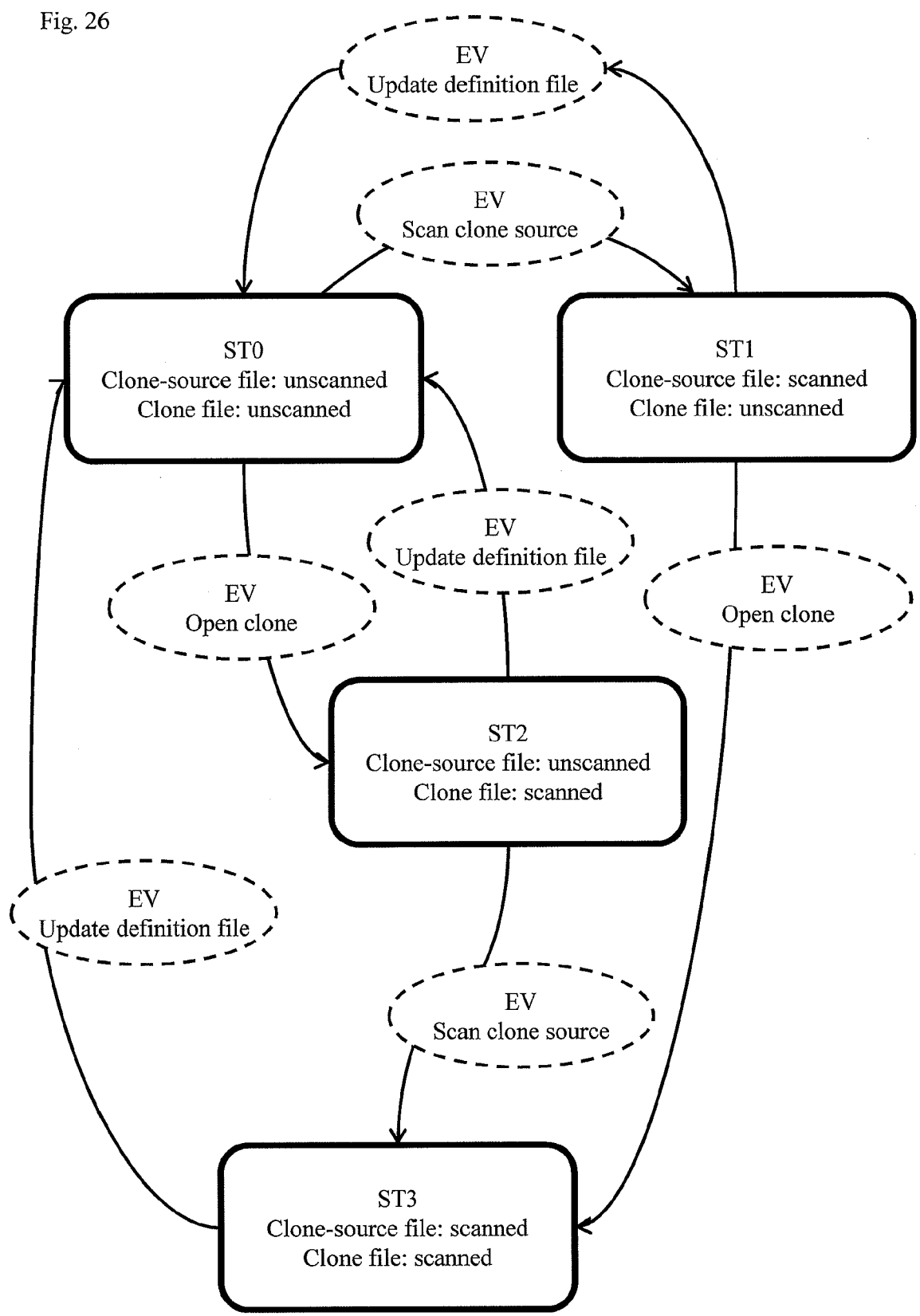
FIG. 26 is a status transition diagram for a clone-source file and a clone file.

FIG. 26 shows a status transition for a clone-source file and a clone file. In the drawing, "EV" is the abbreviation for an event. In a ST0 state, the virus scan processing has yet to be executed for both the clone-source file and the clone file. The state in which the virus scan processing has not been executed may be expressed as "unscanned state", and the state in which the virus scan processing has been executed, may be expresses as "scanned state".

When an event requesting the execution of the virus scan processing for the clone-source file occurs in the ST0 state, the ST0 state transitions to a ST1 state. In the ST1 state, the clone-source file transitions to the scanned state, and the clone file remains in the unscanned state as-is.

When an update event for the virus definition file occurs in the ST1 state, the ST1 state returns to the ST0 state. When an event for issuing a file-opening request to the clone file occurs in the ST1 state, the ST1 state changes to a ST3 state. As described hereinabove, the virus scan processing is executed for the clone file, which is the target of a file opening, when a file is to be opened.

In the ST3 state, the clone-source file and the clone file both transition to the scanned state. When an update event for the virus definition file occurs in the ST3 state, the ST3 state transitions to the ST0 state. The clone-source file and the clone file both transition to the unscanned state.

When an event requesting that the clone file open a file occurs in the ST0 state, the ST0 state transitions to a ST2 state. In the ST2 state, the clone-source file remains in the unscanned state as-is, and the clone file changes to the scanned state. As described hereinabove, this is because, when a file is to be opened, the virus scan processing is executed for the clone file, which is the target of the file opening.

When an update event for the virus definition file occurs in the ST2 state, the ST2 state returns to the ST0 state, and both the clone-source file and the clone file transition to the unscanned state.

When an event requesting the execution of the virus scan processing for the clone-source file occurs in the ST2 state, the ST2 state transitions to the ST3 state. The clone-source file changes from the unscanned state to the scanned state.

The processing in a case where the virus scan processing is executed for the clone-source file and the clone file when the virus definition file is updated, an infected area is identified when the clone-source file is infected, a determination as to the need for virus scan processing for the clone file is made in accordance with the reference status of the infected area, and a new clone-source file is created from a clone file, which is not infected with a virus, will be explained below.

Figure 27:
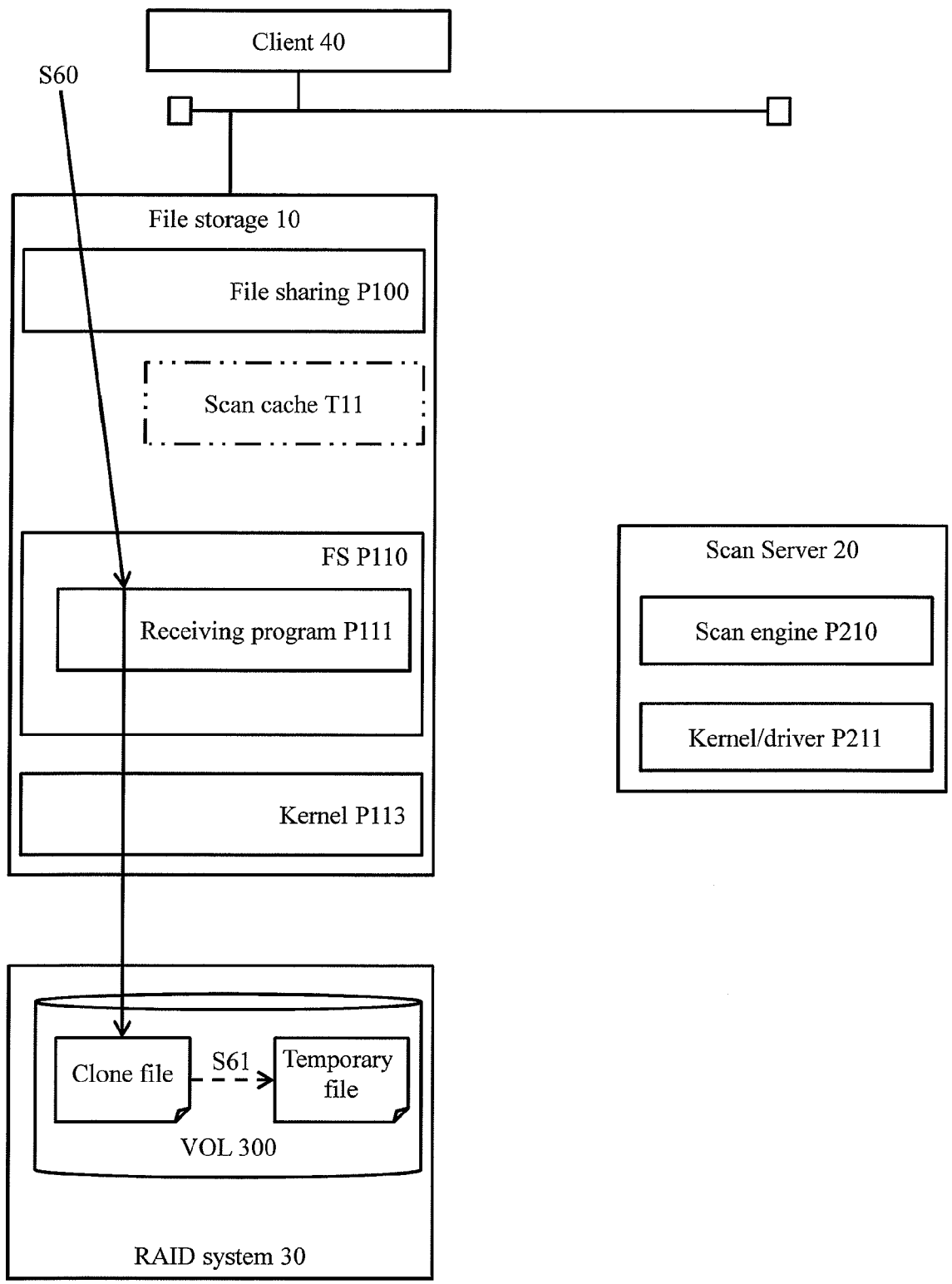
FIG. 27 is an overview of a clone file read/write process.

Since the processing at the start of a file access (at file opening time) is the same as that of FIG. 14, an explanation will be omitted. The processing when a file is accessed (at either a read or a write) is shown in FIG. 27. In the processing of FIG. 27, the same as that described using FIG. 15, the file storage 10, upon receiving a write request from the client 40 (S60), creates and stores a file of prior to the access-target file being updated as a temporary file (S61).

Figure 28:
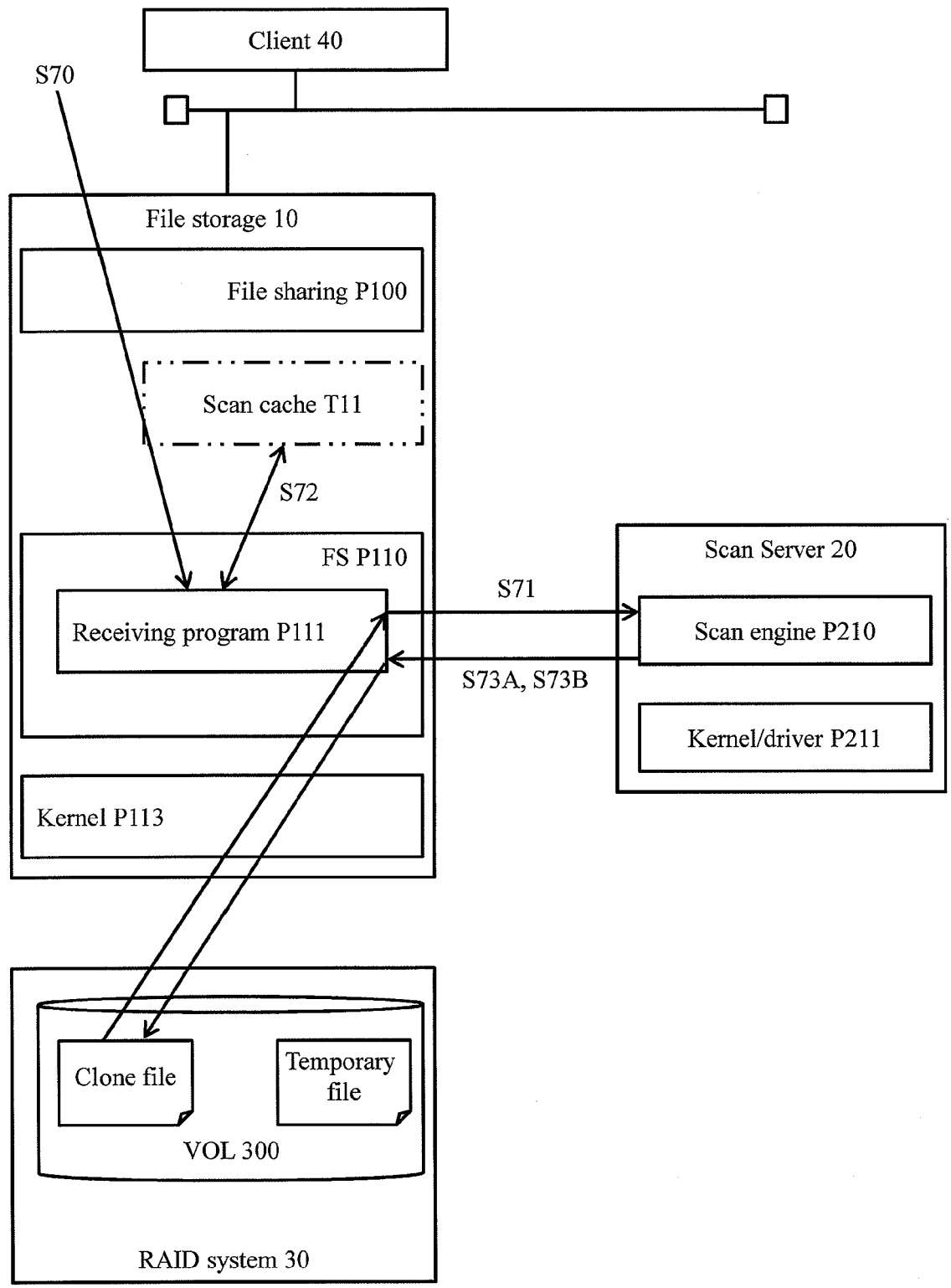
FIG. 28 is an overview showing how to perform a virus scan in a case where access to a clone file has ended.

The processing when a file access ends (at file closing) is shown in FIG. 28. In the processing of FIG. 28, the same as was described using FIG. 16, the file storage 10, upon receiving a file-closing request from the client 40 (S70), sends the updated file to the scan server 20 (S71). In a case where, as a result of the virus scan, it is determined that there is no virus infection, the file storage 10 registers the scan result in the scan cache T11 (S72), executes a file-closing process, and thereafter, deletes the temporary file.

In a case where, as a result of the virus scan, it is determined that there is a virus infection, the scan server 20 repairs the file. In a case where the repair is successful, the file storage 10 overwrites the infected file with the repaired file received from the scan server 20 (S73A). In a case where the determination is that the infected file is irreparable, the file storage 10 performs a restoration using the temporary file, which was created prior to updating, registers the result of the scan in the scan cache T11, and thereafter, executes a file-closing process (S73B).

Figure 29:
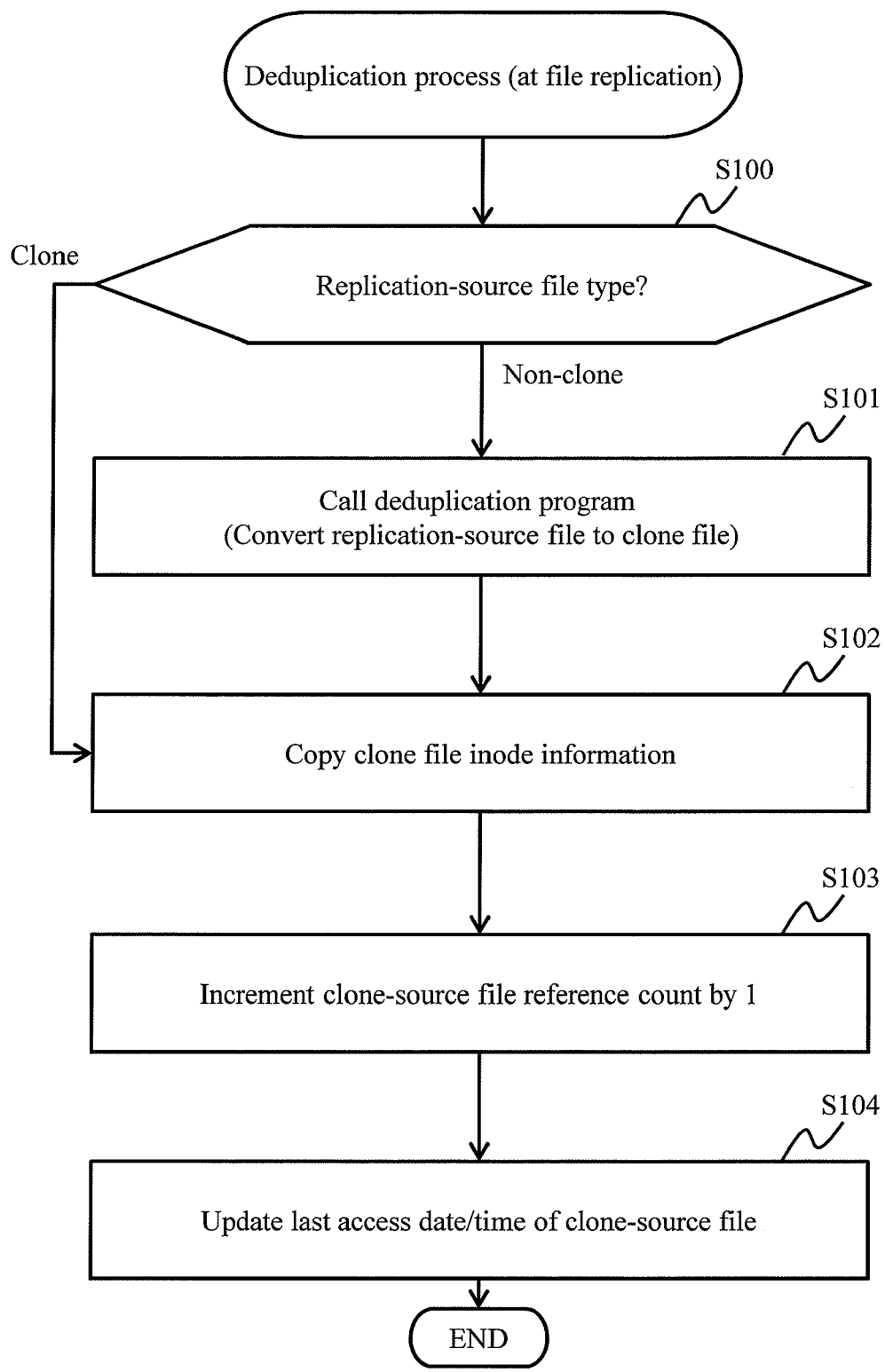
FIG. 29 is a flowchart showing a process for eliminating duplicated data when copying a file.

The operation of the storage system will be explained by referring to FIGS. 29 through 40. FIG. 29 is a flowchart showing a deduplication process (single instance processing) executed in a case where a copy of a file is created.

The file storage 10, upon receiving a file replication request from either the client 40 or a higher-level program, determines whether the replication-source file is a clone file or a non-clone file (S100). A non-clone file is a normal file, which has not been converted to a clone file in accordance with single instance processing.

In a case where the replication-source file is a non-clone file, the file storage 10 calls the deduplication program (deduplication driver) P112, and converts the replication-source file to a clone file (S101). Step S101 will be explained in detail further below.

The file storage 10 copies the inode information T10 of the replication-source clone file (S102), and increments the clone-source file reference count C106C by 1 (S103). In a case where the replication-source file is a clone file, Step S101 is skipped and the processing proceeds to Step S102.

Lastly, the file storage 10 updates the last access date/time C104 of the clone-source file (S104). The date/time at which copy processing was executed for the clone file, which is referencing the clone-source file, is used as the last access date/time of the clone-source file.

Figure 30:
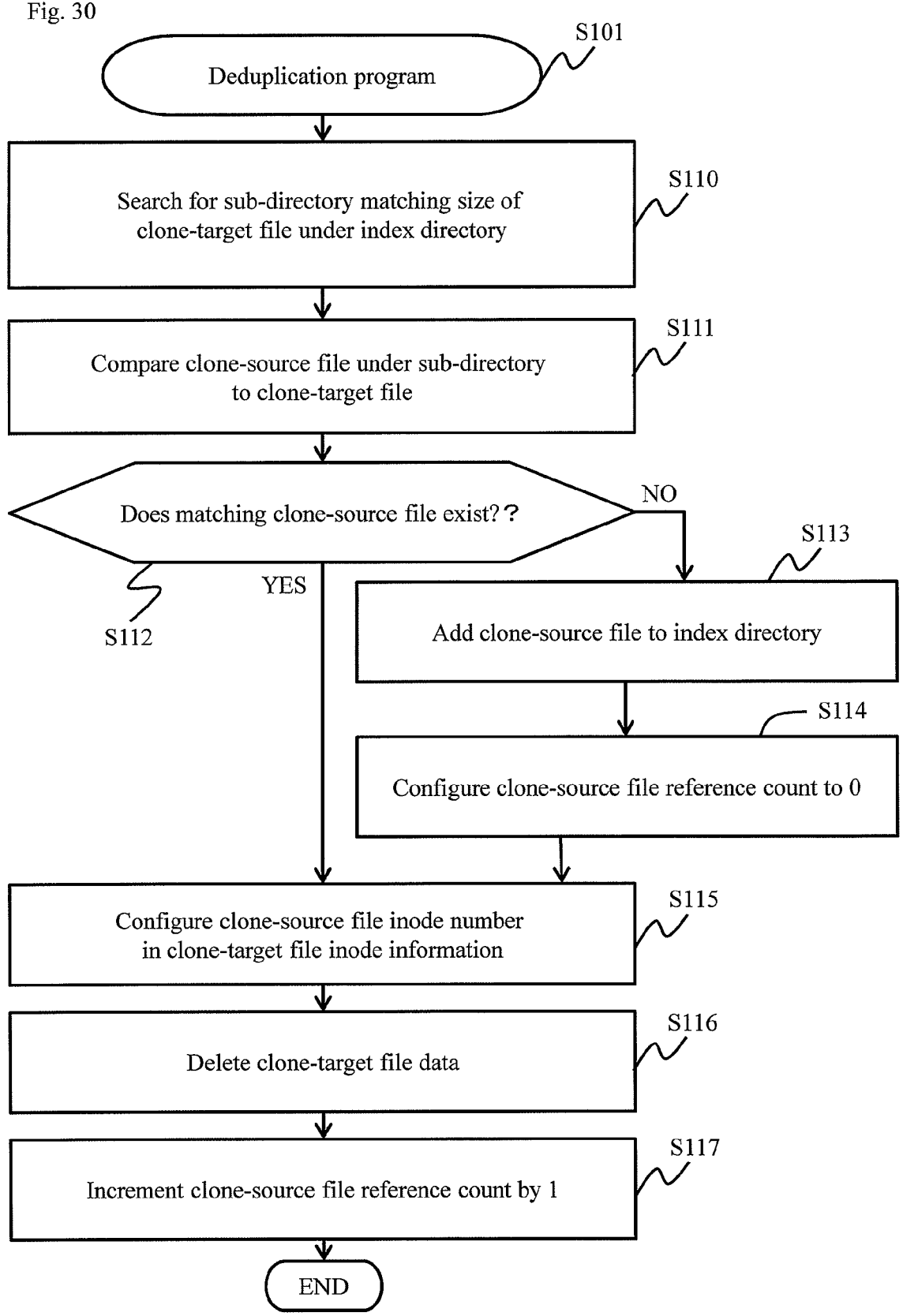
FIG. 30 is a flowchart showing a process, which is called from the processing shown in FIG. 29, and converts a copy-target file to a clone file.

FIG. 30 is a flowchart showing Step S101 in FIG. 29 in detail. The file storage 10 retrieves from under the index directory, which manages the clone-source file, the subdirectory corresponding to the size of the clone-target file (replication-source file) (S110).

The file storage 10 compares all the clone-source files stored inside this subdirectory to the clone-target file (S111). The file storage 10 determines whether there is a clone-source file, which matches the data of the clone-target file (S112).

In a case where a clone-source file matching the clone-target file does not exist (S112: NO), the file storage 10 adds a clone-source file comprising the same data as the data of the clone-target file to the index directory (S113). Then, the file storage 10 configures the reference count C106C of the added clone-source file to 0 (S114).

The file storage 10, either in a case where a clone-source file matching the clone-target file exists (S112: YES), or subsequent to the end of Step S114, configures the inode number of the clone-source file in the reference-destination inode number C106A of the clone-target file inode information T10 (S115).

The file storage 10 deletes the data of the clone-target file, and replaces this data with a reference to the clone-source file (S116). In addition, the file storage 10 increments the value of the reference count C106C of the clone-source file by 1 (S117).

Figure 31:
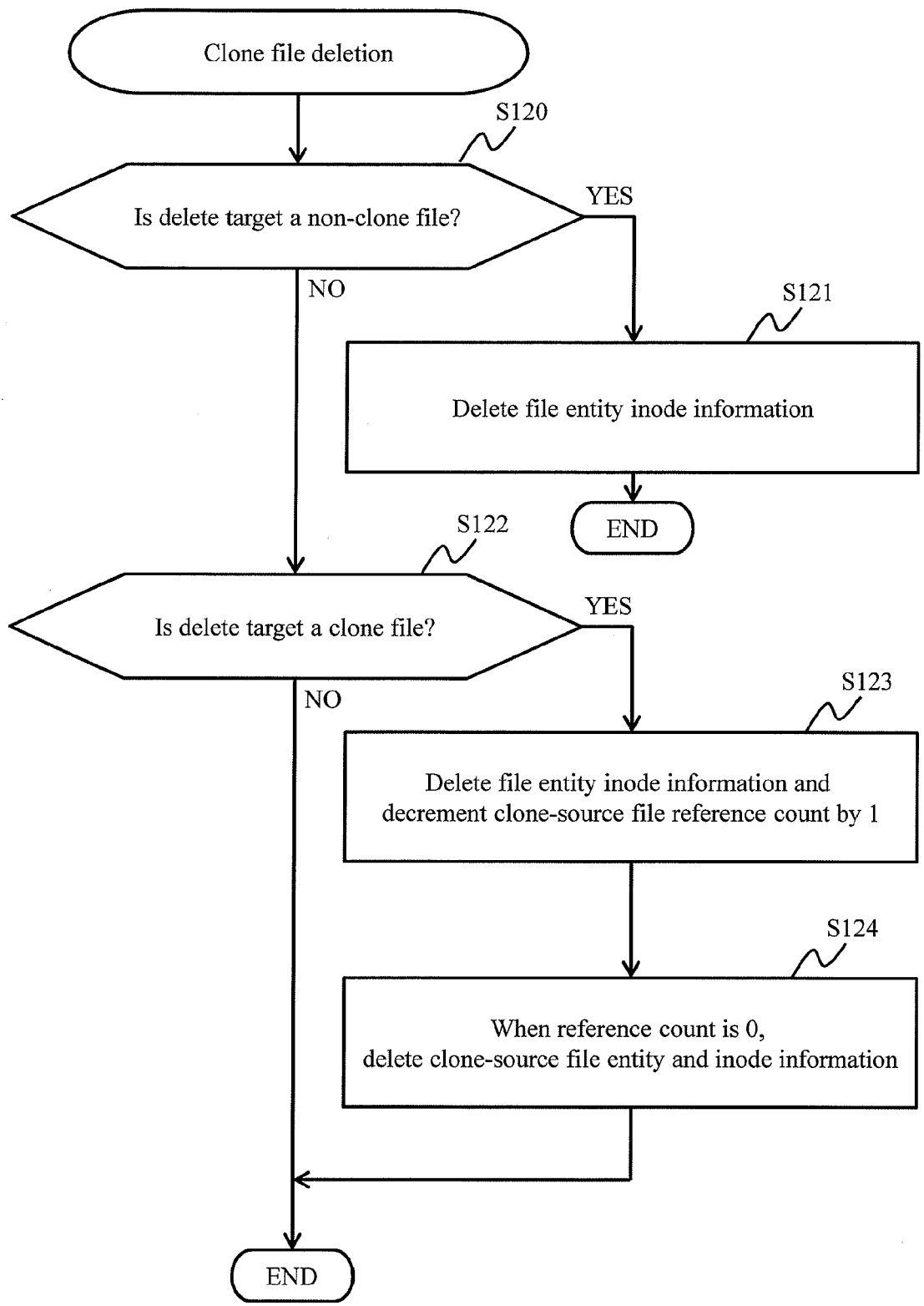
FIG. 31 is a flowchart showing a process for deleting a clone file.

FIG. 31 is a flowchart showing a clone file deletion process. The file storage 10, upon receiving a file deletion request from the client 40 or a higher-level program, determines whether the delete-target file is a non-clone file (S120).

In a case where the delete-target file is a non-clone file (S120: YES), that is, a case in which the delete target is a normal file, the file storage 10 deletes the inode information T10 of the delete-target file entity (S121).

In a case where the delete-target file is not a non-clone file (S120: NO), the file storage 10 determines whether the delete-target file is a clone file (S122). In a case where the delete-target file is a clone file (S122: YES), the file storage 10 deletes the inode information T10 of the delete-target file entity, and, in addition, decrements the value of the reference count C106C of the clone-source file by 1 (S123).

The file storage 10, in a case where the value of the reference count C106C is 0, deletes the clone-source file entity and the inode information T10 (S124). In a case where the delete-target file is not a clone file (S122: NO), the file storage 10 ends this processing.

Thus, the value of the clone-source file reference count C106C is reduced by 1 each time a clone file is deleted, and when the value of the reference count C106C reaches 0, the clone-source file is deleted. This is because there is no reason for the clone-source file to exist when there are no clone files to reference this clone-source file.

Figure 32:
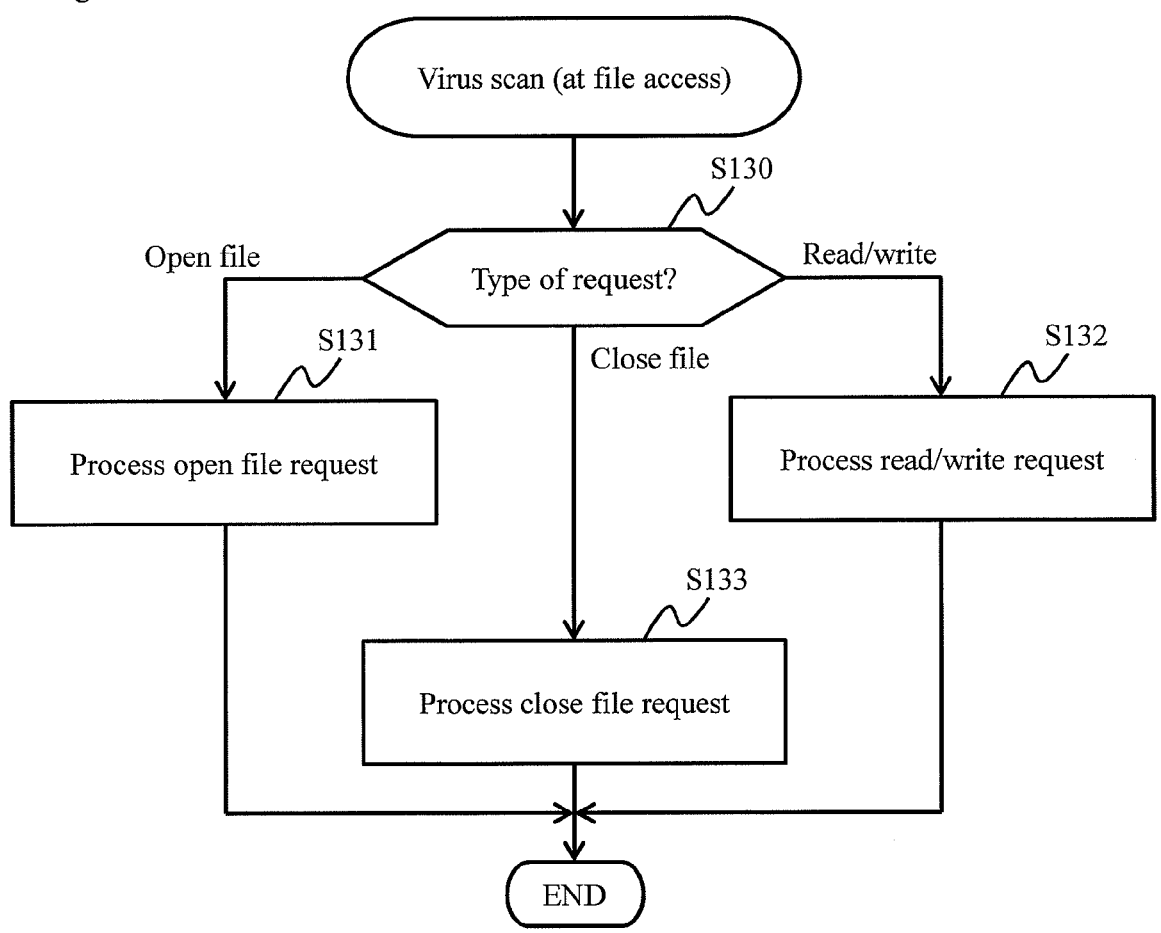
FIG. 32 is a flowchart showing an entire virus scan process when a file is accessed.

FIG. 32 is a flowchart showing the virus scan processing executed when a file is accessed. The file storage 10, upon receiving a request to access a file from either the client 40 or a higher-level program, determines the type of this request (S130). The types of requests include a file-opening request, either a read request or a write request, and a file-closing request.

In a case where a file-opening request has been received, the file storage 10 executes the processing for a file-opening request (S131). The processing of Step S131 will be explained in detail further below using FIG. 33. In a case where either a read request or a write request has been received, the file storage 10 executes the processing for a read/write request (S132). The processing of Step S132 will be explained in detail further below using FIG. 34. In a case where a file-closing request has been received, the file storage 10 executes the processing for a file-closing request (S133). The processing of Step S133 will be explained in detail further below using FIG. 35.

Figure 33:
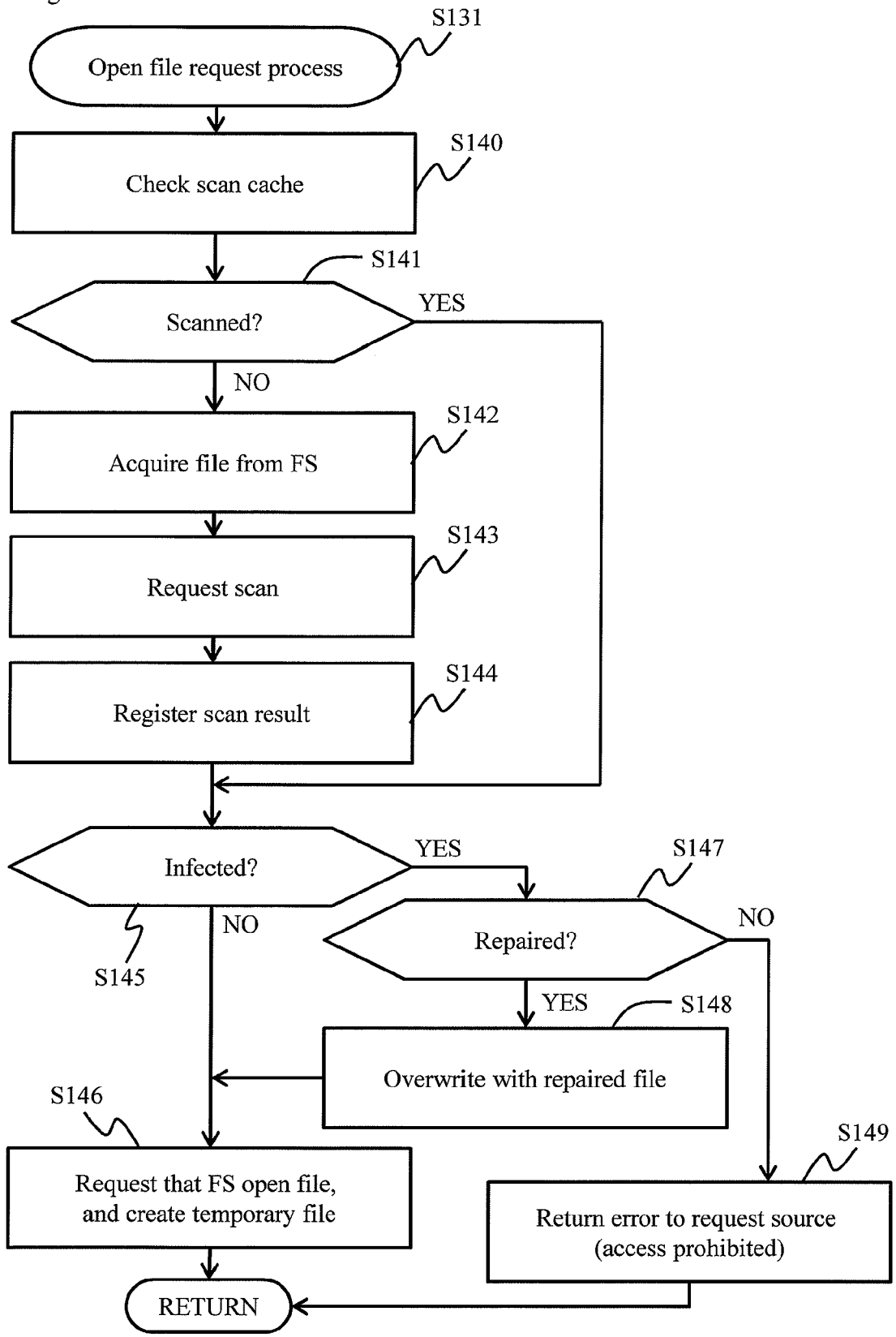
FIG. 33 is a flowchart of a portion of the processing included in FIG. 32 showing in detail a virus scan process when opening a file.

FIG. 33 is a flowchart showing the processing (S131 of FIG. 32) in detail when a file-opening request is received.

The file storage 10 checks the scan cache T11 for an access-target file (the file targeted for file opening) (S140). The file storage 10 determines whether the access-target file has been scanned (S141).

In a case where the access-target file is the unscanned state (S141: NO), the file storage 10 acquires the access-target file from the RAID system 30 via the file system (S142). The file storage 10 sends the access-target file to the scan server 20, and requests the execution of virus scan processing (S143).

The file storage 10, upon receiving the result of the virus scan processing of the access-target file from the scan server 20, registers this virus scan processing result in the scan cache T11 (S144). In a case where the access-target file has been scanned (S141: YES), the file storage 10 skips Steps S142 through S144 and moves to Step S145.

The file storage 10 determines whether the access-target file is infected with a virus (S145). In a case where the access-target file is not infected with a virus (S145: NO), the file storage 10 requests that the file system open the access-target file, and, in addition, copies the access-target file to create a temporary file (S146).

In a case where the access-target file is infected with a virus (S145: YES), the file storage 10 determines whether a repaired file of the access-target file has been received from the scan server 20 (S147).

In a case where a repaired file has been received (S147: YES), the file storage 10 requests that the file system overwrite the virus-infected access-target file with the repaired file (S148). Thereafter, the file storage 10 moves to Step S146.

In a case where a repaired file has not been received (S147: NO), the file storage 10 returns an error to the source of the access request (S149), and ends this processing. Since access to a virus-infected file cannot be allowed, the file storage 10 prohibits access to the infected file.

Figure 34:
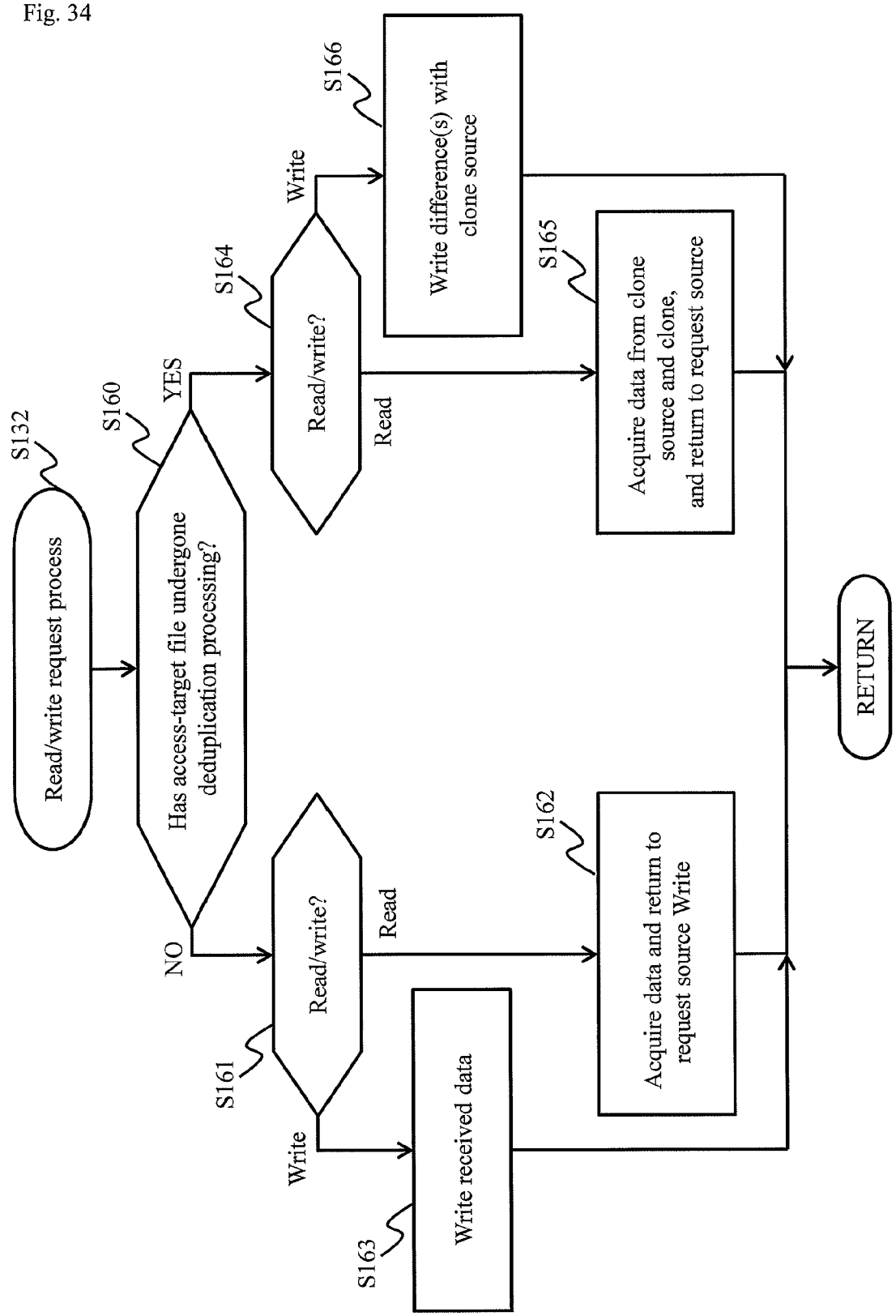
FIG. 34 is a flowchart of a portion of the processing included in FIG. 32 showing in detail a virus scan process when reading/writing data from/to a file.

FIG. 34 is a flowchart showing the processing (S132 of FIG. 32) in detail in a case where either a read request or a write request has been received. First, the file storage 10 determines whether deduplication processing (single instance processing) has been implemented for the access-target file (S160).

In a case where the deduplication processing has not been executed (S160: NO), the access-target file is a normal file. The file storage 10 determines whether a read request was received or a write request was received (S161).

In the case of a read request, the file storage 10 acquires the access-target file from the RAID system 30 by way of the file system, and returns the acquired access-target file to the source of the read request (S162). In the case of a write request, the file storage 10 writes data, which was received (the write data), via the file system to the access-target file stored in the RAID system 30 (S163).

In a case where the deduplication processing has been applied to the access-target file (S160: YES), the access-target file is a clone file. Consequently, the file storage 10 determines whether a read request was received or a write request was received (S164).

In the case of a read request, the file storage 10 acquires the clone-source file and the difference data of the clone file from the RAID system 30 via the file system, reproduces the clone file data, and returns the reproduced data to the source of the read request (S165). In the case of a write request, the file storage 10 writes data, which is different from the clone-source file, as difference data unique to the clone file (S166). The file storage 10 writes the difference data via the file system to the clone file stored in the RAID system 30.

Figure 35:
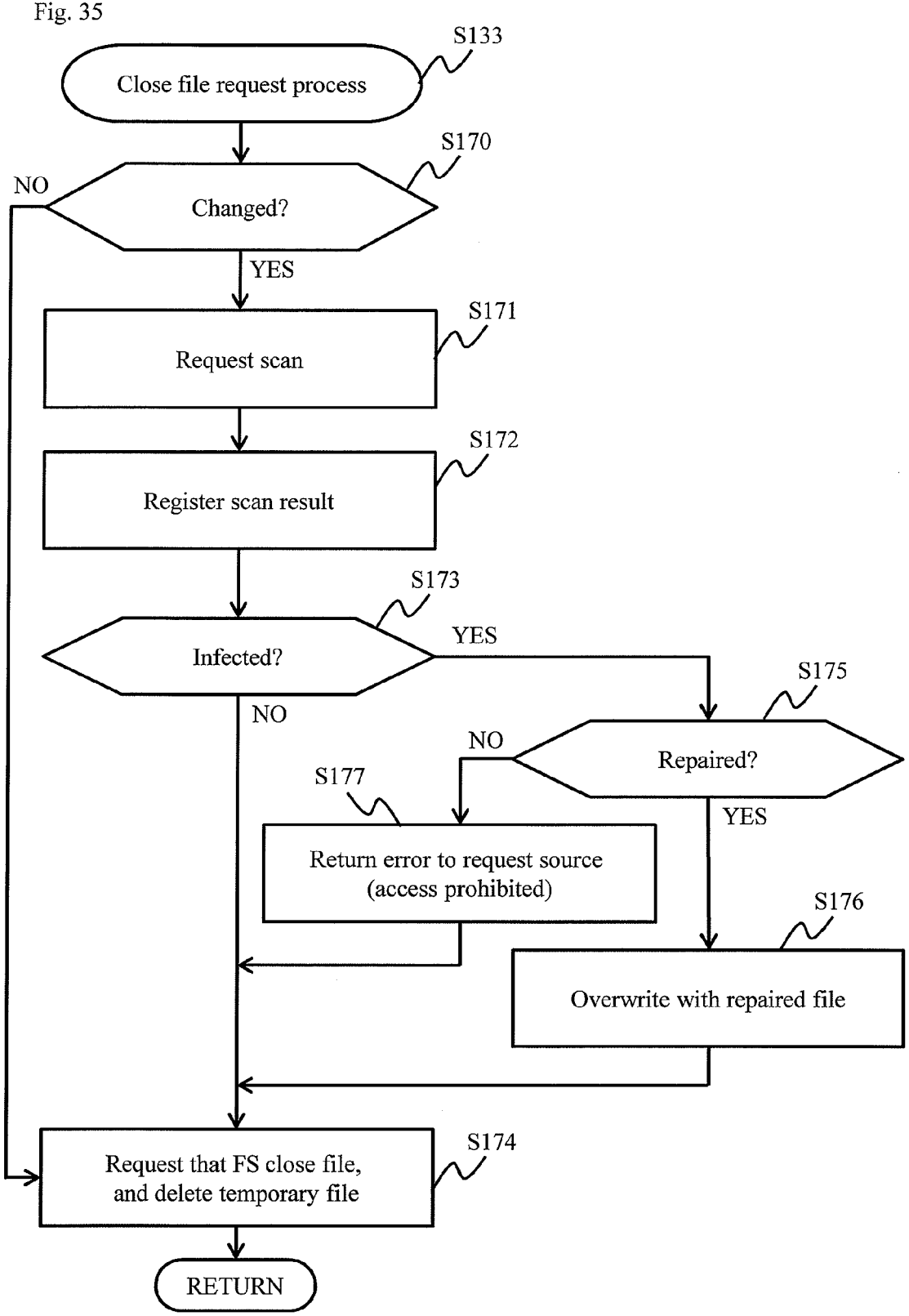
FIG. 35 is a flowchart of a portion of the processing included in FIG. 32 showing in detail a virus scan process when closing a file.

FIG. 35 is a flowchart showing the processing (S133 of FIG. 32) in detail in a case where a file-closing request has been received.

The file system 10 determines whether the access-target file data has changed (S170). In a case where the access-target file data has changed (S170: YES), that is, a case in which the file has been updated, the file storage 10 requests that the scan server 20 execute virus scan processing for this file (S171).

The file storage 10, upon receiving the result of the virus scan processing from the scan server 20, registers this virus scan processing result in the scan cache T11 (S172).

The file storage 10 determines whether the access-target file is infected with a virus (S173). In a case where the access-target file is not infected with a virus (S173: NO), the file storage 10 requests that the file system close the file, and deletes the temporary file, which was created prior to the access-target file being updated (S174).

In a case where the access-target file is infected with a virus (S173: YES), the file storage 10 determines whether a repaired file has been received from the scan server 20 (S175).

In a case where a repaired file has been received from the scan server 20 (S175: YES), the file storage 10 requests that the file system overwrite the virus-infected access-target file with the repaired file (S176). Thereafter, the file storage 10 moves to Step S174. Thereafter, the file storage 10 moves to Step S174.

In a case where a repaired file has not been received from the scan server 20 (S175: NO), access to the access-target file is prohibited, and as such, the file storage 10 returns an error to the source of the file-closing request (S177). Thereafter, the file storage 10 moves to Step S174.

Figure 36:
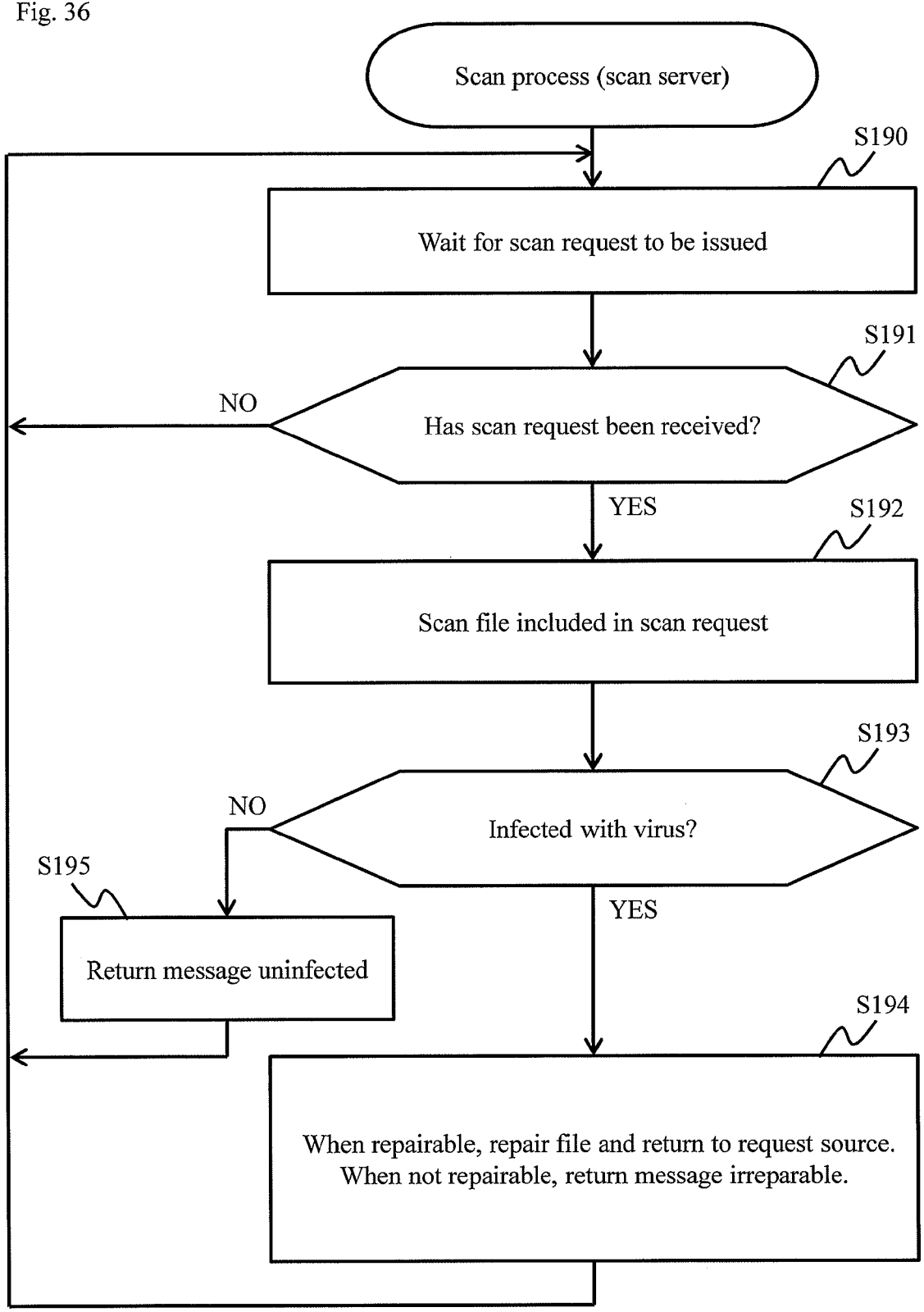
FIG. 36 is a flowchart showing a virus scan process executed by a scan server.

FIG. 36 is a flowchart showing the virus scan processing executed by the scan server 20 in detail. The scan server 20 waits for a virus scan request to be issued from the file storage 10 (S190).

The scan server 20 determines whether a virus scan request has been received from the file storage 10 (S191). In a case where a virus scan request has been received (S191: YES), the scan server 20 executes virus scan processing for a virus scan-target file included in the virus scan request (S192).

The scan server 20 determines whether the target file received from the file storage 10 is infected with a virus (S193). In a case where it has been determined that the target file is infected with a virus (S193: YES), the scan server 20, in a case where the target file is repairable, creates a repaired file for the target file and returns this repaired file to the file storage 10 (S194). In a case where the target file is irreparable, the scan server 20 returns a message to the file storage 10 to the effect that the target file cannot be repaired (S194).

Figure 37:
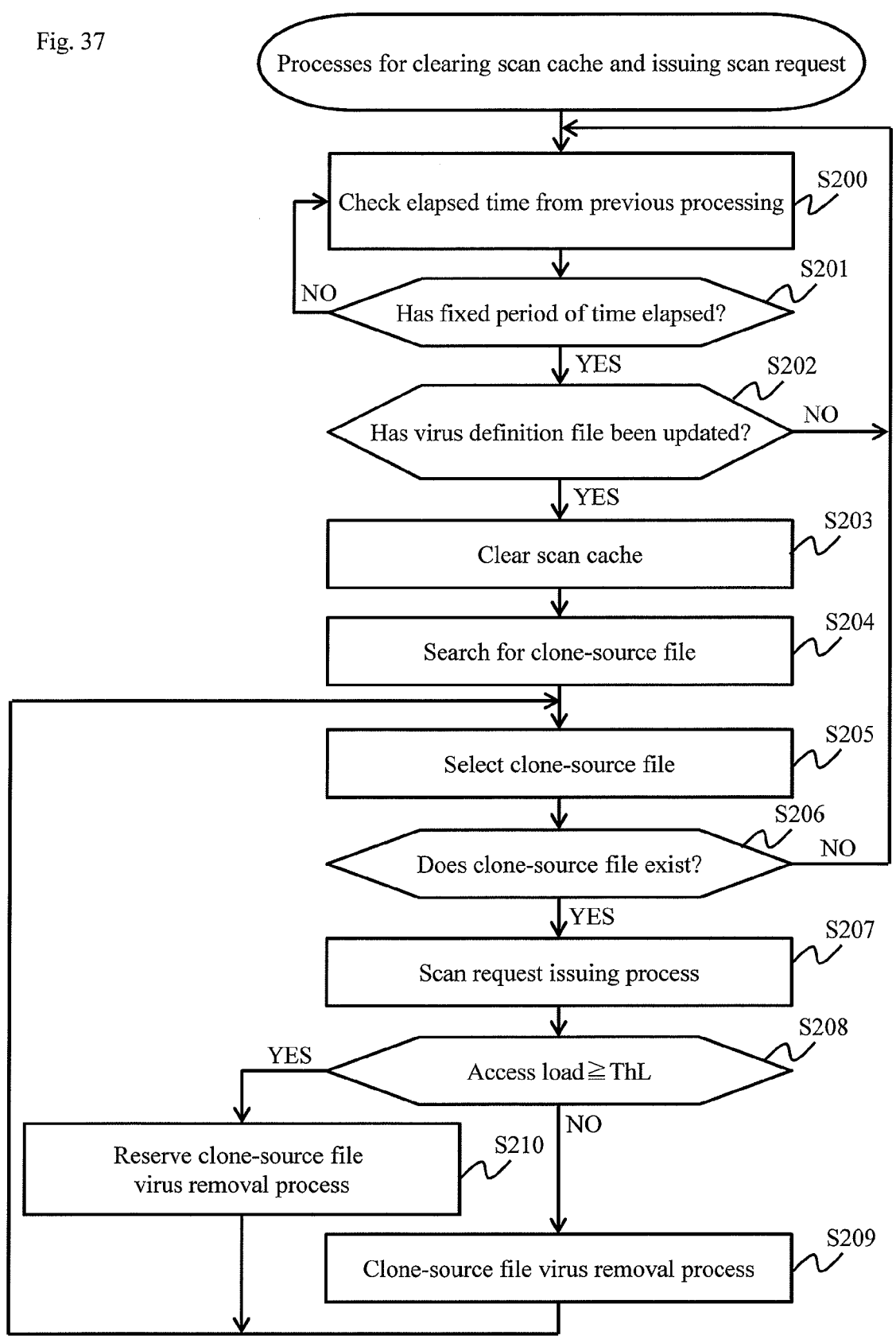
FIG. 37 is a flowchart showing a process for issuing a scan request for requesting the execution of a virus scan process.

FIG. 37 is a flowchart of processing related to clearing the scan cache T11 and issuing a scan request.

The file storage 10 checks the elapsed time since this processing was previously executed (S200), and determines whether a fixed period of time has elapsed since the previous time (S201). In a case where the fixed period of time has elapsed (5201: YES), the file storage 10 queries the scan server 20 as to whether the virus definition file has been updated (S202).

In a case where the virus definition file has been updated (S202: YES), the file storage 10 clears the scan cache T11 (S203). Then, the file storage 10 retrieves the clone-source files (S204) and selects one clone-source file (S205).

The file storage 10 determines whether a clone-source file was able to be selected (S206), and in a case where a clone-source file could be selected (S206: YES), issues a virus scan request to the scan server 20 (S207). The process for issuing a virus scan request will be explained in detail further below.

The file storage 10 receives the result of the virus scan processing from the scan server 20, and determines whether the file storage 10 access load is equal to or larger than a prescribed load threshold ThL (S208). The access load is the load related to access requests from the client 40.

In a case where the access load is not equal to or larger than the threshold ThL (S208: NO), the file storage 10 executes virus removal processing for the clone-source file (S209). The process for removing a virus from the clone-source file, that is, the process for creating a clone-source file not infected with a virus by re-performing single instance processing will be explained further below.

In a case where the access load is equal to or larger than the threshold ThL (S208: YES), the file storage 10 reserves the execution of the virus removal processing for the clone-source file (S210). This is so the process for removing the virus from the clone-source file can be executed at a time when the access load is low. The time when the access load is low, for example, is a time when the access load is less than the threshold ThL.

Figure 38:
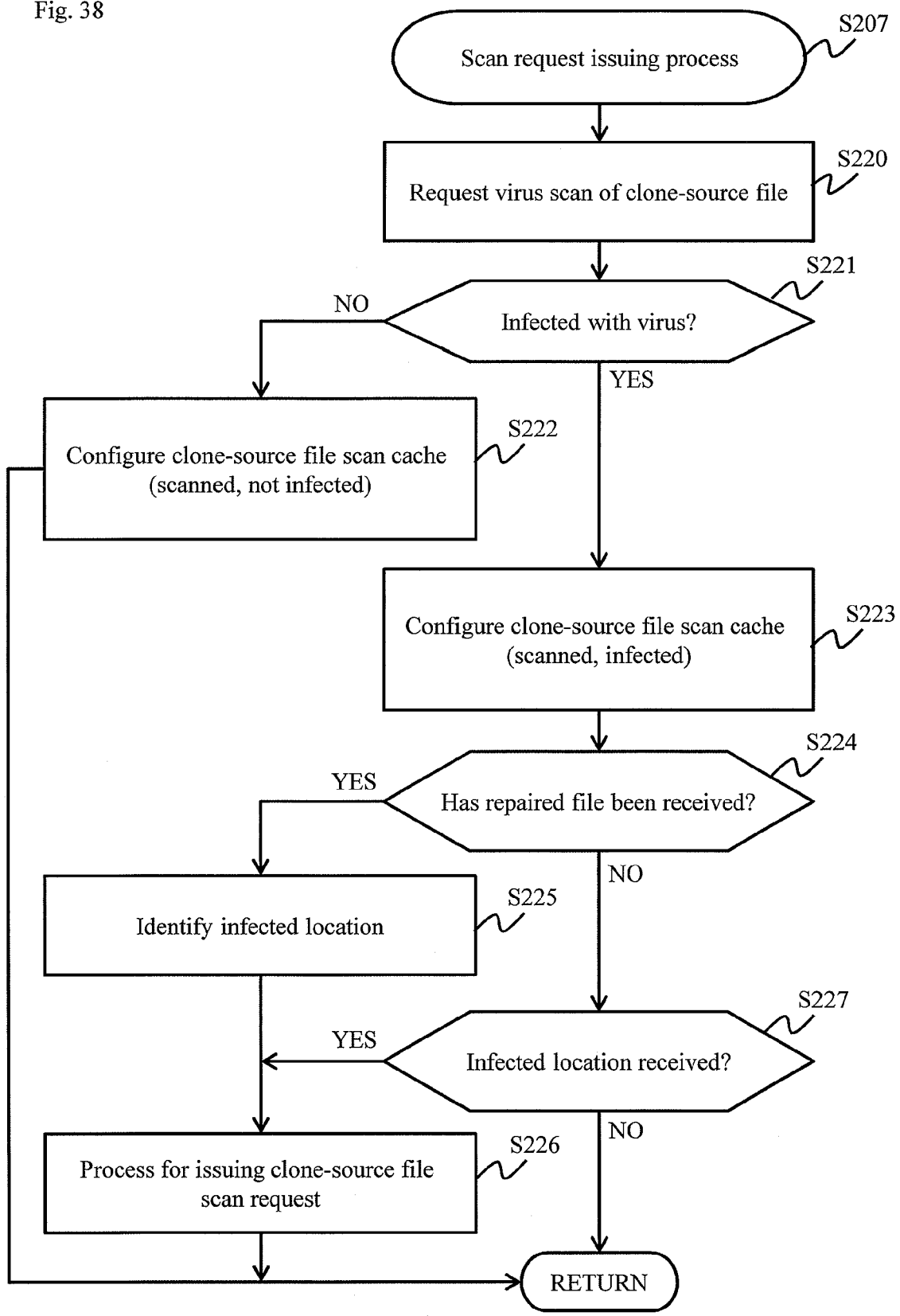
FIG. 38 is a flowchart of a portion of the processing included in FIG. 37 showing in detail a process for issuing a scan request.

FIG. 38 is a flowchart showing the processing (S207 of FIG. 37) for issuing a virus scan request in detail. The file storage 10 requests that the scan server 20 execute virus scan processing for the selected clone-source file (target clone-source file) (S220).

The file storage 10, upon receiving the result of the processing from the scan server 20, determines whether the target file is infected with a virus (S221). In a case where the target clone-source file is not infected with a virus (S221: NO), the file storage 10 configures "scanned" and, in addition, "not infected" in the scan cache T11 for the target clone-source file (S222).

In a case where the target clone-source file is infected with a virus (S221: YES), the file storage 10 configures "scanned" and, in addition, "infected" in the scan cache T11 for the target clone-source file (S223).

The file storage 10 determines whether a repaired file has been received from the scan server 20 (S224). In a case where a repaired file has been received from the scan server 20 (S224: YES), the file storage 10 identifies the virus-infected area by comparing the repaired file with the pre-repair target clone-source file (S225). The scan request issuing process for the clone-source file here differs from the virus scan processing for the clone file, and the clone-source file is not overwritten with a repaired file even when a repaired file has been received. Next, the file storage 10 executes the process for issuing a virus scan request for a clone file, which is referencing the target clone-source file (S226).

In a case where a repaired file for the target clone-source file is not received (S224: NO), the file storage 10 determines whether information related to the infected area has been received from the scan server 20 (S227). In a case where a notification related to the infected area has been received from the scan server 20 (S227: YES), the file storage 10 moves to Step S226. In a case where a notification related to the infected area has not been received from the scan server 20 (S227: NO), the file storage 10 ends this processing.

Figure 39:
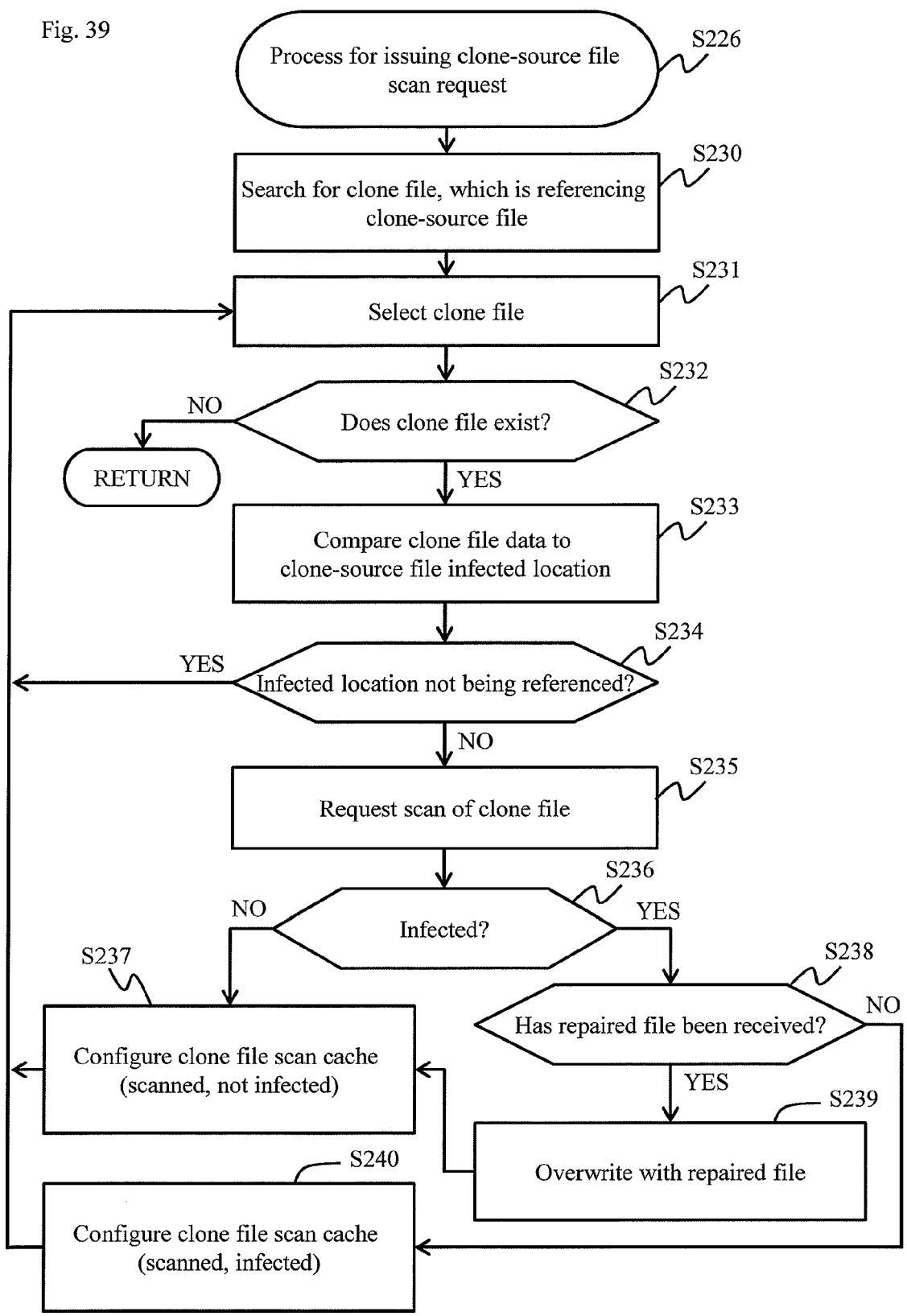
FIG. 39 is a flowchart of a portion of the processing included in FIG. 38 showing in detail a process for issuing a clone file scan request.

FIG. 39 is a flowchart showing the processing (S226 of FIG. 38) for issuing a virus scan request for the clone file in detail.

The file storage 10 retrieves the clone files referencing the target clone-source file (S230), and selects one clone file (S231). The file storage 10 determines whether a clone file was able to be selected (S232). In a case where a clone file could not be selected (S232: NO), the file storage 10 ends this processing.

In a case where a clone file could be selected (S232: YES), the file storage 10 compares the data of this clone file with the infected area of the target clone-source file (S233). The selected clone file will be called the target clone file hereinbelow.

The file storage 10 determines whether the target clone file is not referencing the infected area of the target clone-source file (S234). In a case where the target clone file is not referencing the infected area at all (S234: YES), the file storage 10 returns to Step S231 and selects another clone file.

In a case where the target clone file is referencing even a portion of the infected area of the target clone-source file (S234: NO), the file storage 10 requests that the scan server 20 execute virus scan processing for the target clone file (S235).

The file storage 10, upon receiving the result of the virus scan processing from the scan server 20, determines whether the target clone file is infected with a virus (S236). In a case where the determination is that the target clone file is not infected with a virus (S236: NO), the file storage 10 configures "scanned" and, in addition, "not infected" in the scan cache T11 for the target clone file (S237), and moves to Step S231.

In a case where the determination is that the target clone file is infected with a virus (S236: YES), the file storage 10 determines whether a repaired file has been received from the scan server 20 (S238). In a case where a repaired file has been received (S238: YES), the file storage 10 overwrites the infected target clone file with the repaired file byway of the file system (S239). Thereafter, the file storage 10 moves to Step S231 by way of Step S237.

In a case where a repaired file has not been received (S238: NO), the file storage 10 configures "scanned" and, in addition, "infected" in the scan cache T11 for the target clone file (S240).

Figure 40:
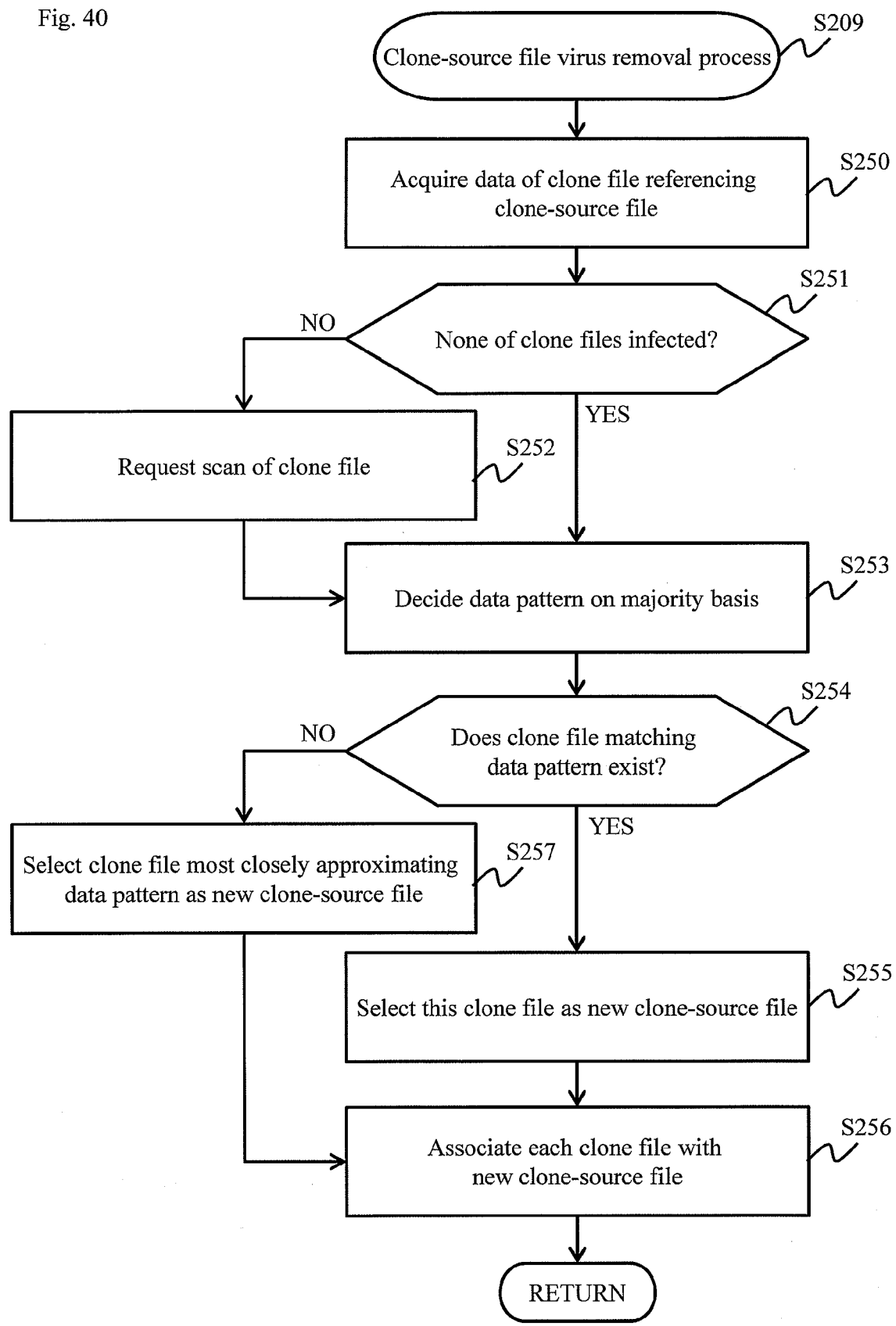
FIG. 40 is a flowchart of a portion of the processing included in FIG. 37 showing in detail a process for removing a virus from a clone-source file.

FIG. 40 is a flowchart showing the processing (S209 of FIG. 37) for removing a virus from a clone-source file in detail.

The file storage 10 acquires the data of all the clone files, which are referencing the target clone-source file, from the RAID system 30 via the file system (S250), and determines whether all the clone files are in a non-infected state (S251). The non-infected state includes a case in which the clone file was not infected in the first place, and a case where the clone file had been infected but was repaired.

In the case of an infected clone file (S251: YES), the file storage 10 requests that the scan server 20 execute virus scan processing for the infected clone file (S252). In accordance with this, the virus is removed from the infected clone file, resulting in the non-infected state.

When all of the clone files referencing the target clone-source file have transitioned to the non-infected state, the file storage 10 decides a data value for each data block in accordance with majority logic, and decides a data pattern, which conforms to the majority logic (S253).

The file storage 10 determines whether a clone file matching the majority logic-determined data pattern exists (S254). In a case where a clone file matching the data pattern exists (S254: YES), the file storage 10 selects the clone file, which matches the data pattern, as a new clone-source file (S255). The file storage 10 reconfigures the clone file by associating the new clone-source file with another clone file (S256).

In a case where a clone file matching the data pattern determined in accordance with majority logic does not exist (S254: NO), the file storage 10 selects the clone file most closely approximating this data pattern as the new clone-source file (S237), and moves to Step S256.

According to configuring this example like this, the following effect is achieved. In this example, in a case where it is determined that the clone-source file is infected with a virus, the file storage 10 creates a new clone-source file based on a clone file, which is not infected with a virus, and reconfigures the clone file. Therefore, it is possible to obtain a clone-source file, which is not infected with a virus, making it possible to restore security, and, in addition, to efficiently eliminate duplicated data based on the latest status.

In this example, the file storage 10 determines the need for virus scan processing based on the reference status of the clone file, and executes virus scan processing in a case where it has been determined to be necessary. Therefore, it is possible to reduce the number of times that a virus scan request is issued to the scan server 20, and to lessen the load on the scan server 20. In addition, a drop in access performance can be prevented since it is possible to reduce the number of virus scan requests issued to the scan server 20.

In this example, in a case where the access load on the file storage 10 is smaller than a threshold ThL, the file storage 10 executes virus removal processing for the clone-source file, and in a case where the access load is equal to or larger than the threshold ThL, reserves the virus removal processing for the clone-source file. Therefore, virus removal processing for the clone-source file can be prevented in a state in which the access load on the file storage 10 is high, making it possible to curb a drop in the response performance of the file storage 10.

EXAMPLE 2

Example 2 will be explained by referring to FIGS. 41 through 45. This example is equivalent to a variation of Example 1, and as such, the explanation will focus on the differences with Example 1. In this example, a method for dealing with a case in which multiple data patterns conforming to majority logic exist will be described.

FIG. 41 shows how multiple data patterns are decided in accordance with majority logic based on multiple clone files referencing a common clone-source file. As shown in FIG. 41(a), it is assumed that the current clone-source file is "1234" and that the fourth data block is infected with a virus. It is assumed that clone files A through C, which reference this clone-source file, comprise the data "1238", that clone files D and E comprise the data "1678", that clone files F and G comprise the data "5678", and that clone files H through J comprise the data "5679".

As shown in FIG. 41(b), the data pattern "1678" and the data pattern "5678" are obtained when majority logic is adopted with respect to the data of each data block, and a pattern, which lines up the most numerous data items (a majority logic data pattern), is created. These two data patterns are selected as new clone-source files.

As shown in FIG. 41(c), the new clone-source file "1678" and the new clone-source file "5678" are compared, and the duplicated data in the new clone-source files is eliminated. In the case of FIG. 41(c), the one new clone-source file "5678" is treated as the first clone-source file, and the other new clone-source file is treated as the second clone-source file.

The first clone-source file "5678" is treated as the benchmark, the second clone-source file "1678" is treated as the reference source, and the duplicated data in the second clone-source file are replaced with references to the first clone-source file. In accordance with this, the data of the second clone-source file transitions to "1---". The second clone-source file references the data of the first clone-source file from the second data block to the fourth data block.

As shown in FIG. 42(a), a clone file, which matches a new clone-source file, is allocated for each of multiple new clone-source files. Clone files F and G belong to the group of the first clone-source file "5678", and clone files D and E belong to the group of the second clone-source file "1---".

As shown in FIG. 42(b), the remaining clone files A through C and H through J are also allocated to the clone-source file, which the clone files most closely approximate. The clone files H through J belong to the first clone-source file "5678", and the clone files A through C belong to the second clone-source file "1---".

Figure 42:
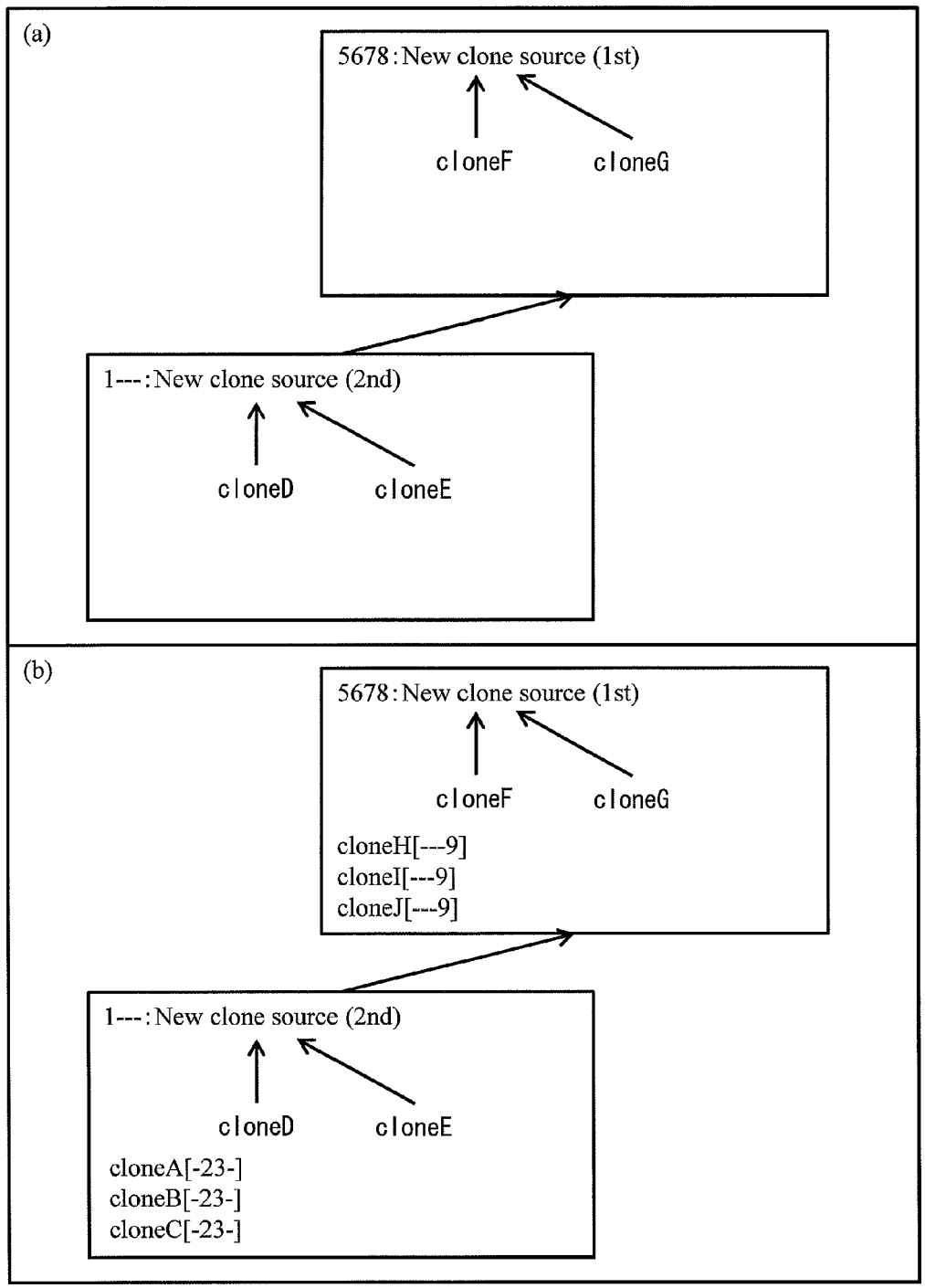
FIG. 42 is an illustration showing how management is performed by forming a group for each of multiple clone-source files and allocating a clone file to any group.
Figure 43:
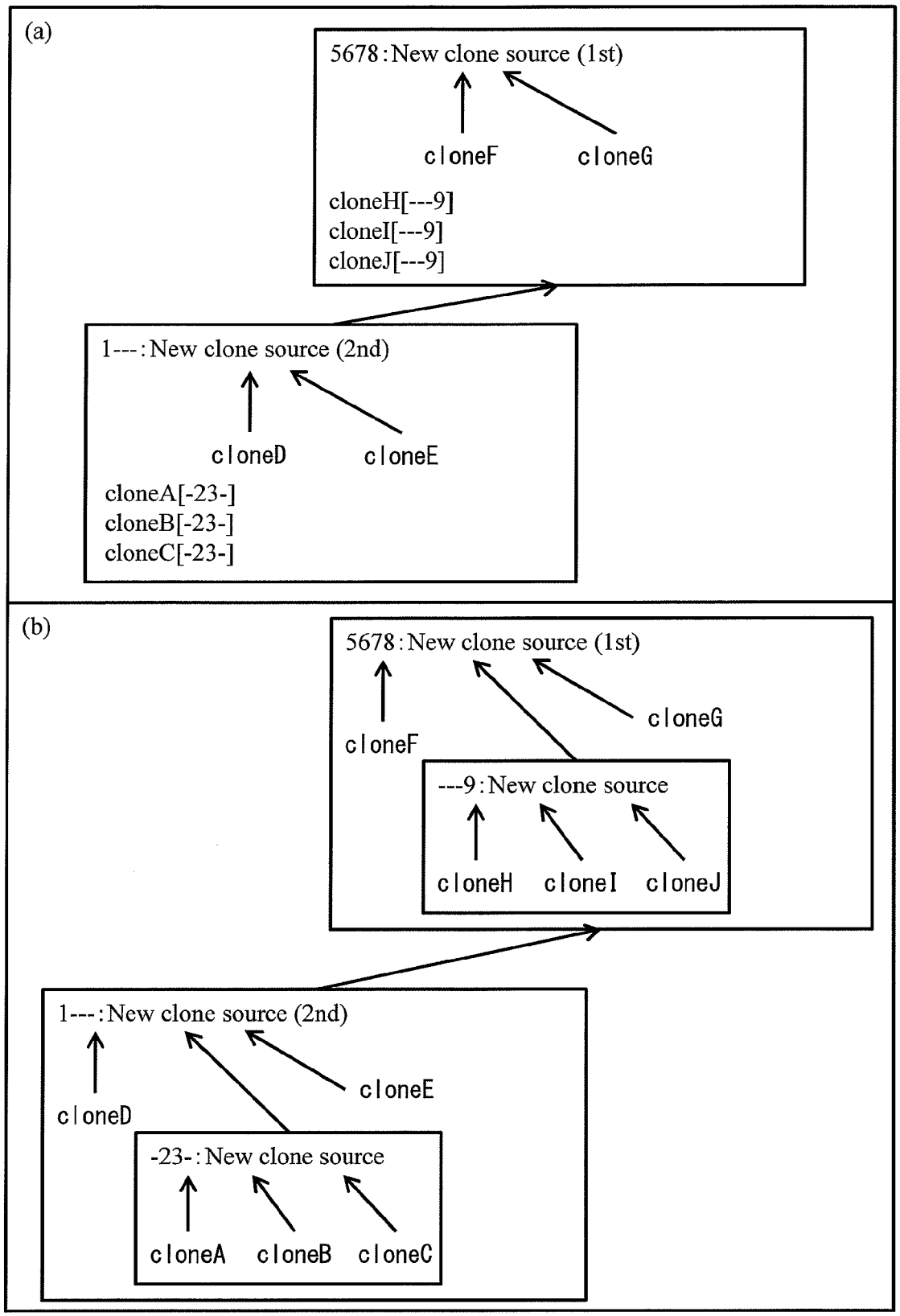
FIG. 43 is an illustration showing how to eliminate duplicate data from inside each group.

As shown in FIG. 43, additional deduplication can be preformed within the group of each clone-source file. The state shown in FIG. 43(a) is the same as the state of FIG. 42(b). When single instance processing is executed in a new clone-source file group in this state, the status transitions to the state shown in FIG. 43(b).

That is, in the first clone-source file "5678" group, the data of clone files H through J is "---9". Therefore, should a third clone-source file "---9" be configured, the data of the clone files H through J can be deleted. Similarly, since the data of clone files A through C in the second clone-source file "1---" is "-23-", should a fourth clone-source file "-23-" be configured, the data of the clone files A through C can be deleted.

Figure 44:
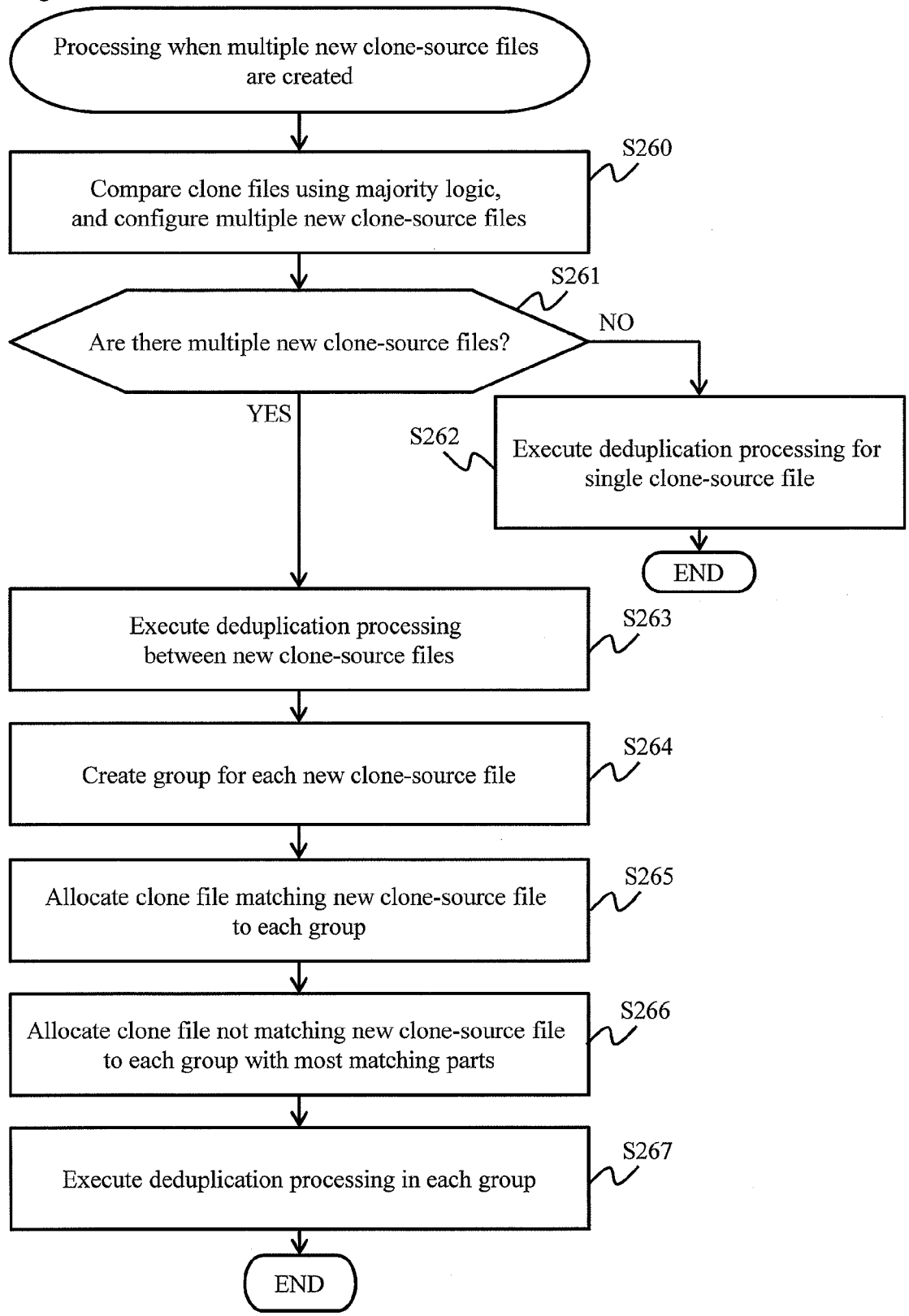
FIG. 44 is a flowchart showing a process for managing a group in a case where multiple clone-source files have been configured for each group.

FIG. 44 is a flowchart showing the processing in a case where multiple data patterns are created in accordance with majority logic. This processing is executed after it has been confirmed that none of the clone files, which reference the old clone-source file, is infected with a virus.

The file storage 10 evaluates the data of each clone file in accordance with majority logic on a data block by data block basis, and obtains a data pattern comprising the most numerous data items (S260). The file storage 10 determines whether there are multiple data patterns conforming to majority logic (S261). In a case where there is only one data pattern created in accordance with majority logic (S261: NO), the file storage 10 executes deduplication processing based on a single data pattern (S262). Step S262 is equivalent to the processing of S254 through S257 of FIG. 40.

In a case where multiple data patterns have been obtained using majority logic (S261: YES), the file storage 10 treats these data patterns as new clone-source files (can also be called a virtual clone-source files), and as shown in FIG. 41(c), eliminates the duplicated data in the new clone-source file (S263).

The file storage 10, as shown in FIG. 42(a), creates a group for each new clone-source file (S264), and allocates a clone file matching the new clone-source file to each group (S265).

The file storage 10, as shown in FIG. 42(b), allocates the remaining clone files to the virtual clone-source file group, which the clone files most closely approximate (S266). In addition, the file storage 10, as shown in FIG. 43(b), eliminates the duplicated data inside each group (S267).

In a case where multiple data patterns have been obtained using majority logic, as was described hereinabove, duplicated data is eliminated from the new clone-source file obtained from each data pattern, and, in addition, other clone files are allocated to each new clone-source file group. Thus, a storage area can be used even more efficiently by performing additional deduplication in each group.

Figure 45:
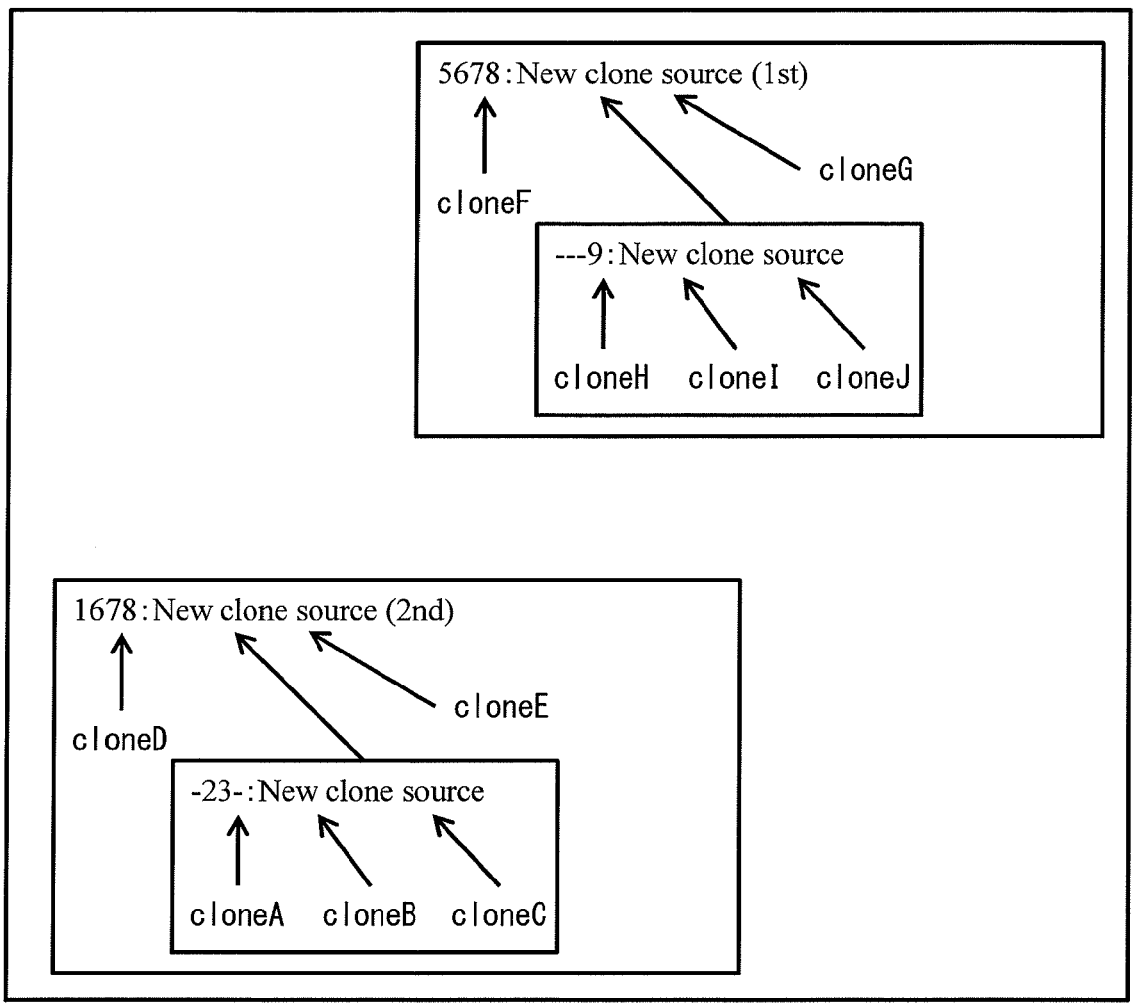
FIG. 45 is an illustration schematically showing a case where deduplication is not performed for multiple clone-source files.

As shown in FIG. 45, a configuration, which does not perform deduplication for multiple new clone-source files, is also possible. Deduplication is not performed for a first clone-source file "5678" and a second clone-source file "1678", and each is treated as an independent file. In accordance with this, in a case where a failure of some sort makes it impossible to read the first clone-source file "5678", the affects of this failure can be confined to the first clone-source file "5678" group. A file of the second clone-source file "1678" group can be accessed. By contrast, as shown in FIG. 42, when the second clone-source file "1---" is configured having the first clone-source file "5678" as a benchmark, in a case where it is no longer possible to read the first clone-source file "5678", access to all the clone files becomes impossible. Therefore, reliability can be enhanced by treating multiple clone-source files as respectively different files.

The present invention is not limited to the respective examples described above. A person having ordinary skill in the art will be able to make various additions and changes without departing from the scope of the present invention. For example, the technical characteristics of the present invention described above can be combined and implemented as needed.

The present invention, for example, can also be expressed as a computer program invention as follows.

Wording 1

A computer program for controlling a file management apparatus, which manages multiple files stored in a storage control apparatus, and uses a virus checking apparatus for checking whether a file is infected with a computer virus, the computer program comprising:

a deduplication processing part, which manages multiple files among which at least a portion of data is duplicated by treating one file as a benchmark file, treating another file as a reference-source file for referencing data of the above-mentioned benchmark file, and eliminating duplicated data between the above-mentioned benchmark file and the above-mentioned reference-source file; and a receiving part, which receives and processes an access request from a host apparatus, and, in addition, requests the above-mentioned virus checking apparatus to check a prescribed file from among the above-mentioned multiple files, wherein the receiving part also executes a prescribed reconfiguration process for configuring a new benchmark file based on the above-mentioned reference-source file after confirming in accordance with the virus checking apparatus that the above-mentioned reference-source file is not infected with a computer virus.

Wording 2

A computer program according to wording 1, wherein the receiving part executes the above-mentioned prescribed reconfiguration processing in accordance with a preconfigured prescribed trigger.

Wording 3

A computer program according to either of wording 1 or wording 2, wherein the above-mentioned prescribed trigger is at least any one of a case where a fixed time has elapsed, a case where checking capabilities of the above-mentioned virus checking apparatus are updated, a case where a backup is acquired, and a case where a snapshot is created.

Wording 4

A computer program according to any of wordings 1 through 3, wherein there exists multiple of the above-mentioned reference-source files for referencing the above-mentioned benchmark file, and the above-mentioned prescribed reconfiguration process configures, as the above-mentioned new benchmark file, a file from which the largest number of duplicated data items can be eliminated based on a reference-source file, which has been repaired by using the above-mentioned virus checking apparatus to remove a computer virus, and a reference-source file, which has been determined by the above-mentioned virus checking apparatus not to be infected with a computer virus.

Wording 5

A computer program according to any of wordings 1 through 4, wherein the above-mentioned prescribed reconfiguration process compares block-by-block data of the repaired reference-source file and of the above-mentioned reference-source file, which has been determined not to be infected with a computer virus, and uses the most numerous data item for each block to acquire a data pattern conforming to majority logic, and configures the above-mentioned new benchmark file based on this data pattern.

Wording 6

A computer program according to any of wordings 1 through 5, wherein the above-mentioned prescribed reconfiguration process configures, as the above-mentioned new benchmark file, either the above-mentioned data pattern, or any reference-source file, which matches the above-mentioned data pattern from among the multiple reference-source files.

Wording 7

A computer program according to any of wordings 1 through 6, wherein after using the above-mentioned virus checking apparatus to confirm that the above-mentioned reference-source file is not infected with a computer virus, the receiving part reserves execution of the above-mentioned prescribed reconfiguration process in a case where an access load for processing access requests from the above-mentioned host apparatus is equal to or larger than a prescribed threshold, and executes the above-mentioned prescribed reconfiguration process when the above-mentioned access load falls below the above-mentioned prescribed threshold.

Wording 8

A computer program according to any of the wording 1 through 7, wherein the above-mentioned receiving part requests that the above-mentioned virus checking apparatus check the above-mentioned benchmark file, and in a case where, as a result of the check by the above-mentioned virus checking apparatus, it has been determined that the above-mentioned benchmark file is infected with a computer virus, the above-mentioned receiving part decides the necessity of checking the above-mentioned reference-source file based on a reference status of the above-mentioned benchmark file with respect to the above-mentioned reference-source file.

REFERENCE SIGNS LIST

10 File storage apparatus
20 Scan server apparatus
30 RAID system
40 Client apparatus
P111 Receiving program
P112 Deduplication driver
P210 Scan engine program

The invention claimed is:

1. A storage system, comprising:
a file management device, which comprises a processor and a memory, and which is coupled to a virus checking device, which comprises a processor and a memory, for checking whether a file is infected with a computer virus, and which manages multiple files; and
a storage control device for storing the multiple files,
wherein the file management device:
manages multiple files among which at least a portion of data is duplicated by treating one file as a benchmark file, treating another file as a reference-source file for referencing data of the benchmark file, and eliminating duplicated data between the benchmark file and the reference-source file;
receives and processes an access request from a host device;
requests that the virus checking device check a prescribed file from among the multiple files; and
in a case where the benchmark file is infected with a computer virus, executes a prescribed reconfiguration process for configuring a new benchmark file based on the reference-source file, which references the relevant benchmark file;
wherein the file management device executes the prescribed reconfiguration process in accordance with a preconfigured prescribed trigger;
wherein the prescribed trigger is at least any one of a case where a fixed time has elapsed, a case where checking capabilities of the virus checking device are updated, a case where a backup is acquired, and a case where a snapshot is created; and
wherein there exists multiples of the reference-source files for referencing the benchmark file, and
the prescribed reconfiguration process configures, as the new benchmark file, a file from which the largest number of duplicated data items can be eliminated based on a reference-source file, which has been repaired by using the virus checking device to remove a computer virus, and a reference-source file, which has been determined by the virus checking device not to be infected with a computer virus.

2. A storage system according to claim 1, wherein the prescribed reconfiguration process block-by-block compares data of the repaired reference-source file and of the reference-source file, which has been determined not to be infected with a computer virus, and uses the most numerous data item in each block to acquire a data pattern conforming to majority logic, and configures the new benchmark file based on this data pattern.

3. A storage system according to claim 2, wherein the prescribed reconfiguration process configures, as the new benchmark file, either the data pattern, or any reference-source file matching the data pattern from among the multiple reference-source files.

4. A storage system according to claim 1, wherein, in the prescribed reconfiguration process, multiple new benchmark files can be configured, and reference-source files which have numerous duplicated data items of the multiple reference-source files, are grouped together for each of the multiple new benchmark files.

5. A storage system according to claim 1, wherein after using the virus checking device to confirm that the reference-source file is not infected with a computer virus, the file management device reserves execution of the prescribed reconfiguration process in a case where an access load for processing access requests from the host device is equal to or larger than a prescribed threshold, and executes the prescribed reconfiguration process when the access load falls below the prescribed threshold.

6. A storage system according to claim 1, wherein the file management device requests that the virus checking device check the benchmark file, and
in a case where, as a result of the check by the virus checking device, it has been determined that the benchmark file is infected with a computer virus, the file management device decides the necessity of checking the reference-source file based on a reference status of the benchmark file with respect to the reference-source file.

7. A storage system according to claim 6, wherein the file management device determines that a check is necessary in a case where the reference-source file is referencing a prescribed area of the benchmark file, which is infected with a computer virus, and requests that the virus checking device check the reference-source file, and
determines that a check is not necessary in a case where the reference-source file is not referencing the prescribed area, and does not request that the virus checking device check the reference-source file.

8. A storage system according to claim 7, wherein the file management device identifies the prescribed area by comparing data of the benchmark file, which is stored in the storage control device, with data of the benchmark file after repair received from the virus checking device.

9. A storage system according to claim 7, wherein prescribed area information for identifying the prescribed area is included in a result of the benchmark file check by the virus checking device, and
the file management device identifies the prescribed area based on the prescribed area information.

10. A storage system according to claim 7, wherein the file management device restricts reception of a request to access the reference-source file from the host device in a case where the virus checking device is unable to repair a computer virus infecting the prescribed area.

11. A storage system according to claim 10, wherein, from among the data of the reference-source file for which access request reception is being restricted, the file management device allows reception of the access request with respect to data which is not referencing the prescribed area, and prohibits reception of the access request with respect to data which is referencing the prescribed area.

12. A method for managing a storage system, which comprises a file management device that is coupled to a virus checking device for checking whether a file is infected with a computer virus, and that manages multiple files stored in a storage control apparatus, wherein the file management device:

manages multiple files among which at least a portion of data is duplicated by treating one file as a benchmark file, treating another file as a reference-source file for referencing data of the benchmark file, and eliminating duplicated data between the benchmark file and the reference-source file;

receives and processes an access request from a host device;

requests that the virus checking device check a prescribed file from among the multiple files; and in a case where the benchmark file is infected with a computer virus, executes a prescribed reconfiguration process for configuring a new benchmark file based on the reference-source file, which references the relevant benchmark file;

wherein the file management device executes the prescribed reconfiguration process in accordance with a preconfigured prescribed trigger;

wherein the prescribed trigger is at least any one of a case where a fixed time has elapsed, a case where checking capabilities of the virus checking device are updated, a case where a backup is acquired, and a case where a snapshot is created; and wherein there exists multiples of the reference-source files for referencing the benchmark file, and the prescribed reconfiguration process configures, as the new benchmark file, a file from which the largest number of duplicated data items can be eliminated based on a reference-source file, which has been repaired by using the virus checking device to remove a computer virus, and a reference-source file, which has been determined by the virus checking device not to be infected with a computer virus.

* * * * *